United States Patent
Suzuki et al.

(10) Patent No.: US 7,095,566 B2
(45) Date of Patent: Aug. 22, 2006

(54) DRIVE CONTROLLER FOR LENS APPARATUS

(75) Inventors: Noboru Suzuki, Utsunomiya (JP); Kazumasa Yoshikawa, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/130,330

(22) Filed: May 16, 2005

(65) Prior Publication Data
US 2005/0254141 A1    Nov. 17, 2005

(30) Foreign Application Priority Data
May 17, 2004    (JP)    ............................. 2004-146628

(51) Int. Cl.
*G02B 15/14*    (2006.01)

(52) U.S. Cl. ..................... 359/696; 359/694; 359/697

(58) Field of Classification Search ................ 359/696, 359/694, 697, 695, 698
See application file for complete search history.

(56) References Cited

U.S. PATENT DOCUMENTS

| 5,438,190 A | 8/1995 | Kaneda et al. |
| 5,486,860 A | 1/1996 | Shiokawa et al. |
| 5,815,203 A | 9/1998 | Lee et al. |
| 5,949,586 A | 9/1999 | Hirasawa et al. |
| 6,314,240 B1 | 11/2001 | Okawara |
| 2004/0061949 A1* | 4/2004 | Yakita et al. ............... 359/697 |

* cited by examiner

*Primary Examiner*—Timothy Thompson
(74) *Attorney, Agent, or Firm*—Canon U.S.A. Inc. IP Division

(57) ABSTRACT

A drive controller for a lens apparatus including a first lens unit which moves for changing magnification and a second lens unit which moves to prevent an image plane variation in response to the first lens unit moving to change the magnification. The drive controller includes a memory storing a plurality of tracking data corresponding to position data of the second lens unit, and a control unit for detecting a change in a focus state of the lens apparatus during the movement of the first lens unit and for changing one of the plurality of tracking data based on the detection result. The control unit stores a direction of the changing of the one tracking data and thereafter changes the one tracking data based on the stored direction.

21 Claims, 42 Drawing Sheets

D/A, A/D: 16 bits
0: CLOSE
65535: OPEN

A/D : 16 bits
0 : CLOSE
65535 : OPEN

DRIVE CONTROLLER FOR LENS APPARATUS

BACKGROUND OF THE INVENTION

1. Field of the Invention

The present invention relates to a drive controller for a lens apparatus, which controls driving lens units in order to prevent an image plane variation caused by changing magnification.

2. Description of the Related Art

Hitherto, in a consumer-oriented zoom lens apparatus, a movement speed of a magnification changing lens unit (zoom speed) during a zoom operation is limited to a speed capable of tracking an auto focus (AF) operation of a focus lens unit and tracking data (data indicating a position of the focus lens for maintaining a position of an image plane substantially steady when the magnification changing lens unit moves). In other words, a maximum movement speed of the magnification changing lens unit depends on a controllable movement speed of the focus lens.

Therefore, an actual zoom speed according to the same command value of zoom speed is high in a wide side but becomes lower toward a telephoto (tele) side. Thus, zooming cannot be quickly performed in the tele side in many cases.

U.S. Pat. No. 5,438,190 discloses a method for preventing an image plane variation caused by a movement of a magnification changing lens unit, the variation being prevented by a focus lens. In this method, a standard speed depending on positions of the magnification changing lens unit and the focus lens is corrected according to a depth of field and a focus state while the magnification changing lens unit moves, and the focus lens is driven based on the corrected standard speed.

On the other hand, in a business-use zoom lens apparatus for broadcasting or the like, zooming is manually performed in general, unlike in a consumer-oriented apparatus. By manually performing a zoom operation, extremely high-speed zooming is realized. In other words, the zoom speed cannot be limited in a range in which a control of preventing an image plane variation by the focus lens unit can follow the zoom speed. As a result, an out-of-focus state is likely to occur at high-speed zooming.

For example, when a position of an image plane is maintained by continuing an AF operation of searching for a position where an AF evaluation value extracted from a video signal is higher while driving the focus lens unit with micro amplitude during zooming, a favorable image-plane maintaining performance can be ensured at low-speed zooming. However, at high-speed zooming, the image-plane maintaining performance degrades because some time is required for generating an AF evaluation value and for search drive and determination of direction of the focus lens unit.

When a plurality of pieces of tracking data are prepared, a piece of tracking data of a direction where the evaluation value is higher is searched for by moving a second lens unit to a minimum object distance (MOD) side and an infinity (INF) side in order to select a piece of tracking data to be used at zooming. Also, in order to more effectively suppress an image plane variation during zooming, an operation of searching for the tracking data is repeatedly performed during zooming. In this case, however, an image-plane maintaining performance degrades because time is required for searching for tracking data, as in the AF operation.

SUMMARY OF THE INVENTION

The present invention is directed to a drive controller for a lens apparatus, the drive controller being capable of suppressing an out-of-focus state even when high-speed zooming is performed by a manual operation or the like.

According to one aspect of the present invention, provided is a drive controller for a lens apparatus including a first lens unit movable to change magnification and a second lens unit moving to prevent an image plane variation in response to the first lens unit moving to change the magnification. The drive controller includes a memory storing a plurality of tracking data corresponding to position data of the second lens unit; and a control unit detecting a change in a focus state of the lens apparatus during the movement of the first lens unit and changing at least one of the plurality of tracking data based on the detection. The control unit performs a first control of storing a direction of the changing of the at least one of the plurality of tracking data and thereafter changes the at least one of the plurality of tracking data based on the stored direction.

When tracking data is repeatedly changed during zooming, a piece of tracking data is selected by using information about a direction stored at a previous change after a first operation of searching for tracking data. In this method, search for tracking data need not be repeated and thus the tracking data can be quickly changed. Therefore, a high performance of maintaining an image plane can be obtained even at a high-speed zooming.

According to another aspect of the present invention, provided is a drive controller for a lens apparatus including a first lens unit movable to change magnification and a second lens unit moving to prevent an image plane variation in response to the first lens unit moving to change the magnification. The drive controller includes a control unit controlling driving the second lens unit; a memory storing tracking data corresponding to position data of the second lens unit; and a detecting unit detecting a movement speed of the first lens unit. The control unit controls the driving of the second lens unit so as to search for a position nearer to an in-focus state of the lens apparatus (AF control) when the movement speed of the first lens unit is equal to or lower than a predetermined speed and controls the driving of the second lens unit by using the tracking data when the movement speed is higher than the predetermined speed.

According to yet another aspect of the present invention, provided is a drive controller for a lens apparatus including a first lens unit movable to change magnification and a second lens unit moving to prevent an image plane variation in response to the first lens unit moving to change the magnification. The drive controller includes a control unit controlling driving the second lens unit; and a memory storing tracking data corresponding to position data of the second lens unit. When an evaluation value indicating a contrast state of a captured image is lower than a predetermined value, the control unit controls driving the second lens unit so as to search for a position corresponding to another evaluation value higher (AF control) than the evaluation value. When the evaluation value is equal to or higher than the predetermined value, the control unit controls driving the second lens unit based on the tracking data.

When the zoom speed is equal to or lower than a predetermined speed or when the evaluation value is lower than a predetermined value, AF control is performed. In the AF control, zoom trackability is lower than in a case of using tracking data but an image-plane maintaining performance is higher. On the other hand, when the zoom speed is higher than the predetermined speed or when the evaluation value is equal to or higher than the predetermined value, a correction of an image plane is controlled by using tracking data having a higher zoom trackability than in the AF control. Accordingly, a favorable performance of maintaining an image plane can be ensured.

Further features and advantages of the present invention will become apparent from the following description of exemplary embodiments with reference to the attached drawings.

DESCRIPTION OF THE EMBODIMENTS

Hereinafter, embodiments of the present invention will be described with reference to the drawings.

First Embodiment

First, zoom interlocking control of a focus lens unit, which is a feature of a first embodiment of the present invention, will be briefly described. A lens apparatus described herein is a rear-focus zoom lens including a magnification changing lens unit (hereinafter referred to as a "zoom lens unit") moving to change magnification and a focus lens unit preventing an image plane variation due to a change of magnification, the focus lens unit being positioned on an image plane side with respect to the zoom lens unit.

In this embodiment, the zoom interlocking control is performed when a movement speed of the zoom lens unit or an operation speed of a manual operation member for operating the zoom lens unit (hereinafter these speeds are referred to as a "zoom speed") is higher than a first standard speed (to be described later). When the zoom speed is equal to or lower than the first standard speed, an image plane variation is prevented by AF control, in which the focus lens is driven with a micro-amplitude (so-called wobbling) to search for a position where an AF evaluation value is higher. The AF control is also performed in a non-zooming state in order to focus an object. Further, when the zoom speed is higher than a second standard speed, which is higher than the first standard speed, an image plane variation is prevented by fixing a tracking curve to be used (hereinafter referred to as a "tracking curve fixed control"), instead of performing the zoom interlocking control.

During a zooming operation, the position of the focus lens is controlled to track a tracking curve. At this time, an AF evaluation value is checked at predetermined intervals (control routine). If a difference between a previous AF evaluation value and a present AF evaluation value exceeds a predetermined threshold, a tracking curve to be used is changed to that in a direction where an AF evaluation value is higher. This is the zoom interlocking control.

Incidentally, the "direction" herein corresponds to an increase/decrease direction of a number allocated to each tracking curve or an MOD (minimum object distance)/INF (infinity) direction, as will be described below.

Figure 1:
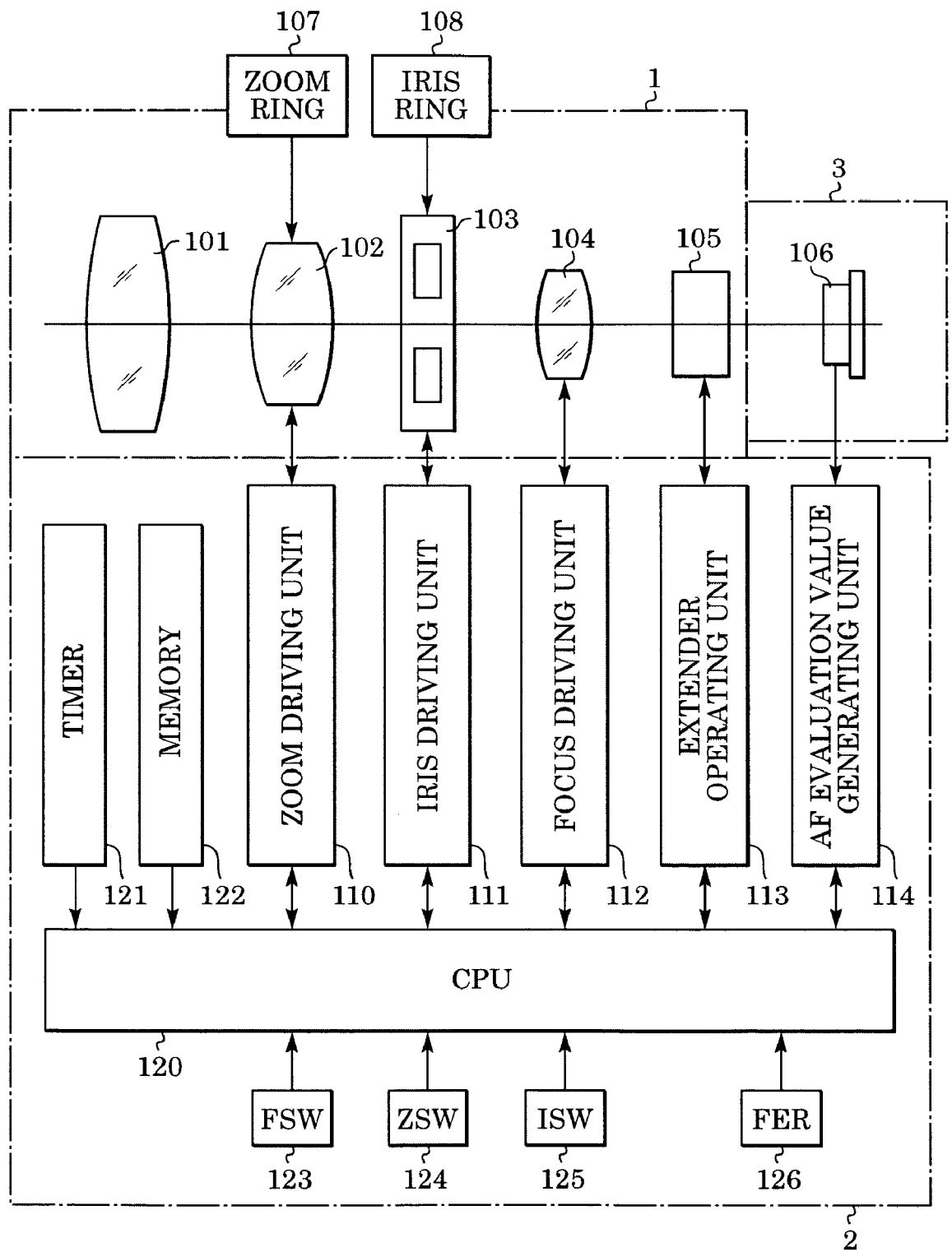
FIG. 1 is a block diagram showing a configuration of a photographing system according to a first embodiment of the present invention.

Hereinafter, a specific configuration and operation of this embodiment will be described. FIG. 1 shows a configuration of a photographing system of this embodiment. The photographing system includes a rear-focus zoom lens apparatus 1, a drive unit (drive controller) 2 attached to the zoom lens apparatus 1, and a photographing apparatus (video camera or television camera) 3 to which the zoom lens apparatus 1 is attached.

A photographic optical system is mounted on the zoom lens apparatus 1. The photographic optical system includes, from an object side, a fixed front lens unit 101, a zoom lens unit 102 for changing magnification, an iris 103, and a focus lens unit 104 for preventing an image plane variation caused by focusing and a change of magnification. Additionally, in this embodiment, an extender lens unit 105 is provided on an image plane side with respect to the focus lens unit 104, but this extender lens unit 105 is not always necessary.

The camera 3 includes an image capturing device 106, such as a CCD sensor or a CMOS sensor which photoelectrically converts an image of an object formed by a flux of light from the photographic optical system. By adjusting the position of the focus lens unit 104, an image of an object is formed on a light receiving plane of the image capturing device 106 while being focused.

A zoom ring 107 is attached to the zoom lens apparatus 1. When a photographer manually rotates the zoom ring 107, the zoom lens unit 102 moves in an optical axis direction through a transmission mechanism (not shown), so that magnification is manually changed.

Further, an iris ring 108 is attached to the zoom lens apparatus 1. When a photographer manually rotates the iris ring 108, the iris 103 is driven in an open or close direction through a transmission mechanism (not shown), so that an f-number can be set.

The drive unit 2 includes a CPU 120 serving as a controller. The CPU 120 controls various operations of the drive unit 2 and performs data processing.

Specifically, the CPU 120 controls a zoom driving unit 110 in response to a signal from a zoom switch unit 124 provided in the drive unit 2. The zoom driving unit 110 includes a motor and a drive circuit therefor (not shown) and drives the zoom lens unit 102 in response to a control signal from the CPU 120. With this operation, magnification can be changed by servo zooming.

Also, the CPU 120 controls an iris driving unit 111 in response to a signal from an iris switch unit 125 provided in the drive unit 2. The iris driving unit 111 includes a motor and a drive circuit therefor (not shown) and drives the iris 103 in response to a control signal from the CPU 120.

Further, the CPU 120 controls a focus driving unit 112 in response to a signal from a focus electronic ring unit 126 provided in the drive unit 2. The focus driving unit 112 includes a motor and a drive circuit therefor (not shown) and drives the focus lens unit 104 in response to a control signal from the CPU 120.

Also, the drive unit 2 includes an extender operating unit 113 for switching between 1×magnification and 2×magnification of the extender lens unit 105 in response to an operation on an extender lever (not shown).

Further, a timer 121 and a memory 122 are connected to the CPU 120. The CPU 120 manages time and performs operations for various controls by referring to count results generated by the timer 121 and data in the memory 122.

The memory 122 stores tracking curves in a form of table data, each tracking curve indicating a position of the focus lens unit 104 relative to a position of the zoom lens unit 102. The tracking curve is used for preventing an image plane variation caused by a change in magnification. In this embodiment, a plurality of tracking curves are stored in the memory 122 as described below.

In the camera 3, various processes are performed on an output signal from the image capturing device 106, so that a video signal is generated. The video signal is recorded on a recording medium set in the camera 3, such as a video tape, a semiconductor memory, a magnetic disk, or an optical disk.

On the other hand, an AF evaluation value generating unit 114 provided in the drive unit 2 captures a video signal from the camera 3 and extracts a high-frequency component of the video signal so as to generate an AF evaluation value indicating a contrast state of a captured image. The AF evaluation value corresponds to a focus state of a photographic optical system and becomes higher as an in-focus state is closer. The AF evaluation value is used both for AF control and zoom interlocking control.

The CPU 120 selectively sets a manual focus mode or an AF mode in accordance with a signal from a focus mode switch unit 123 provided in the drive unit 2. In the AF mode, focusing is automatically performed (auto focus) on an object by AF control. In the manual focus mode, focusing is manually performed by a photographer (manual focus).

Figure 2:
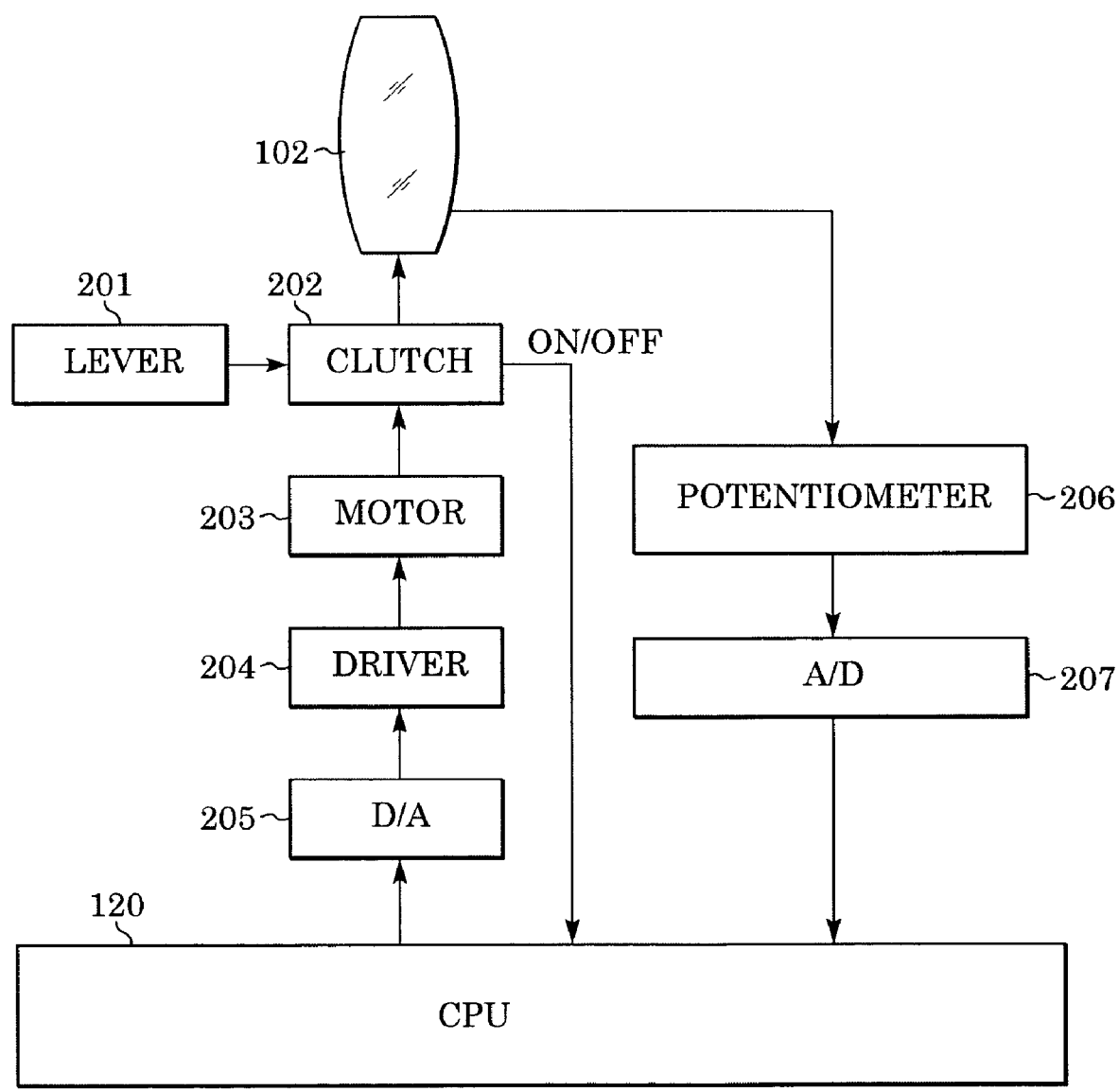
FIG. 2 is a block diagram showing a configuration of a zoom driving unit of a drive unit forming the photographing system according to the first embodiment.

Next, the zoom driving unit 110 is more specifically described with reference to FIG. 2. The CPU 120 transmits a control signal to a motor driver 204 through a D/A converter 205. The motor driver 204 drives a motor 203 and an output thereof is transmitted to the zoom lens unit 102 through a clutch 202 and the zoom ring 107.

A lever 201 is connected to the clutch 202. By operating the lever 201, the clutch 202 is mechanically or electrically turned ON/OFF. When the clutch 202 is ON, an output of the motor 203 is transmitted to the zoom lens unit 102, but when the clutch 202 is OFF, the output of the motor 203 is not transmitted to the zoom lens unit 102. In this state, manual zooming can be performed.

Also, the CPU 120 reads an ON/OFF state of the clutch 202 and determines whether servo control (servo zoom) of the zoom lens unit 120 can be performed. That is, the zoom mode is in a servo zoom mode for realizing servo zoom when the clutch 202 is in an ON-state and the zoom mode is in a manual zoom mode for realizing manual zoom when the clutch 202 is in an OFF-state.

Further, a potentiometer 206 for detecting a position of the zoom lens unit 102 (hereinafter referred to as a zoom position) is connected to the CPU 120. The potentiometer 206 may detect a zoom position directly from the zoom lens unit 102 or may detect it indirectly by detecting a rotation position of the zoom ring 107. An output of the potentiometer 206 is input to the CPU 120 through an A/D converter 207. Accordingly, the CPU 120 can determine (detect) a zoom position and also detect a zoom speed based on a change rate of the zoom position.

In this embodiment, a control signal applied to the D/A converter 205 is a 16-bit signal and controls a zooming operation according to its value: a value 0 corresponds to stop of the zoom lens unit 102; a positive value corresponds to a zooming operation in a tele direction; and a negative value corresponds to a zooming operation in a wide direction. As an absolute value of data is larger, a zoom speed controlled by the CPU 120 is higher.

A position signal output from the A/D converter 207 is also a 16-bit signal. When the value of the signal is 0, the zoom lens unit 102 is positioned at a wide end. When the value thereof is 65535, the zoom lens unit 102 is positioned at a tele end.

Figure 3:
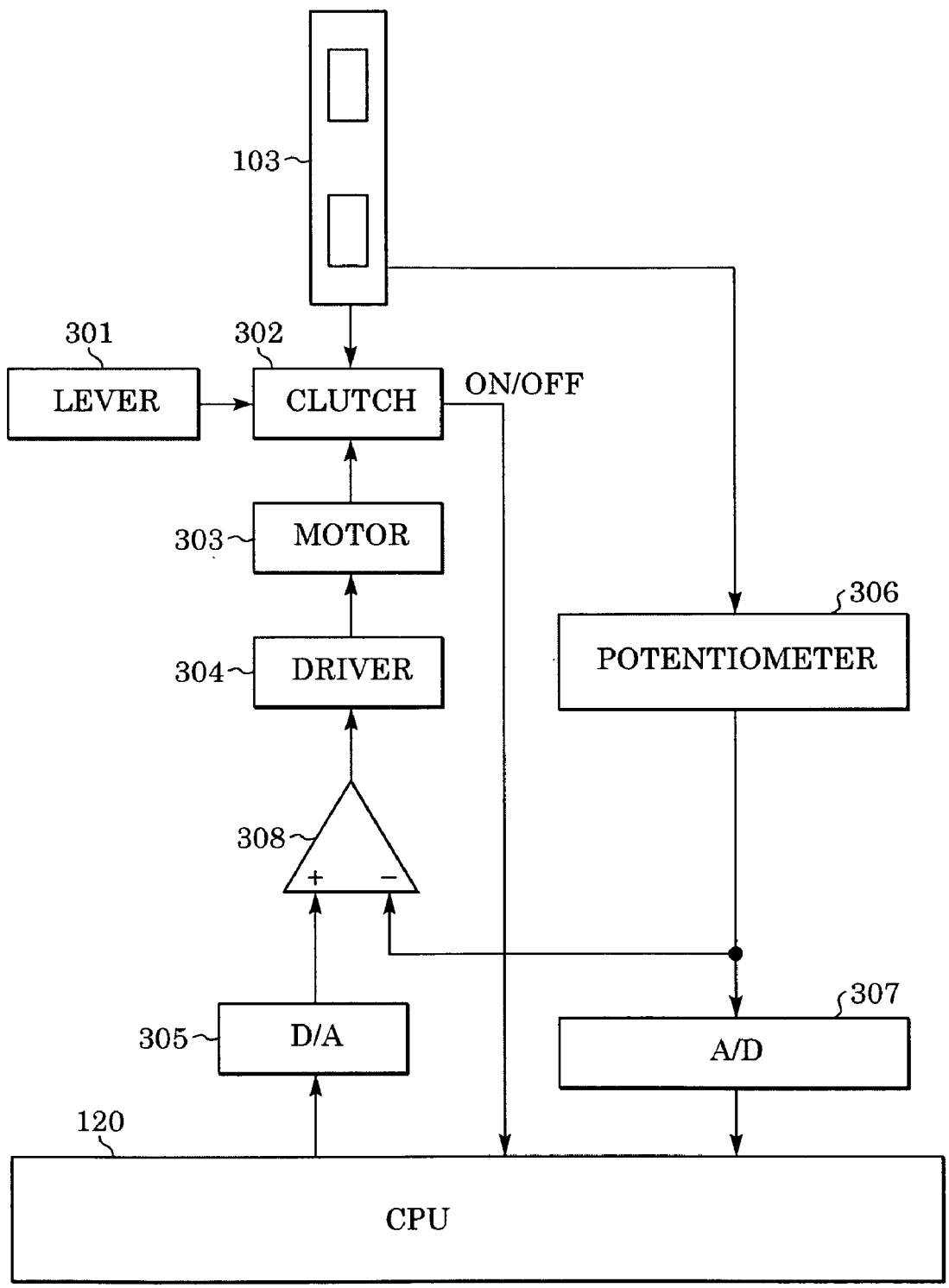
FIG. 3 is a block diagram showing a configuration of an iris driving unit of the drive unit according to the first embodiment.

Next, the iris driving unit 111 is described with reference to FIG. 3. The CPU 120 inputs a control signal serving as a position command signal for the iris 103 to a (+) terminal of a differential amplifier 308 through a D/A converter 305. An output from the differential amplifier 308 is input to a motor driver 304. The motor driver 304 drives a motor 303. An output of the motor 303 is transmitted to the iris 103 through a clutch 302 and the iris ring 108.

A lever 301 is connected to the clutch 302. By operating the lever 301, the clutch 302 is turned ON/OFF. When the clutch 302 is ON, an output of the motor 303 is transmitted to the iris 103, but when the clutch 302 is OFF, the output of the motor 303 is not transmitted to the iris 103. In this state, the iris can be manually adjusted.

Also, the CPU 120 reads an ON/OFF state of the clutch 302 and determines whether servo control of the iris 103 can be performed. That is, the iris mode is in a servo iris mode for realizing servo control when the clutch 302 is in an ON-state and the iris mode is in a manual iris mode for realizing manual adjusting when the clutch 302 is in an OFF-state.

Further, a potentiometer 306 for detecting a position of the iris 103 is connected to the CPU 120. An output of the potentiometer 306 is input to a (−) terminal of the differential amplifier 308. Accordingly, the iris 103 is feedback-controlled in a servo iris mode.

Also, the output of the potentiometer 306 is input to the CPU 120 through an A/D converter 307, so that the CPU 120 can determine (detect) the position of the iris 103.

Herein, a control signal applied to the D/A converter 305 is a 16-bit signal. The iris 103 is closed when the value of the signal is 0, and the iris 103 is opened when the value thereof is 65535. Also, a position signal from the A/D converter 307 is a 16-bit signal. The iris 103 is closed when the value of the position signal is 0, and the iris 103 is opened when the value thereof is 65535.

Figure 4:
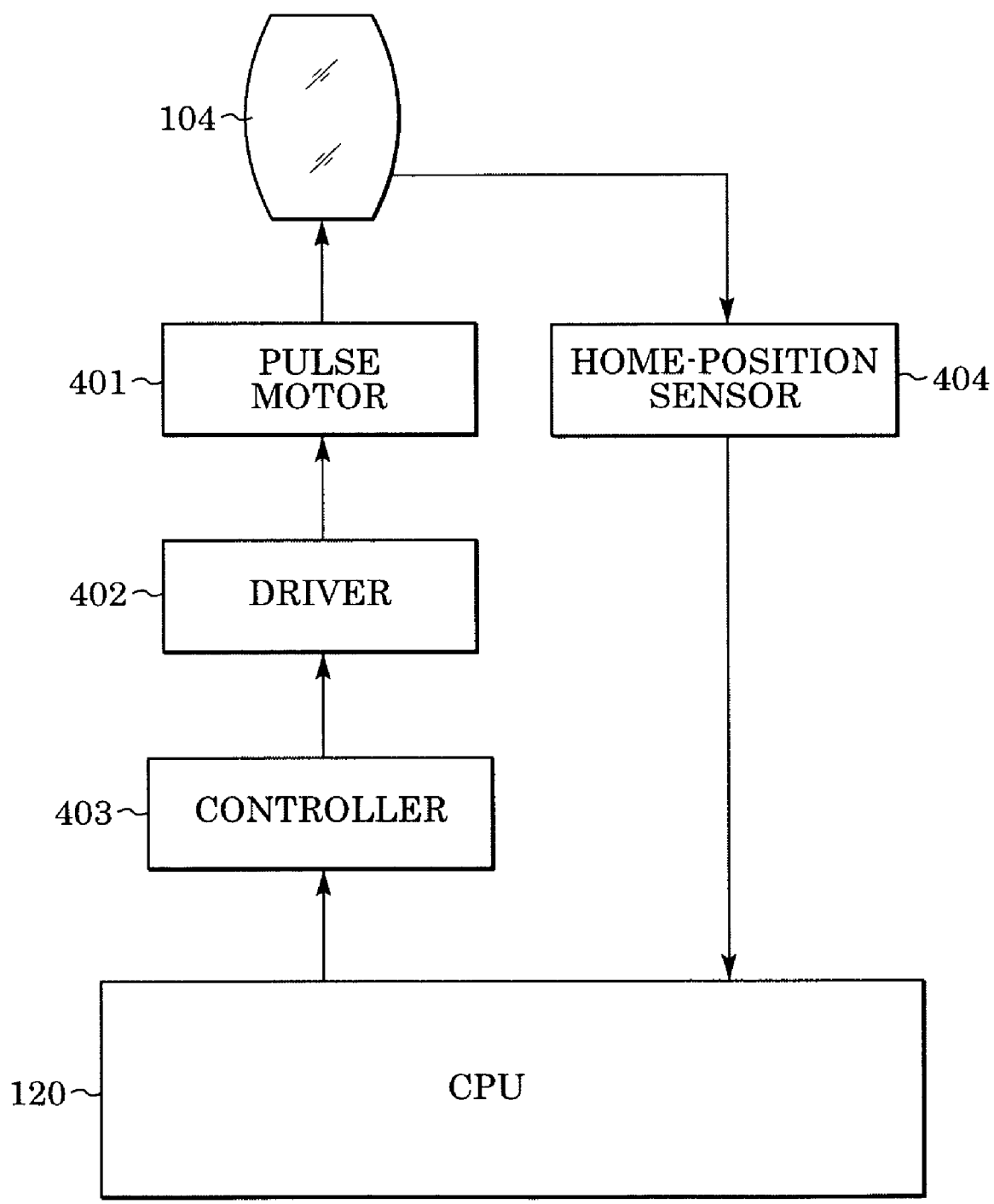
FIG. 4 is a block diagram showing a configuration of a focus driving unit of the drive unit according to the first embodiment.

Next, the focus driving unit 112 is described with reference to FIG. 4. The CPU 120 transmits a control signal to a motor driver 402 through a focus controller 403 and the driver 402 drives a pulse motor 401. An output of the pulse motor 401 is transmitted to the focus lens unit 104 through the focus electronic ring 126.

In this embodiment, a home-position sensor 404 for detecting that the focus lens unit 104 is at a predetermined home position is provided. The CPU 120 initializes a position counter of the focus lens unit 104 based on an output of the home-position sensor 404, so that an absolute position of the focus lens unit 104 can be controlled thereafter.

By setting a frequency and a pulse position, the focus controller 403 drives the pulse motor 401 from a current position to a specified position at the specified frequency. When the frequency is set to 0, the pulse motor 401 stops at a position where the frequency is set to 0. Further, the CPU 120 is capable of reading a position of the focus lens unit 104 (hereinafter referred to as a focus position) at an arbitrary time.

Figure 5:
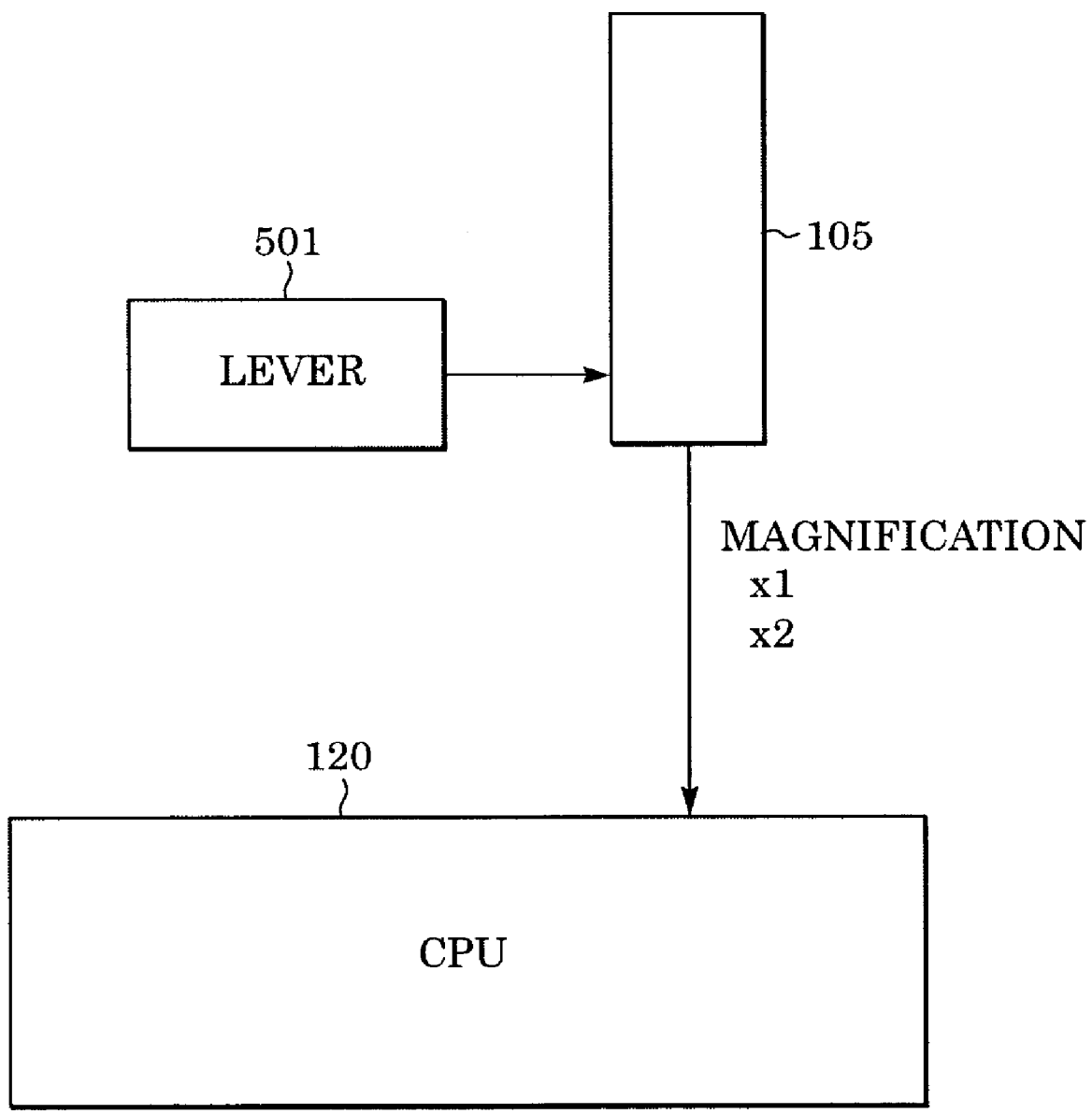
FIG. 5 is a block diagram showing a configuration of an extender operating unit of the drive unit according to the first embodiment.

Next, the extender operating unit 113 is described with reference to FIG. 5. In this embodiment, the extender lens unit 105 includes extenders of 1×magnification and 2×magnification which can be switched between (replaced with) each other. The extender operating unit 113 switches them according to an operation on a lever 501. Also, the extender operating unit 113 outputs a signal indicating that the extender lens unit 105 placed in the photographic optical system is set to 1×magnification or 2×magnification to the CPU 120. With this configuration, the CPU 120 can detect the magnification of the extender lens unit 105 which is currently set.

Figure 6:
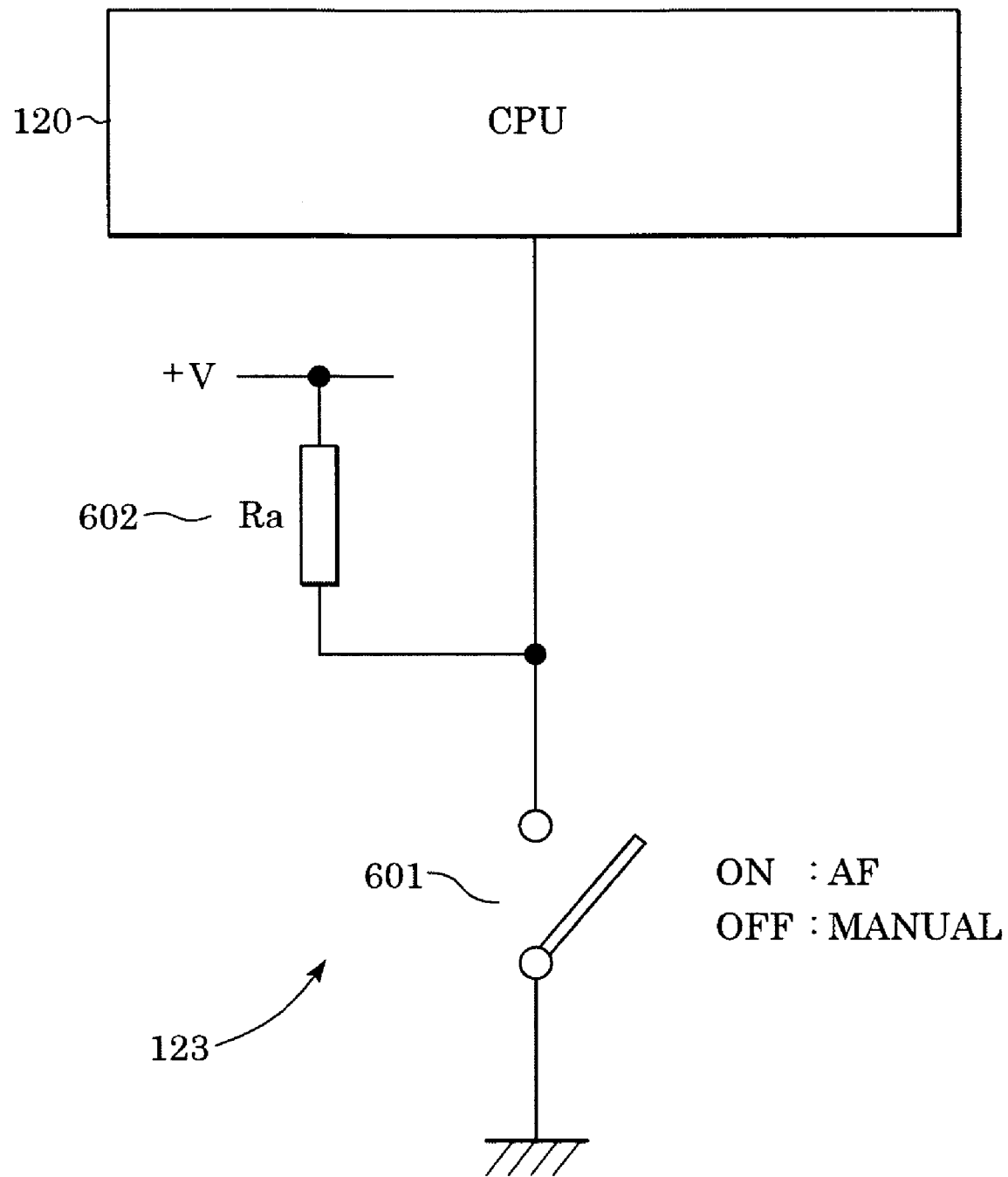
FIG. 6 is a block diagram showing a configuration of a focus mode switch unit of the drive unit according to the first embodiment.

Next, the focus mode switch unit 123 is described with reference to FIG. 6. A focus-mode selecting switch 601 is connected to the CPU 120. The focus-mode selecting switch 601 is connected to a pullup resistor (Ra) 602 and a ground (GND), so that the CPU 120 can detect ON/OFF states of the focus-mode selecting switch 601. When the focus-mode selecting switch 601 is in an ON-state, the focus mode is in an auto focus mode. When the focus-mode selecting switch 601 is in an OFF-state, the focus mode is in a manual focus mode.

Figure 7:
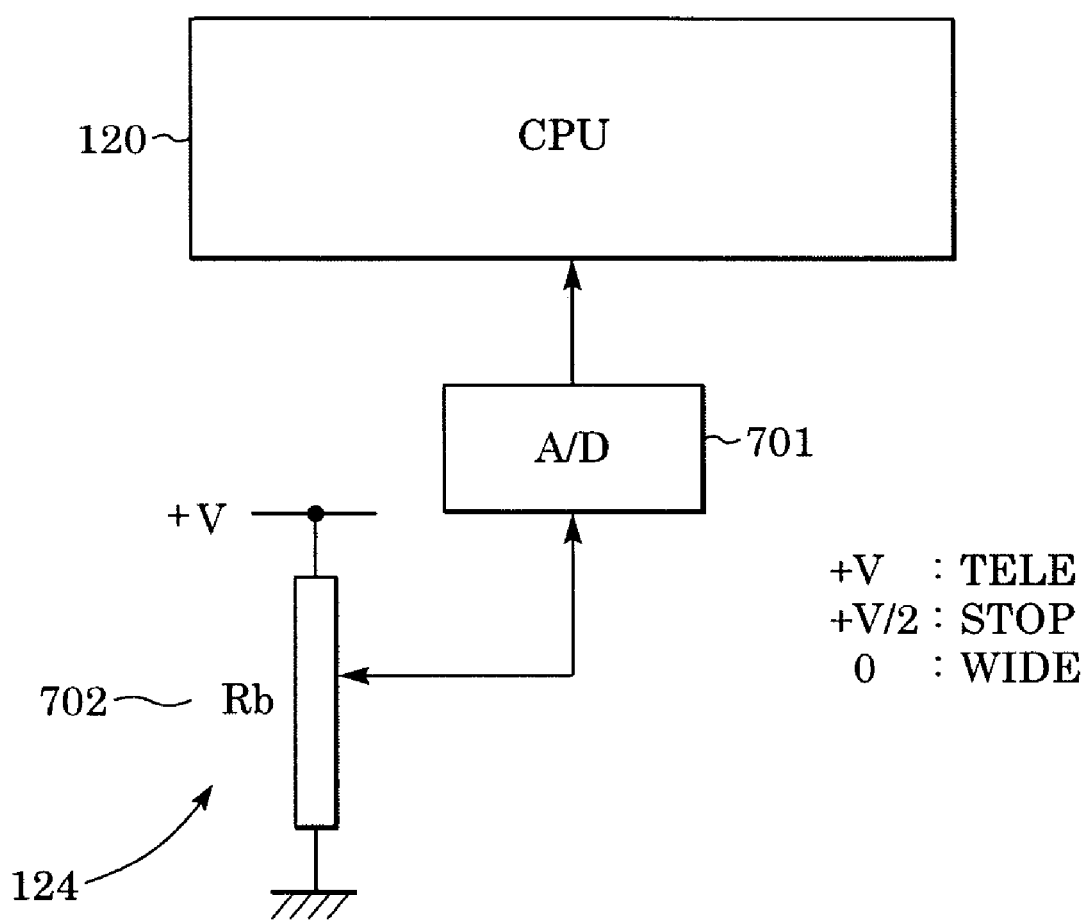
FIG. 7 is a block diagram showing a configuration of a zoom switch unit of the drive unit according to the first embodiment.

Next, the zoom switch unit 124 is described with reference to FIG. 7. The zoom switch unit 124 includes a neutral-recovery seesaw switch (not shown). An output voltage of a potentiometer (Rb) 702 varies according to an operation on the seesaw switch. The CPU 120 captures an output voltage of the potentiometer (Rb) 702 through an A/D converter 701 and outputs a control signal to the zoom driving unit 110 so that the zoom lens unit 102 is driven at a speed and in a direction according to the output of the A/D converter 701. The output of the A/D converter 701 will be described below.

Figure 8:
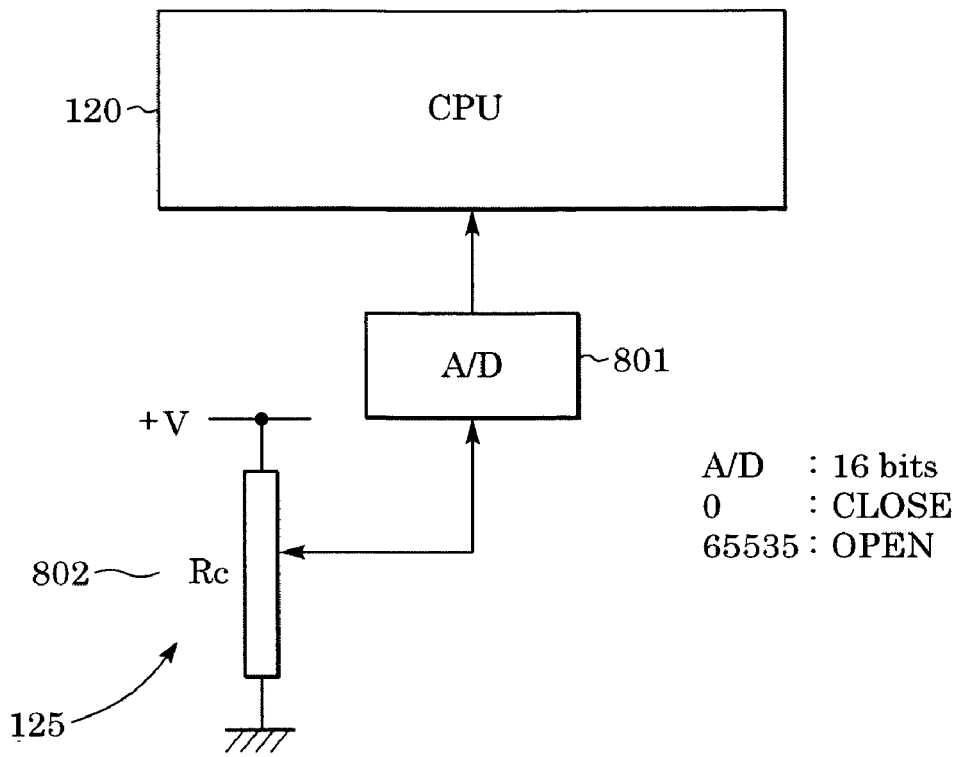
FIG. 8 is a block diagram showing a configuration of an iris switch unit of the drive unit according to the first embodiment.

Next, the iris switch unit 125 is described with reference to FIG. 8. The iris switch unit 125 includes a dial (not shown). An output voltage of a potentiometer (Rc) 802 varies according to an operation on this dial. The CPU 120 can detect the output voltage of the potentiometer (Rc) 802 by capturing an output of an A/D converter 801. A signal from the A/D converter 801 is a 16-bit signal, in which a signal value 0 corresponds to a close command signal and a signal value 65535 corresponds to an open command signal. The CPU 120 outputs a control signal to the iris driving unit 111 so that the iris 103 is driven in a direction according to the output from the A/D converter 801.

Figure 9:
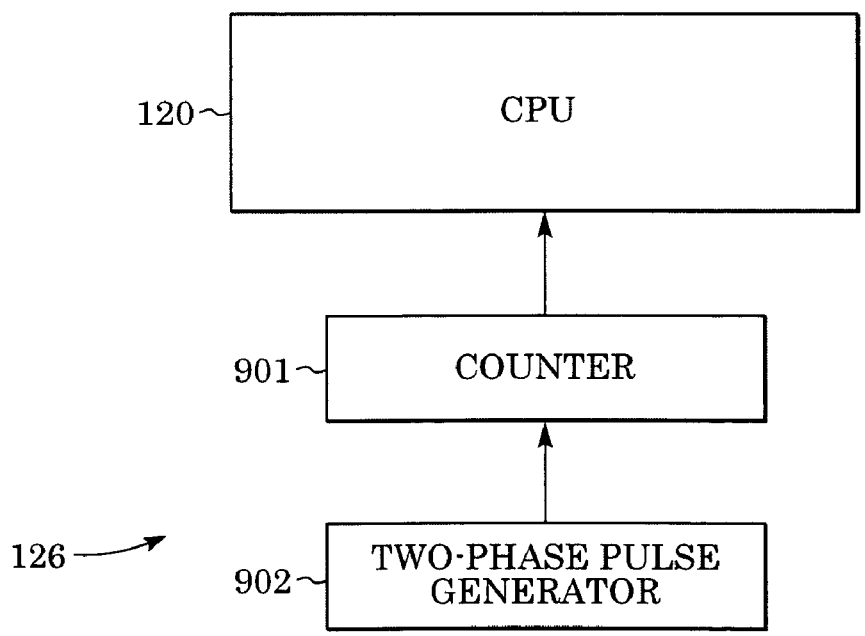
FIG. 9 is a block diagram showing a configuration of a focus electronic ring unit of the drive unit according to the first embodiment.

Next, the focus electronic ring unit 126 is described with reference to FIG. 9. The focus electronic ring unit 126 includes a focus operating ring (not shown). According to a rotating operation on the focus operating ring, two-phase pulse signals are output from a two-phase pulse generator 902. A counter 901 detects a direction of a phase shift between the two-phase pulse signals and counts pulses, and then inputs a signal indicating a count value to the CPU 120. The CPU 120 outputs a control signal to the focus driving unit 112 so that the focus lens unit 104 is driven in a direction according to an increase or decrease in the count value.

Figure 10A:
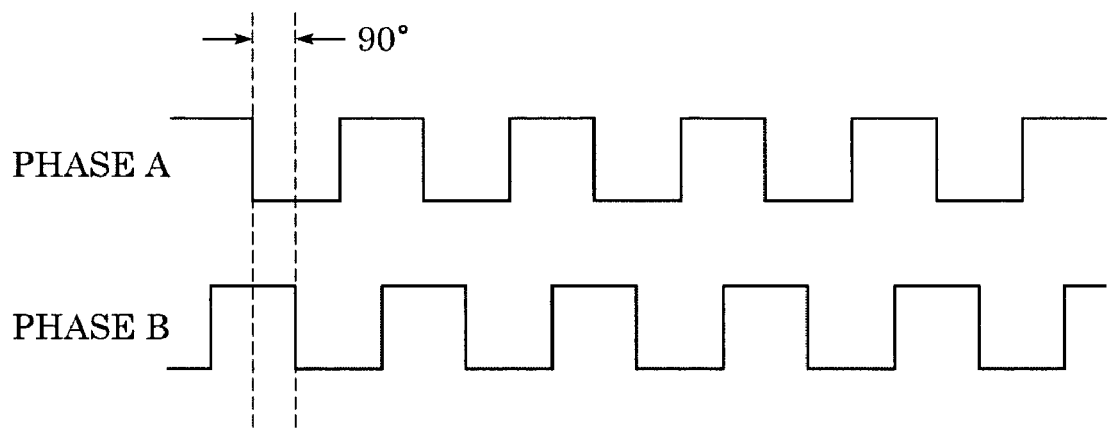
FIGS. 10A and 10B are schematic views showing pulse counts in the focus electronic ring unit.
Figure 10B:
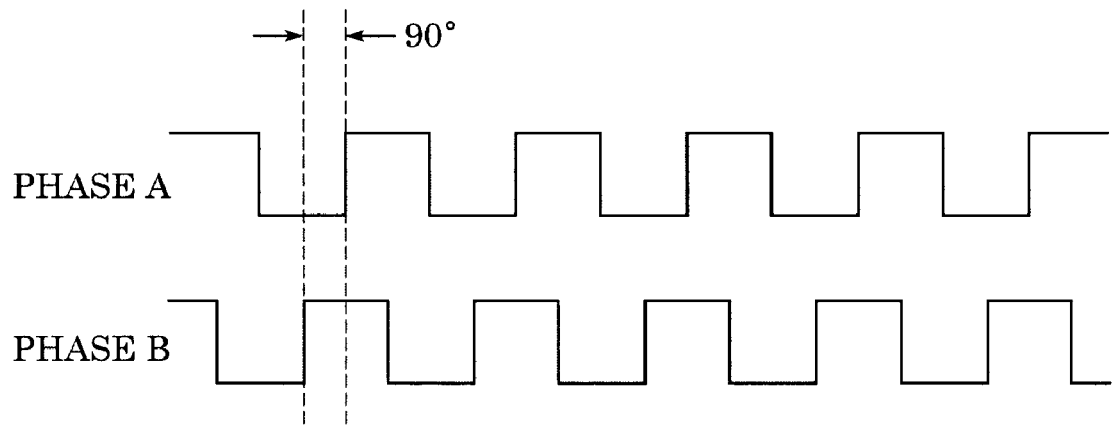

Now, an output format of the two-phase pulse generator 902 is described with reference to FIGS. 10A and 10B. As shown in FIG. 10A, when a phase A leads a phase B by 90°, the counter 901 performs up-count. On the other hand, when the phase B leads the phase A by 90° as shown in FIG. 10B, the counter 901 performs down-count.

Figure 11:
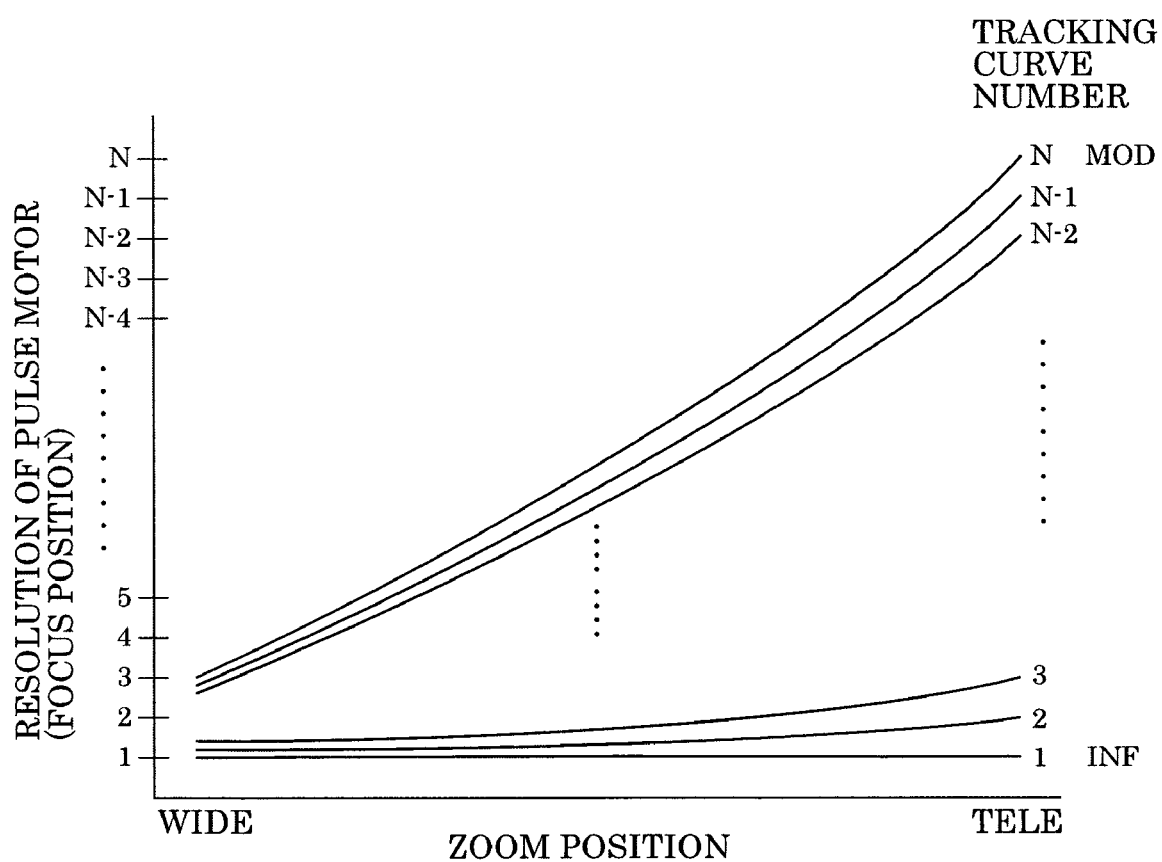
FIG. 11 is a schematic view showing tracking curves stored in the drive unit according to the first embodiment.

Next, a tracking curve is described with reference to FIG. 11. A resolution of a theoretical curve in a tracking curve (that is, the number of tracking curves) depends on the amount of movement of the focus lens unit 104 required for focusing on an object from INF to MOD at the tele end and on a minimum step width obtained from a focal depth. Herein, when the resolution at the tele end of the pulse motor 401 is matched with the resolution of the theoretical curve, the resolution of the pulse motor 401 is difficult to be represented in the wide side. Therefore, positions of the pulse motor 401 (correspond to positions of the focus lens unit 104) depending on a zoom position are approximate at a pulse position where a theoretical curve exists. At this time, data of a focus position relative to a zoom position is stored in the memory 122 in a form of a number of driving pulses of the pulse motor 401 based on the home position of the focus lens unit 104.

Next, a relationship between a tracking curve number and a number of driving pulses of the pulse motor 401 is described with reference to FIG. 11. For example, the resolution of the pulse motor 401 corresponds to N pulses at the tele end, whereas the resolution of the pulse motor 401 corresponds to only three pulses at the wide end. Therefore, at the wide end, tracking curve numbers 1 to K-1 are associated with a position of a first pulse, tracking curve numbers K to N-1 are associated with a position of a second pulse, and a tracking number N is associated with a position of a third pulse. Incidentally, K is a tracking curve number which is smaller than N.

In this way, when the pulse positions of the pulse motor 401 and tracking curve numbers are not in a one-to-one relationship, a smallest number among a plurality of tracking curve numbers associated with a pulse position of the pulse motor 401 is stored as a tracking curve number for the pulse position. For example, when tracking curve numbers 10 to 15 are associated with a pulse position, a tracking curve number 10 is stored.

In this embodiment, a tracking curve number at the INF end is 1 and that at the MOD end is N. Alternatively, the tracking curve number at the MOD end may be 1 and that at the INF end may be N.

Further, a largest number among the plurality of tracking curve numbers associated with a pulse position of the pulse motor 401 may be stored as a tracking curve number for the pulse position. For example, when tracking curve numbers 10 to 15 are associated with a pulse position, a tracking curve number 15 is stored.

Next, in a case where pulse positions and tracking curve numbers are not in a one-to-one relationship, a method for searching for a pulse position (PulseInMemory) of the pulse motor 401 and a tracking curve number (TrackingNoInMemory) stored in the memory 122 based on a current tracking curve number (CurTrackingNo) is described.

Each pulse position PulseInMemory corresponding to a current position of the zoom lens unit 102 exists on the memory 122, but the tracking curve numbers TrackingNoInMemory in the memory 122 are discrete as is understood from the above description. An example of this state is described below.

Assume that the following data of pairs of pulse positions PulseInMemory and tracking curve numbers TrackingNoInMemory exists in the memory 122.

| Pulse position PulseInMemory | Tracking curve number TrackingNoInMemory |
|---|---|
| 1 | 1 |
| 2 | 3 |
| 3 | 7 |

When a current tracking curve number CurTrackingNo is 2, pulse position PulseInMemory corresponding to the current tracking curve number CurTrackingNo does not exist. In this case, a tracking curve number TrackingNoInMemory which does not exceed the current tracking curve number CurTrackingNo 2 existing in the memory 122 is adopted. That is, a pulse position PulseInMemory 1 corresponding to a tracking curve number TrackingNoInMemory 1 is adopted. Alternatively, a tracking curve number TrackingNoInMemory 3, which is the smallest among the tracking curve numbers TrackingNoInMemory 2 or larger, may be adopted.

Further, depending on a zoom position, a tracking curve number TrackingNoInMemory in the memory 122 to be adopted may be a number which does not exceed the current tracking curve number CurTrackingNo or a number which is the smallest among the numbers equal to or larger than the current tracking curve number CurTrackingNo.

Figure 12:
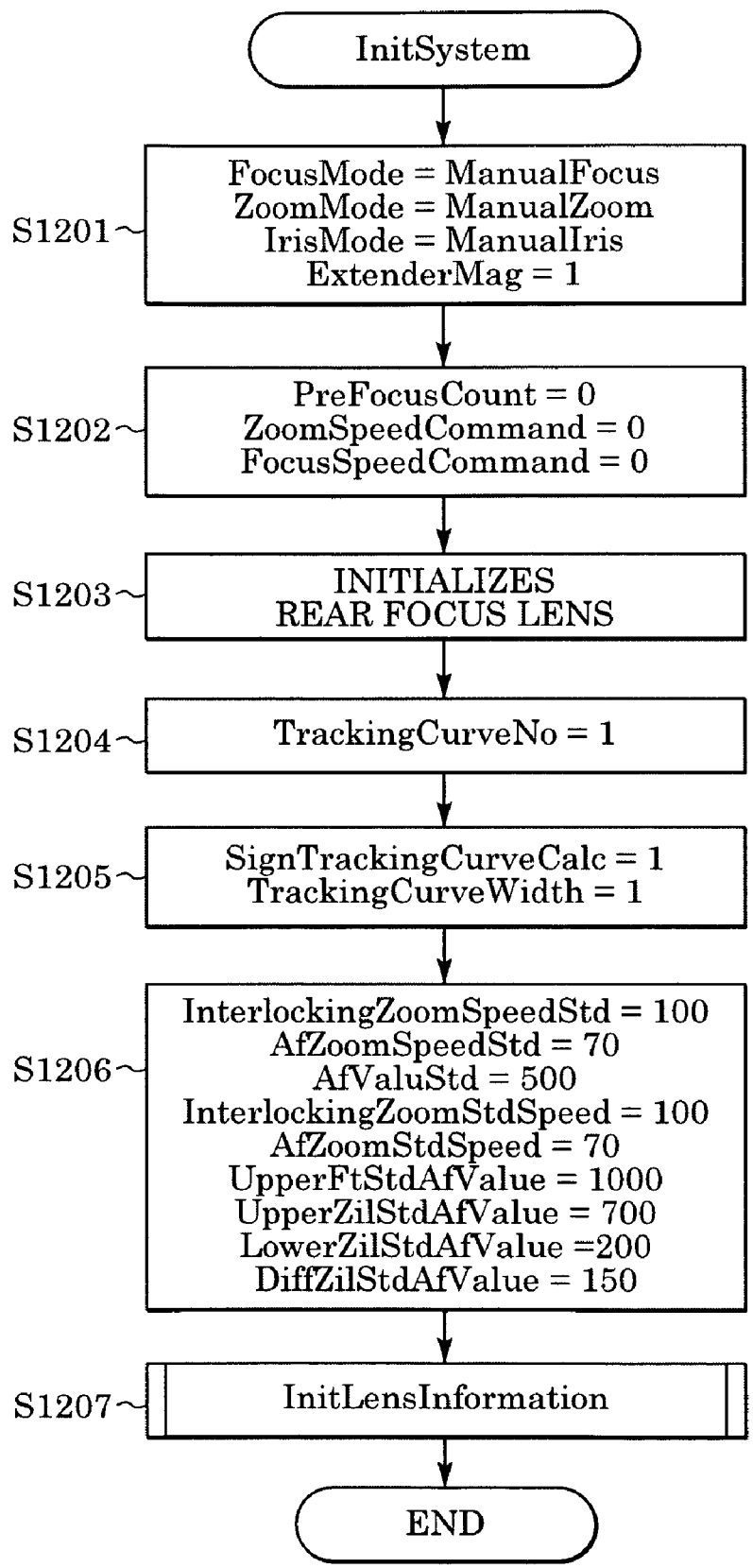
FIG. 12 is a flowchart showing an initializing process performed by the drive unit (CPU) according to the first embodiment.

Hereinafter, an operation of the CPU 120 is described. First, an initialization process InitSystem is described with reference to FIG. 12. In step S1201, the control mode of each lens unit and magnification information of the extender lens unit 105 are initialized as follows.
FocusMode=ManualFocus . . . manual focus mode
ZoomMode=ManualZoom . . . manual zoom mode
IrisMode=ManualIris . . . manual iris mode
ExtenderMag=1 . . . extender 1×magnification Then, the process proceeds to step S1202.

In step S1202, a speed command value of each lens unit is initialized.
PreFocusCount=0 . . . data for calculating a focus speed command
ZoomSpeedCommand=0 . . . zoom speed command value
FocusSpeedCommand=0 . . . focus speed command value Then, the process proceeds to step S1203.

In step S1203, the focus lens unit 104 is initialized. Specifically, the pulse motor 401 is driven to allow the focus lens unit 104 to move to a position where the home position sensor 404 is turned ON (to the home position). In this embodiment, the home position is a position where an infinite object is focused on. Then, the process proceeds to step S1204.

In step S1204, a current tracking curve number is set.
TrackingCurveNo=1 . . . curve number is 1

Then, the process proceeds to step S1205.

In step S1205, data for calculating a tracking curve number is initialized.
SignTrackingCurveCalc=1 . . . sign data for calculation
TrackingCurveWidth=1 . . . number movement width Then, the process proceeds to step S1206.

In step S1206, a zoom standard speed for determining which is to be selected as image plane correction control from among AF control, zoom interlocking control, and curve fixed control is set. Also, a threshold of a difference between previous and present AF evaluation values is set, the threshold being a standard of determination for changing a tracking curve. This step is performed both in this embodiment and a second embodiment which will be described below. Setting is performed as follows.
InterlockingZoomSpeedStd=100 . . . zoom standard speed depending on AF evaluation value
AfZoomSpeedStd=70 . . . zoom standard speed depending on AF evaluation value
AfvalueStd=500 . . . standard AF evaluation value for switching dependence on AF evaluation value
InterlockingZoomStdSpeed=100 . . . when depending on zoom speed: zoom interlocking—curve fixed
AfZoomStdSpeed=70 . . . when depending on zoom speed: AF—zoom interlocking
UpperFtStdAfValue=1000 . . . when depending on AF evaluation value: AF—curve fixed
UpperZilStdAfValue=700 . . . when depending on AF evaluation value: curve fixed—zoom interlocking
LowerZilStdAfValue=200 . . . when depending on AF evaluation value: zoom interlocking—AF
DiffZilStdAfValue=150 . . . AF evaluation value for tracking curve movement (differential value)

Then, the process proceeds to step S1207.

In step S1207, a subroutine InitLensInformation is called in order to initialize lens information. Then, the subroutine IntiSystem is completed.

Figure 13:
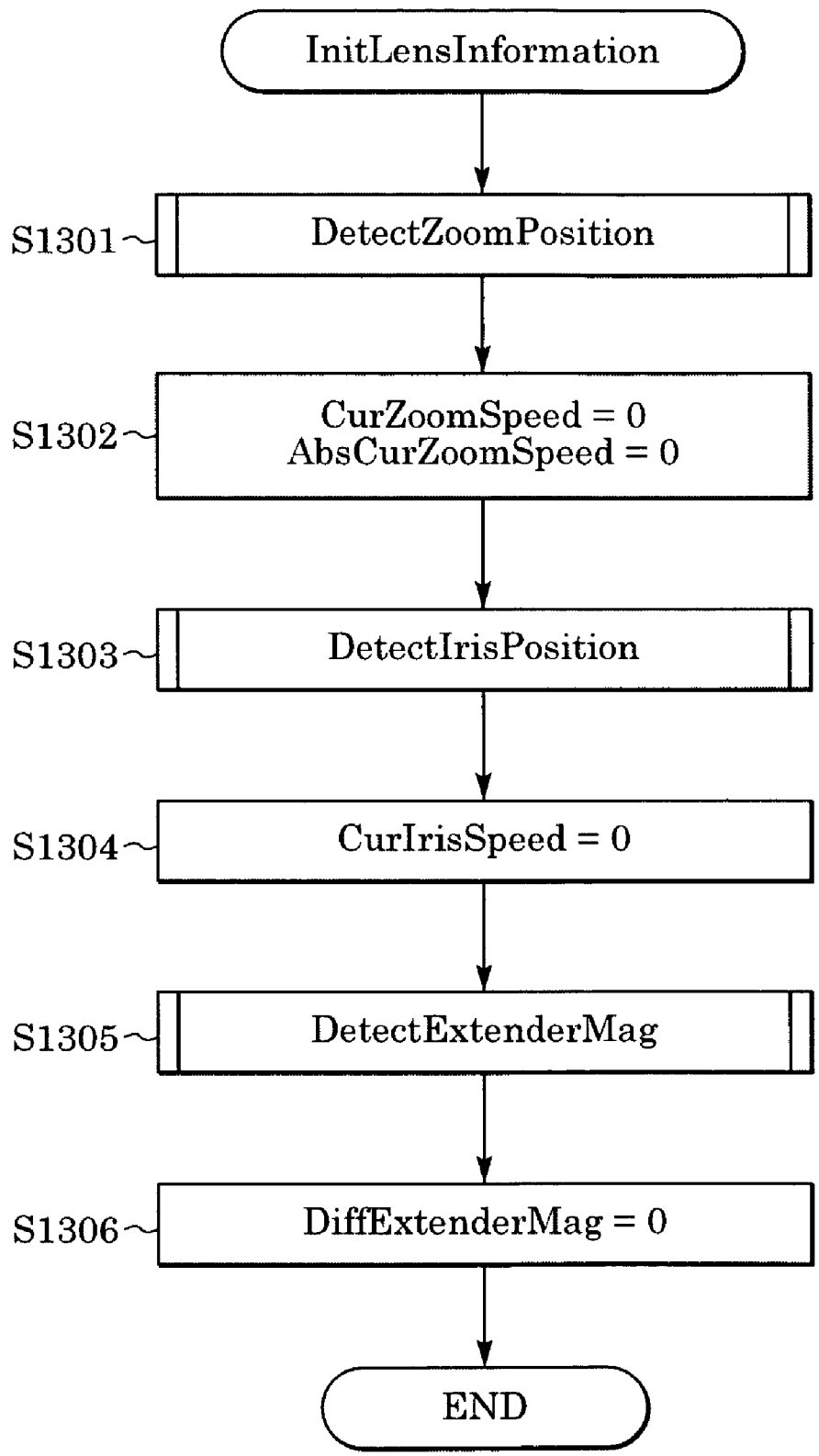
FIG. 13 is a flowchart showing an initializing process of lens information by the CPU.

Next, the subroutine InitLensInfomration for initializing lens information is described with reference to FIG. 13. In step S1301, a subroutine DetectZoomPosition for detecting a zoom position and calculating a zoom speed is called. Then, the process proceeds to step S1302. In step S1302, a current speed data of the zoom lens unit 102 is initialized.
CurZoomSpeed=0 . . . current zoom speed with sign (direction)
AbsCurZoomSpeed=0 . . . current absolute zoom speed Then, the process proceeds to step S1303.

In step S1303, a subroutine DetectIrisPosition is called for detecting an iris position and calculating an iris speed. Then, the process proceeds to step S1304. In step S1304, a current speed data of the iris 103 is initialized.
CurIrisSpeed=0 . . . current iris speed with sign Then, the process proceeds to step S1305.

In step S1305, a subroutine DetectExtenderMag for detecting magnification of the extender is called. Then, the process proceeds to step S1306. In step S1306, the amount of difference in the magnification of the extender is initialized.
DiffExtenderMag=0

Then, the subroutine InitLensInfomration is completed.

Figure 14:
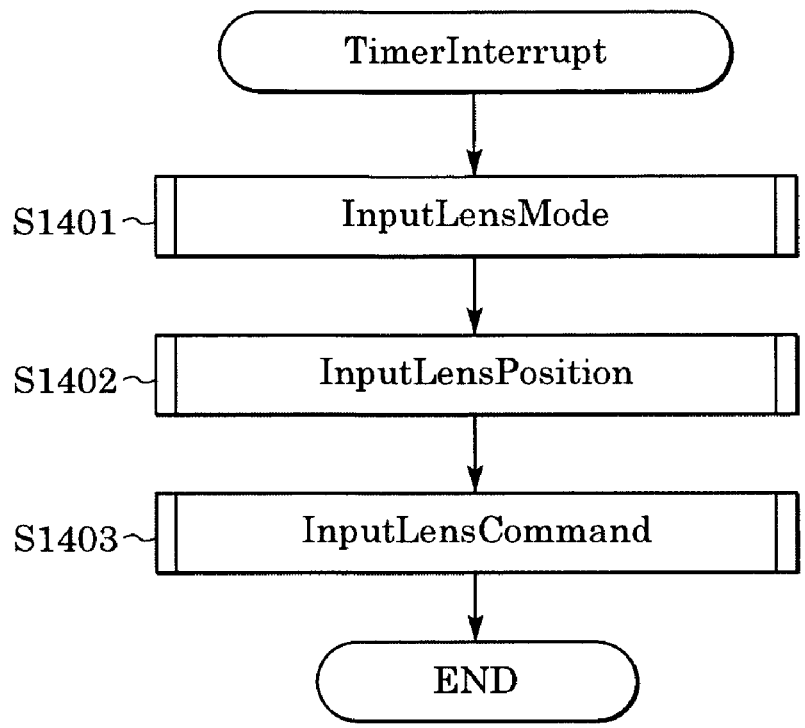
FIG. 14 is a flowchart showing a timer interrupting process by the CPU.

Next, an interrupt routine for a timer interrupt process is described with reference to FIG. 14. In step S1401, a subroutine InputLensMode for inputting a lens mode is called. Then, the process proceeds to step S1402. In step S1402, a subroutine InputLensPosition for inputting a lens position is called. Then, the process proceeds to step S1403.

In step S1403, a subroutine InputLensCommnad for inputting a lens command is called. Then, the interrupt routine is completed.

Figure 15:
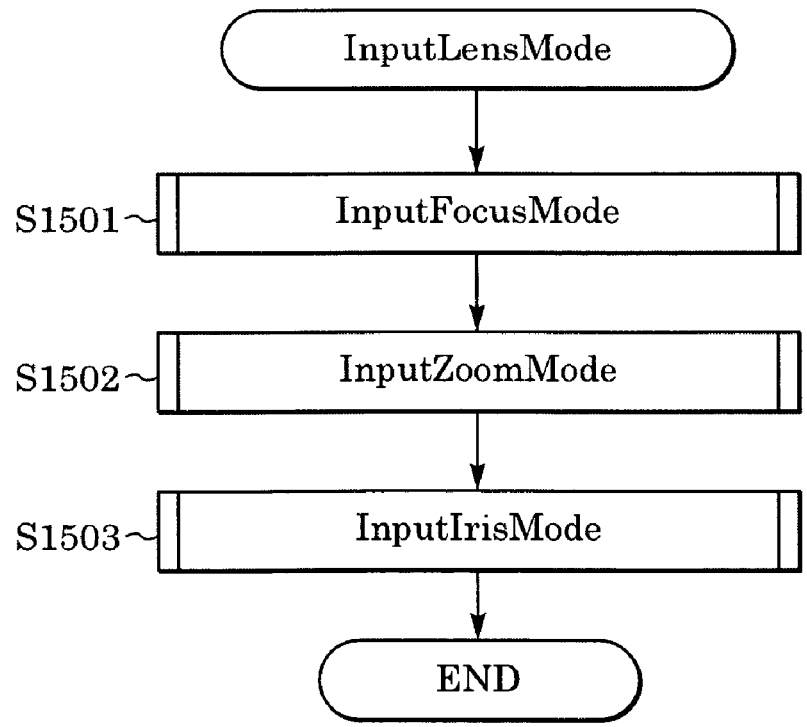
FIG. 15 is a flowchart showing a lens-mode inputting process by the CPU.

Next, the above-mentioned subroutine InputLensMode for inputting a lens mode is described with reference to FIG. 15. In step S1501, a focus mode input routine InputFocusMode is called. Then, the process proceeds to step S1502. In step S1502, a zoom mode input routine InputZooomMode is called. Then, the process proceeds to step S1503. In step S1503, an iris mode input routine InputIrisMode is called. Then, the subroutine InputLensMode is completed.

Figure 16:
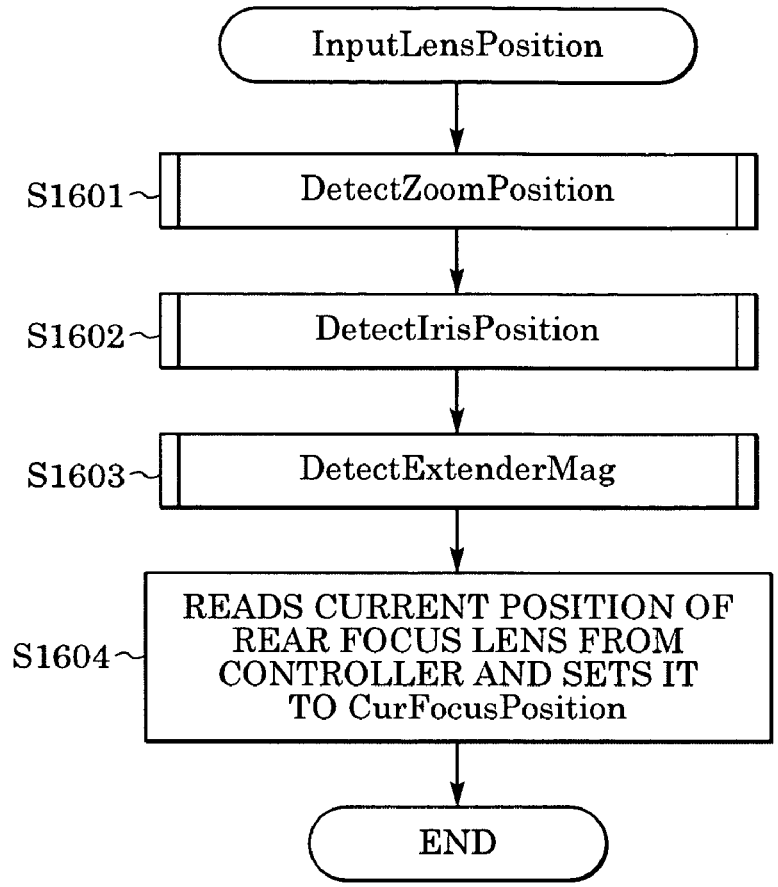
FIG. 16 is a flowchart showing a lens-position inputting process by the CPU.

Next, the above-mentioned subroutine InputLensPosition for inputting a lens position is described with reference to FIG. 16. In step S1601, the subroutine DetectZoomPosition for detecting a zoom position and calculating a zoom speed is called. Then, the process proceeds to step S1602. In step S1602, the subroutine DetectIrisPosition for detecting an iris position and calculating an iris speed is called. Then, the process proceeds to step S1603. In step S1603, the subroutine DetectExtenderMag for detecting an extender magnification and calculating difference in magnification is called. Then, the process proceeds to step S1604. In step S1604, a current position of the rear focus lens unit 104 is read by the focus controller 403 and the current position is set to CurFocusPosition. Then, the subroutine InputLensPosition is completed.

Figure 17:
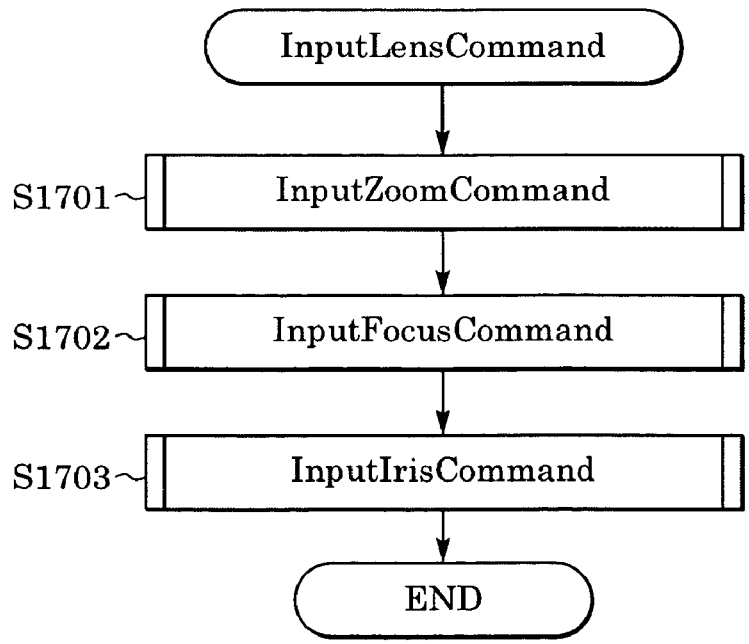
FIG. 17 is a flowchart showing a lens-command inputting process by the CPU.

Next, the above-mentioned subroutine InputLensCommand for inputting a lens command is described with reference to FIG. 17. In step S1701, a subroutine InputZoomCommand for inputting a zoom command is called. Then, the process proceeds to step S1702. In step S1702, a subroutine InputFocusCommand for inputting a focus command is called. Then, the process proceeds to step S1703. In step S1703, a subroutine InputIrisCommand for inputting an iris command is called. Then, the subroutine InputLensCommand is completed.

Figure 18:
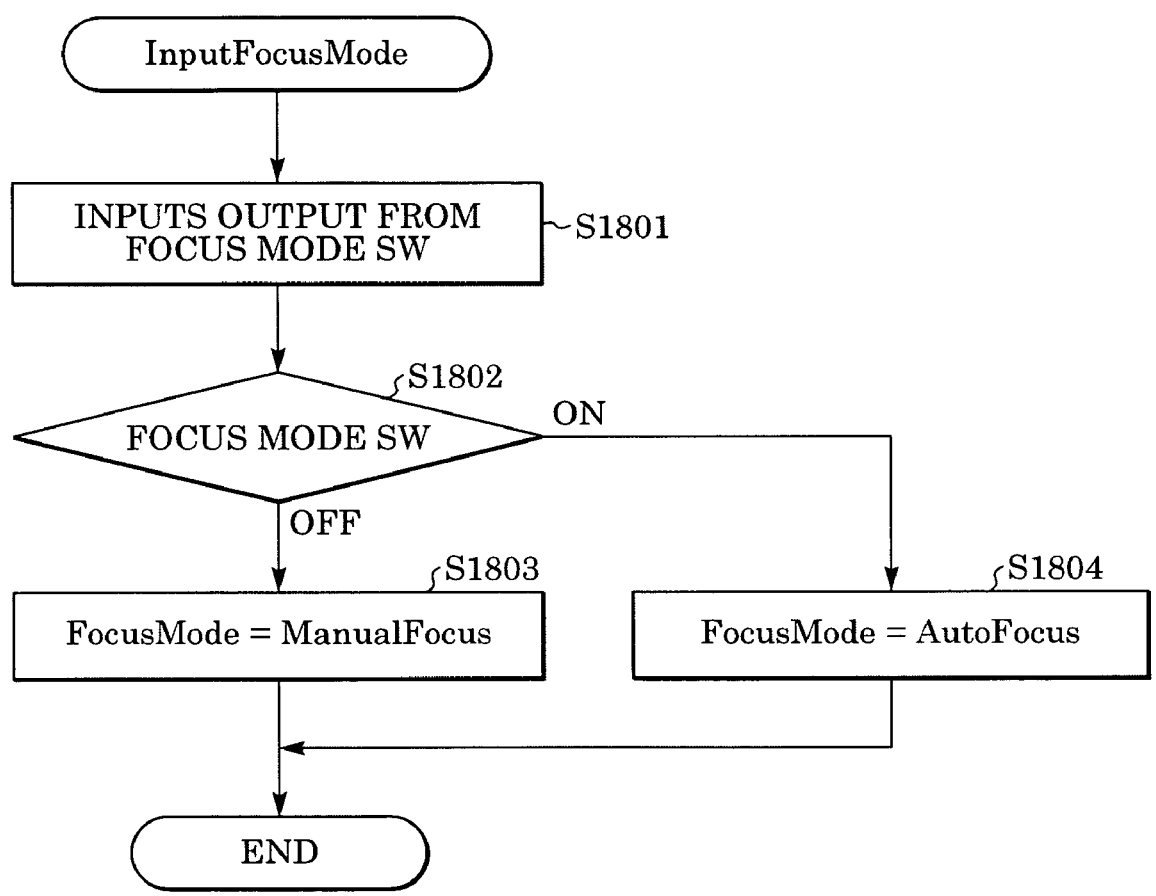
FIG. 18 is a flowchart showing a focus-mode inputting process by the CPU.

Next, the subroutine InputFocusMode for inputting a focus mode is described with reference to FIG. 18. In step S1801, an output from the focus mode switch 601 is input. Then, the process proceeds to step S1802. In step S1802, an ON/OFF state of the focus mode switch 601 is checked. If the focus mode switch 601 is ON, the process proceeds to step S1804. In step S1804, the focus mode is set to the auto focus mode.
FocusMode=AutoFocus Then, the subroutine InputFocusMode is completed.

If it is determined that the focus mode switch 601 is OFF in step S1802, the process proceeds to step S1803.

In step S1803, the focus mode is set to the manual focus mode.
FocusMode=ManualFocus Then, the subroutine InputFocusMode is completed.

Figure 19:
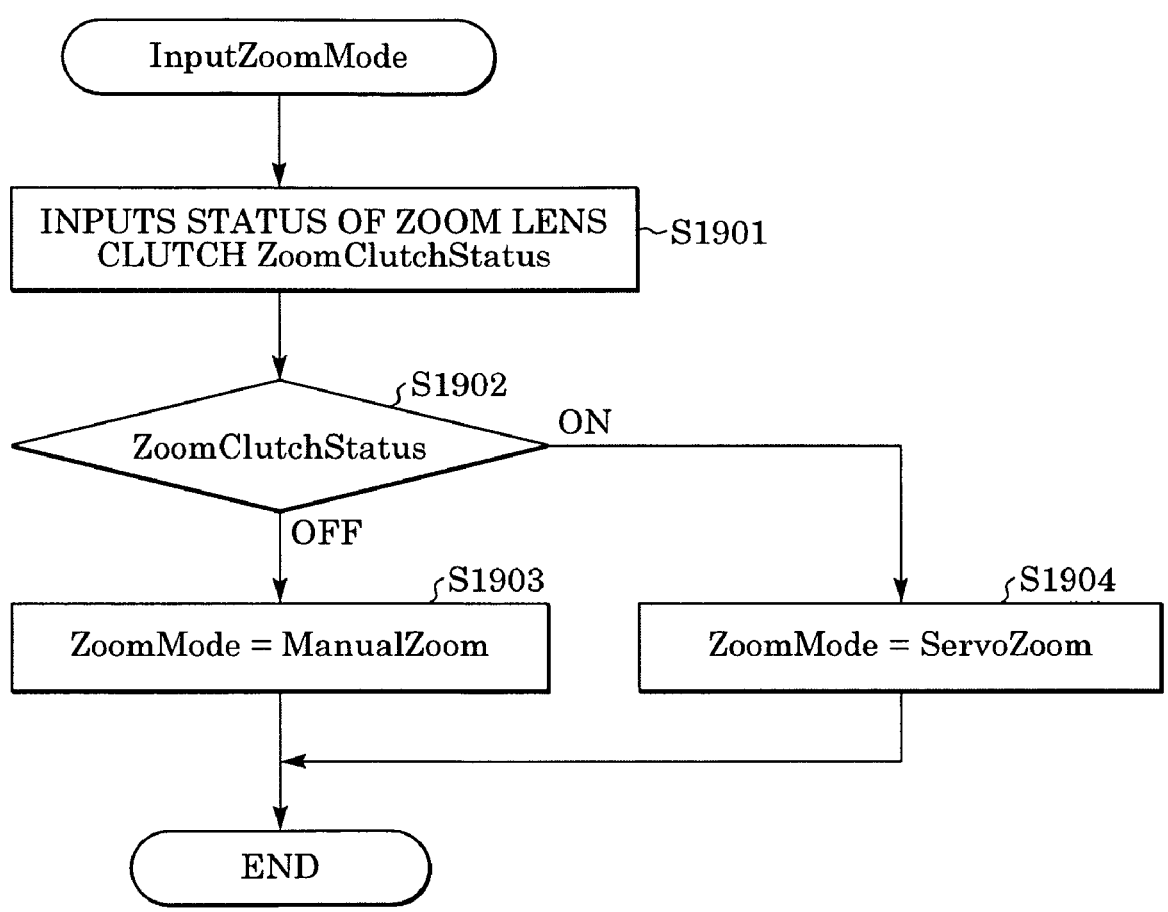
FIG. 19 is a flowchart showing a zoom-mode inputting process by the CPU.

Next, the subroutine InputZoomMode for inputting a zoom mode is described with reference to FIG. 19. In step S1901, a status of the zoom lens clutch 202 ZoomClutchStatus is input. Then, the process proceeds to step S1902. In step S1902, ZoomClutchStatus is checked. If ZoomClutchStatus is ON, the process proceeds to step S1904. In step S1904, the zoom mode is set to the servo zoom mode.
ZoomMode=ServoZoom Then, the subroutine InputZoomMode is completed.

If it is determined that ZoomClutchStatus is OFF in step S1902, the process proceeds to step S1903. In step S1903, the zoom mode is set to the manual zoom mode.
ZoomMode=ManualZoom Then, the subroutine InputZoomMode is completed.

Figure 20:
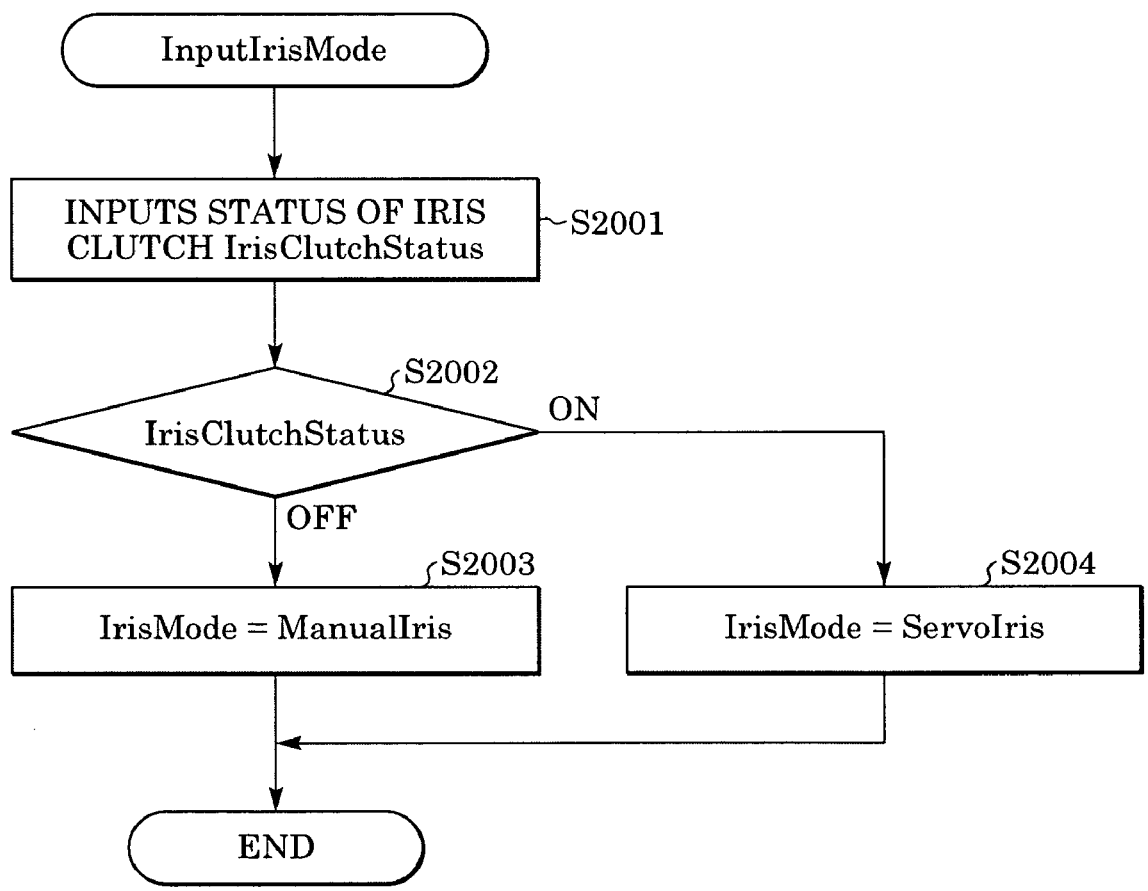
FIG. 20 is a flowchart showing an iris-mode inputting process by the CPU.

Next, the subroutine InputIrisMode for inputting an iris mode is described with reference to FIG. 20. In step S2001, a status of the iris clutch 302 IrisClutchStatus is input. Then, the process proceeds to step S2002. In step S2002, IrisClutchStatus is checked. If IrisClutchStatus is ON, the process proceeds to step S2004. In step S2004, the iris mode is set to the servo iris mode.

IrisMode=ServoIris

Then, the subroutine InputIrisMode is completed.

If it is determined that IrisClutchStatus is OFF in step S2002, the process proceeds to step S2003. In step S2003, the iris mode is set to the manual iris mode.

IrisMode=ManualIris

Then, the subroutine InputIrisMode is completed.

Figure 21:
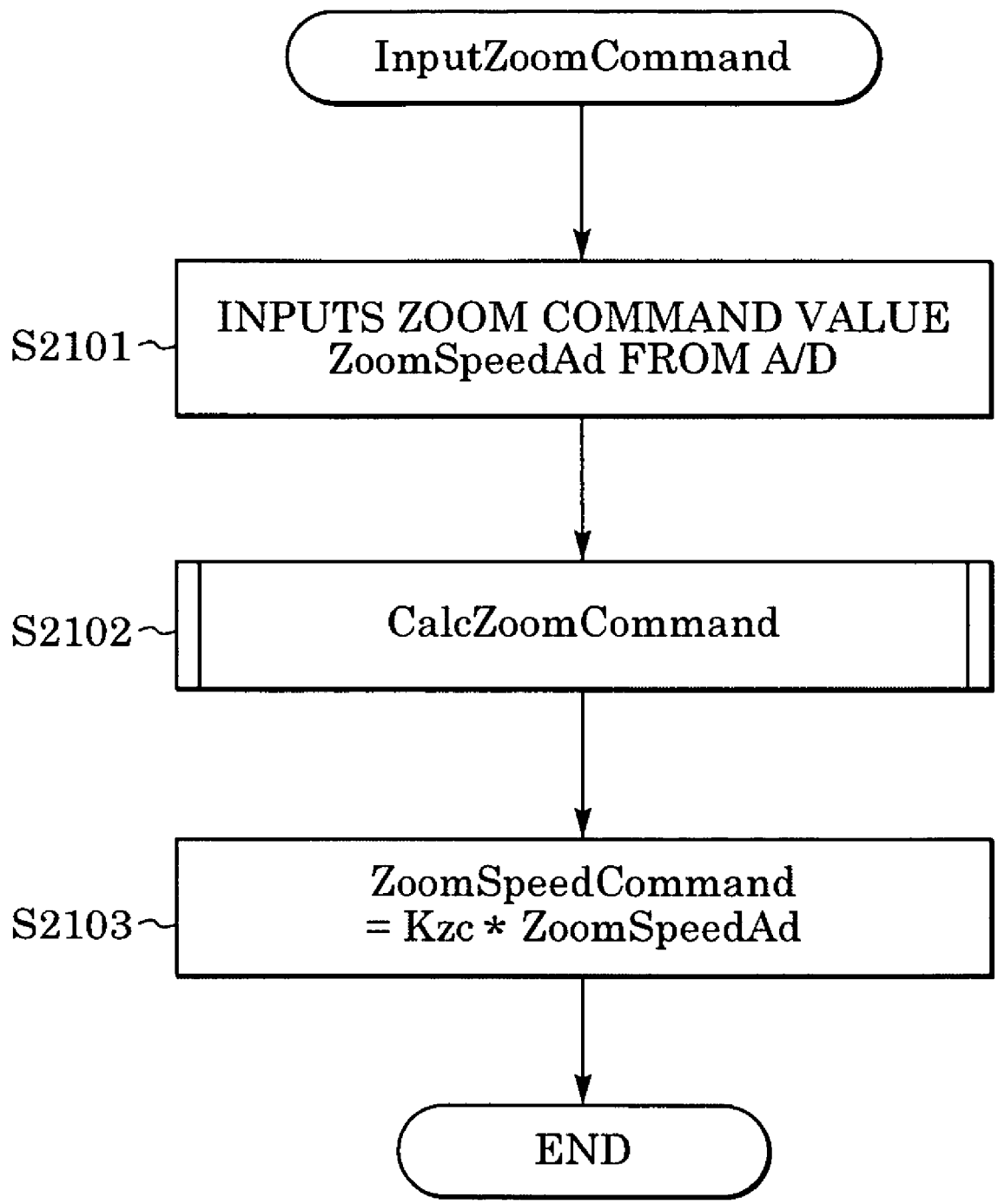
FIG. 21 is a flowchart showing a zoom-command-value inputting process by the CPU.

Next, the subroutine InputZoomCommand for inputting a zoom command is described with reference to FIG. 21. In step S2101, speed command data ZoomSpeedAd is input from the A/D converter 701. Then, the process proceeds to step S2102. In step S2102, a subroutine CalcZoomCommand for calculating a zoom command value is called. Then, the process proceeds to step S2103. In step S2103, a zoom speed command value ZoomSpeedCommand is calculated by using expression (1).

$$\text{ZoomSpeedCommand} = Kzc \times \text{ZoomSpeedAd} \tag{1}$$

Herein, Kzc represents a coefficient for converting an A/D converted value to a zoom speed command value. Then, the subroutine InputZoomCommand is completed.

Figure 22:
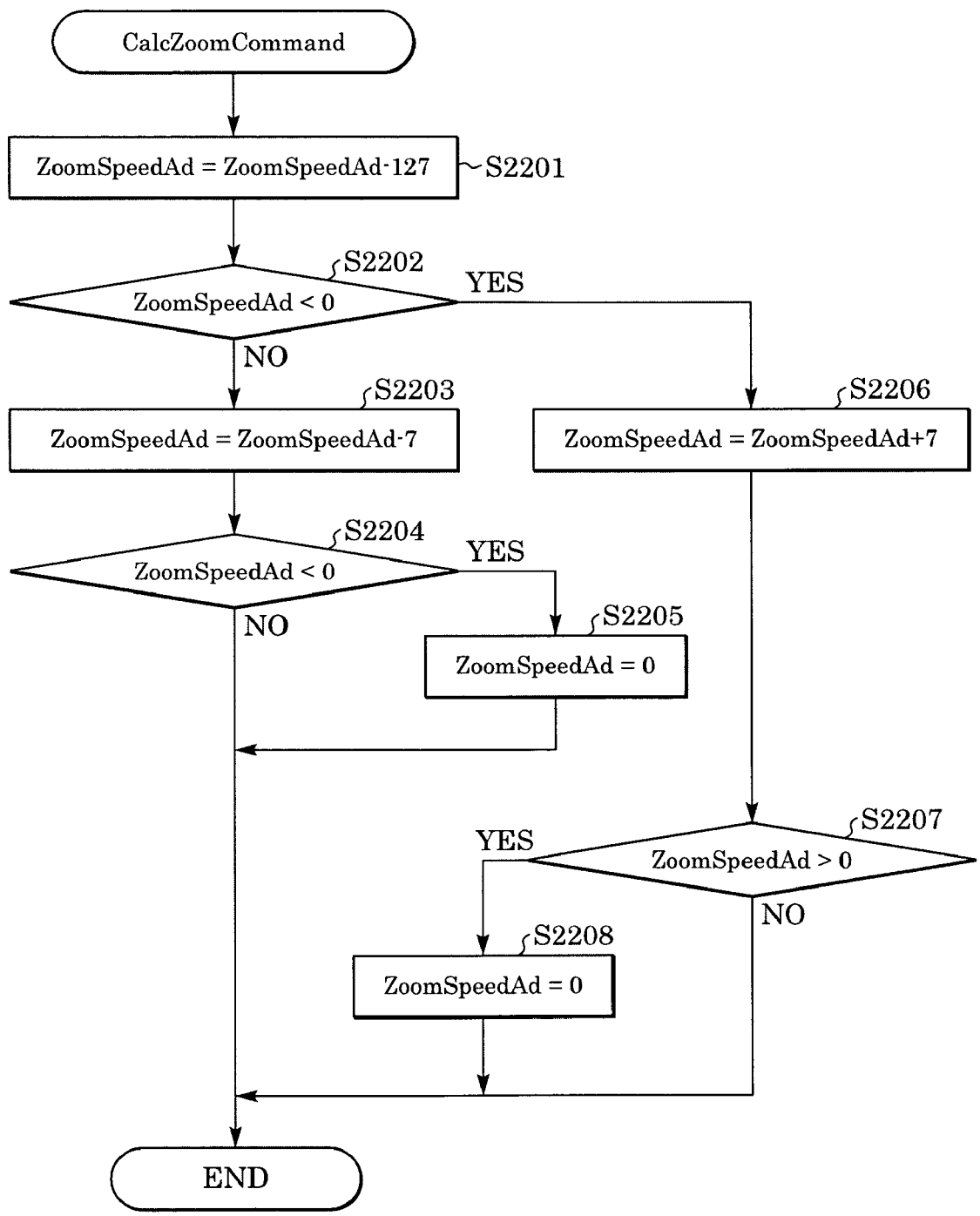
FIG. 22 is a flowchart showing a zoom-command-value calculating process by the CPU.

Next, the subroutine CalcZoomCommand for calculating a zoom command value is described with reference to FIG. 22. Herein, assume that the A/D converter 701 is 8 bits. In step S2201, a speed command is offset by using expression (2).

$$\text{ZoomSpeedAd} = \text{ZoomSpeedAd} - 127 \tag{2}$$

Then, the process proceeds to step S2202.

In step S2202, the sign of ZoomSpeedAd is checked. If ZoomSpeedAd<0 is satisfied, the process proceeds to step S2206. In step S2206, a dead zone is generated by using expression (3).

$$\text{ZoomSpeedAd} = \text{ZoomSpeedAd} + 7 \tag{3}$$

Then, the process proceeds to step S2207.

In step S2207, the sign of the result of expression (3) is checked. If ZoomSpeedAd>0 is satisfied, the process proceeds to step S2208. In step S2208, ZoomSpeedAd is set to 0 in order to determine a dead zone. Then, the subroutine CalcZoomCommand is completed.

If ZoomSpeedAd>0 is not satisfied in step S2207, the subroutine CalcZoomCommand is completed. On the other hand, if ZoomSpeedAd<0 is not satisfied in step S2202, the process proceeds to step S2203. In step S2203, a dead zone is generated by using expression (4).

$$\text{ZoomSpeedAd} = \text{ZoomSpeedAd} - 7 \tag{4}$$

Then, the process proceeds to step S2204.

In step S2204, the sign of the result of expression (4) is checked. If ZoomSpeedAd<0 is satisfied, the process proceeds to step S2205. In step S2205, ZoomSpeedAd is set to 0 in order to determine a dead zone. Then, the subroutine CalcZoomCommand is completed.

Also, if ZoomSpeedAd<0 is not satisfied in step S2204, the subroutine is completed.

Figure 23:
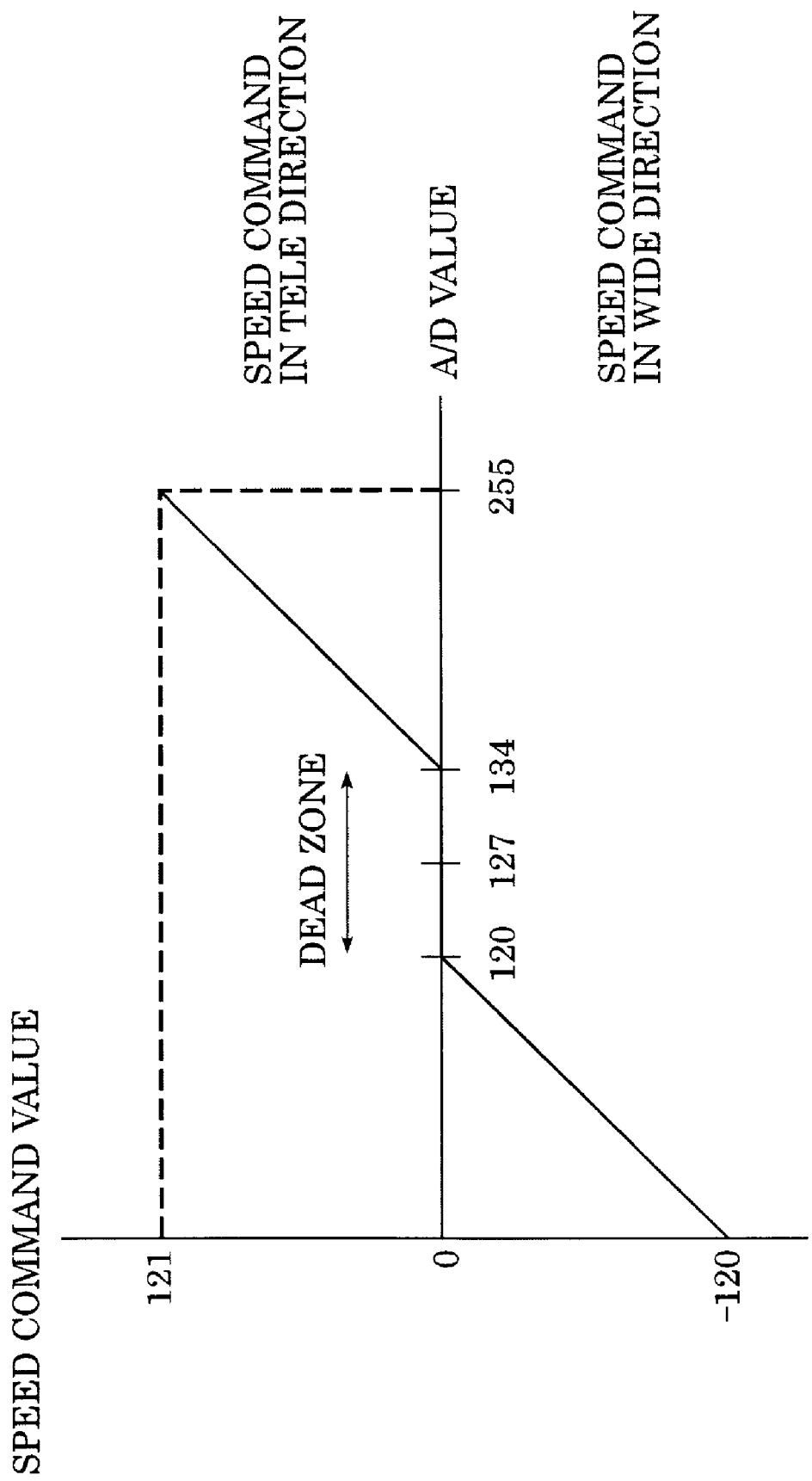
FIG. 23 shows a calculation result of a zoom command value.

A calculation result of the subroutine CalcZoomCommand is shown in FIG. 23. If the A/D converted value ZoomSpeedAd is in a range of 120 to 134, a dead zone is generated while ZoomSpeedAd is 0.

Figure 24:
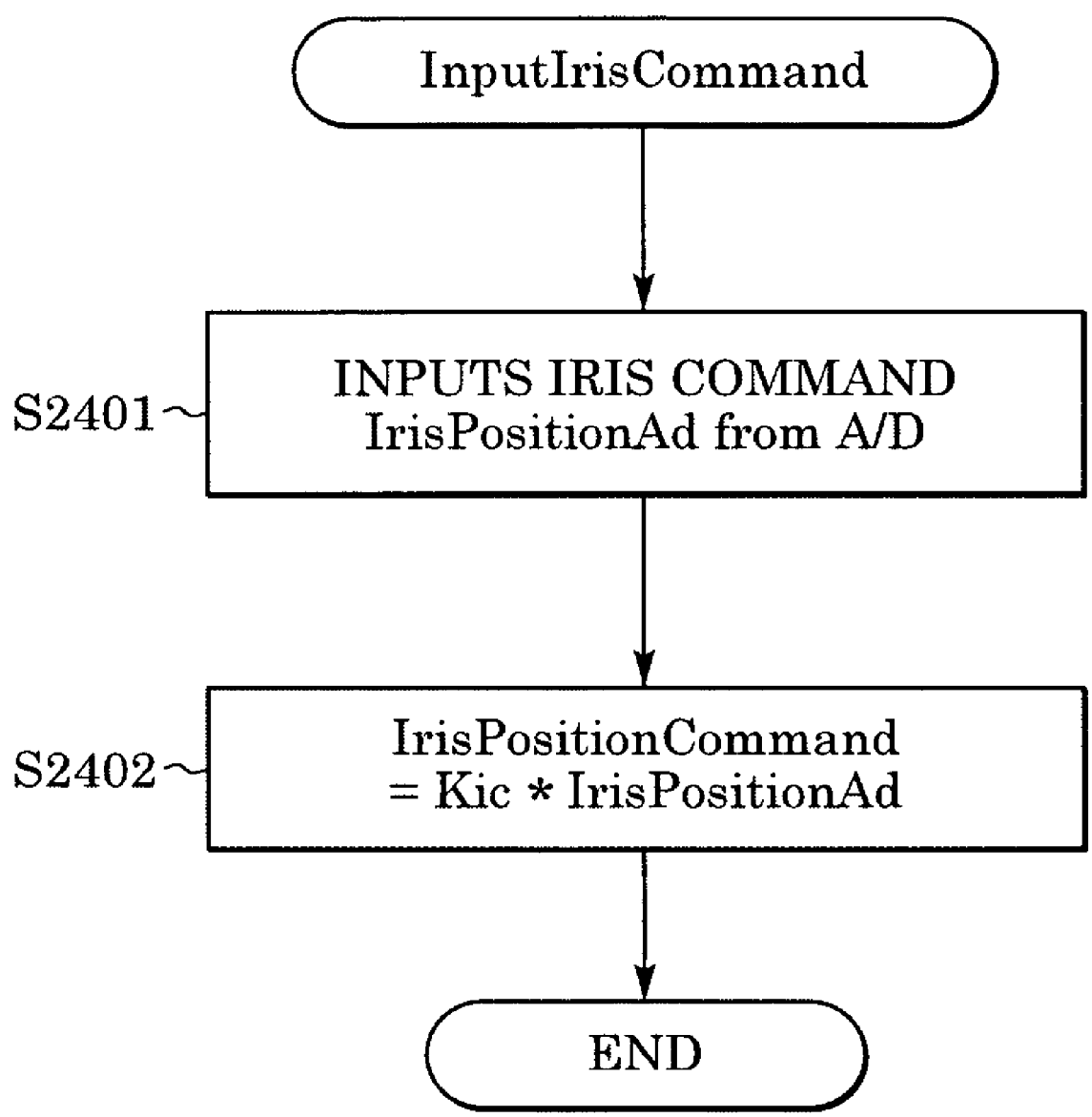
FIG. 24 is a flowchart showing an iris-command-value inputting process by the CPU.

Next, the subroutine InputIrisCommand for inputting an iris command is described with reference to FIG. 24. In step S2401, an iris position command value IirsPositionAd is input from the A/D converter 801. Then, the process proceeds to step S2402. In step S2402, an iris position command value IrisPositionCommand is calculated by using expression (5).

$$\text{IrisPositionCommand} = Kic \times \text{IrisPositionAd} \tag{5}$$

Herein, Kic is a coefficient for converting an A/D converted value to an iris position command value. Then, the subroutine InputIrisCommand is completed.

Figure 25:
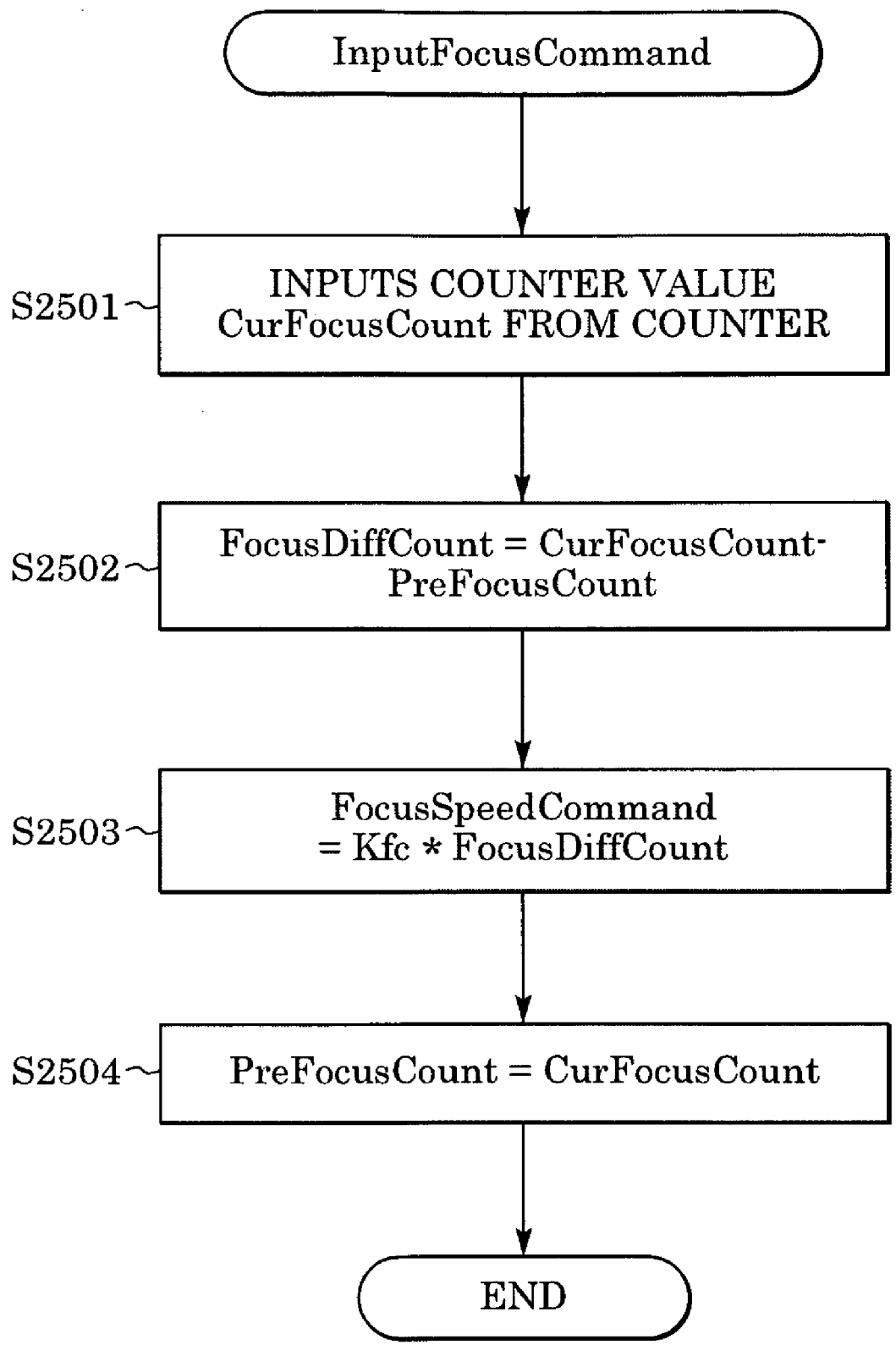
FIG. 25 is a flowchart showing a focus-command-value inputting process by the CPU.

Next, the subroutine for inputting a focus command is described with reference to FIG. 25. In step S2501, a counter value CurFocusCount is input from the counter 901. Then, the process proceeds to step S2502. In step S2502, a difference between the current counter value CurFocusCount and a previous counter value PreFocusCount is calculated by using expression (6).

$$\text{FocusDiffCount} = \text{CurFocusCount} - \text{PreFocusCount} \tag{6}$$

Then, the process proceeds to step S2503.

In step S2503, a focus speed command value FocusSpeedCommand is calculated by using expression (7).

$$\text{FocusSpeedCommand} = Kfc \times \text{FocusDiffCount} \tag{7}$$

Herein, Kfc is a coefficient for converting the counter difference value to a focus speed command value.

Then, in step S2504, PreFocusCount=CurFocusCount is set for a next operation. Then, the subroutine InputFocusCommand is completed.

The subroutine InputFocusCommand is a periodic process caused by a timer interrupt, so that FocusSpeedCommand is differential data of periodic counter values. Therefore, the unit is pulse/sec and the differential data is regarded as a speed command.

Figure 26:
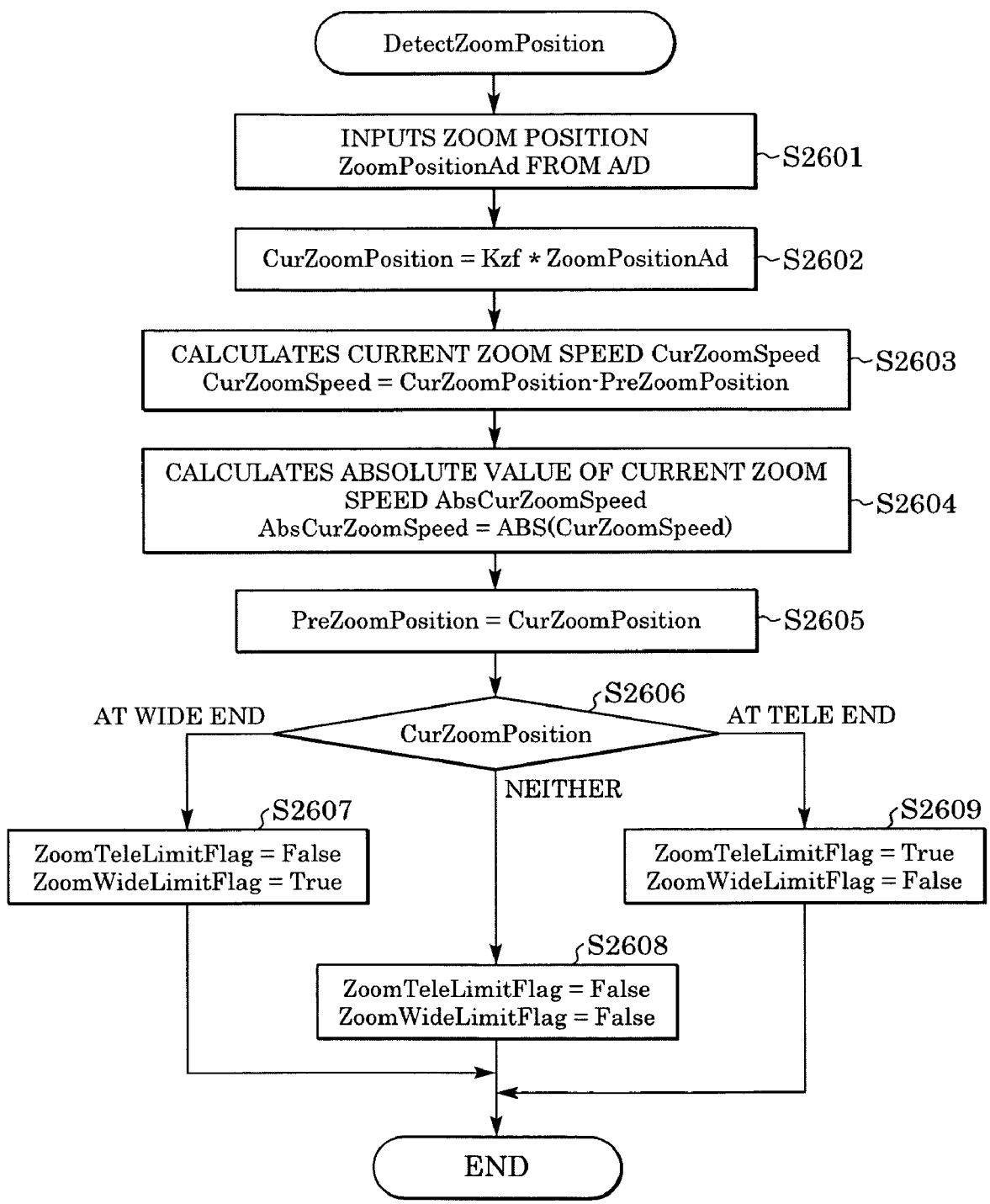
FIG. 26 is a flowchart showing a zoom-position detecting process by the CPU.

Next, the subroutine DetectZoomPosition for detecting a zoom position is described with reference to FIG. 26. In step S2601, a zoom position ZoomPositionAd is input from the A/D converter 207. Then, the process proceeds to step S2602. In step S2602, a current position of the zoom lens unit 102 (current zoom position) CurZoomPosition is calculated by using expression (8).

$$\text{CurZoomPosition} = Kzf \times \text{ZoomPositionAd} \tag{8}$$

Herein, Kzf is a coefficient for converting the A/D converted value to a zoom position. Then, the process proceeds to step S2603.

In step S2603, a current speed of the zoom lens unit 102 (current zoom speed) is calculated by using expression (9).

$$\text{CurZoomSpeed} = \text{CurZoomPosition} - \text{PreZoomPosition} \tag{9}$$

Herein, the subroutine DetectZoomPosition is a periodic process caused by a timer interrupt, and thus the differential data of zoom positions corresponds to a speed. Then, the process proceeds to step S2604. In step S2604, an absolute value of the current zoom speed CurZoomSpeed is calculated by using expression (10).

$$\text{AbsCurZoomSpeed} = \text{ABS}(\text{CurZoomSpeed}) \tag{10}$$

Herein, ABS(x) is a process of calculating an absolute value of x. Then, the process proceeds to step S2605.

In step S2605, PreZoomPosition=CurZoomPosition is set in preparation for a next operation. Then, the process proceeds to step S2606.

In step S2606, a current zoom position CurZoomPosition is checked to determine whether the zoom lens unit 102 is at the wide end, the tele end, or another position. If it is determined that the zoom lens unit 102 is at the wide end, the process proceeds to step S2607. If it is determined that the zoom lens unit 102 is at the tele end, the process proceeds to step S2609. If it is determined that the zoom lens unit 102 is at neither the wide end nor the tele end, the process proceeds to step S2608.

In step S2607, since the zoom lens unit 102 is at the wide end, the following setting is performed.
ZoomTeleLimitFlag=False . . . not at the tele end
ZoomWideLimitFlag=True . . . at the wide end Then, the subroutine DetectZoomPosition is completed.

In step S2609, since the zoom lens unit 102 is at the tele end, the following setting is performed.
ZoomTeleLimitFlag=True . . . at the tele end
ZoomWideLimitFlag=False . . . not at the wide end Then, the subroutine DetectZoomPosition is completed.

In step S2608, since the zoom lens unit 102 is at neither the wide end nor the tele end, the following setting is performed.
ZoomTeleLimitFlag=False . . . not at the tele end
ZoomWideLimitFlag=False . . . not at the wide end Then, the subroutine DetectZoomPosition is completed.

Figure 27:
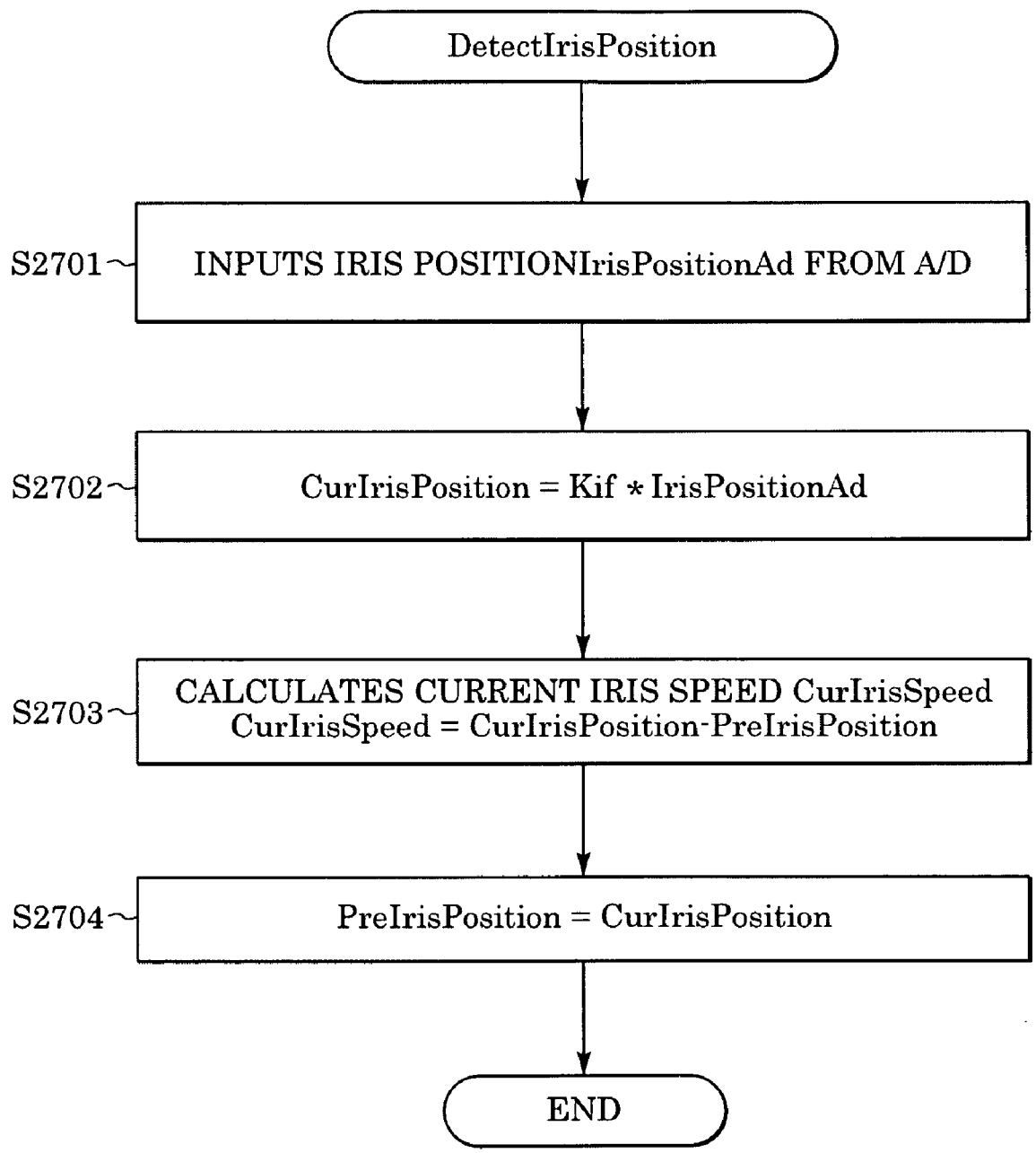
FIG. 27 is a flowchart showing an iris-position detecting process by the CPU.

Next, the subroutine DetectIrisPosition for detecting an iris position is described with reference to FIG. 27. In step S2701, an iris position IrisPositionAd is input from the A/D converter 307. Then, the process proceeds to step S2702. In step S2702, a current position of the iris 103 (current iris position) CurIrisPosition is calculated from expression (11).

$$CurIirsPosition = Kif \times IrisPositionAd \quad (11)$$

Herein, Kif is a coefficient for converting the A/D converted value to an iris position. Then, the process proceeds to step S2703.

In step S2703, a current speed of the iris 103 (current iris speed) is calculated by using expression (12).

$$CurIrisSpeed = CurIrisPosition - PreIrisPosition \quad (12)$$

Herein, the subroutine DetectIrisPosition is a periodic process caused by a timer interrupt, and thus the differential data of the iris positions corresponds to a speed. Then, the process proceeds to step S2704. In step S2704, PreIrisPosition=CurIrisPosition is set for a next operation. Then, the subroutine DetectIrisPosition is completed.

Figure 28:
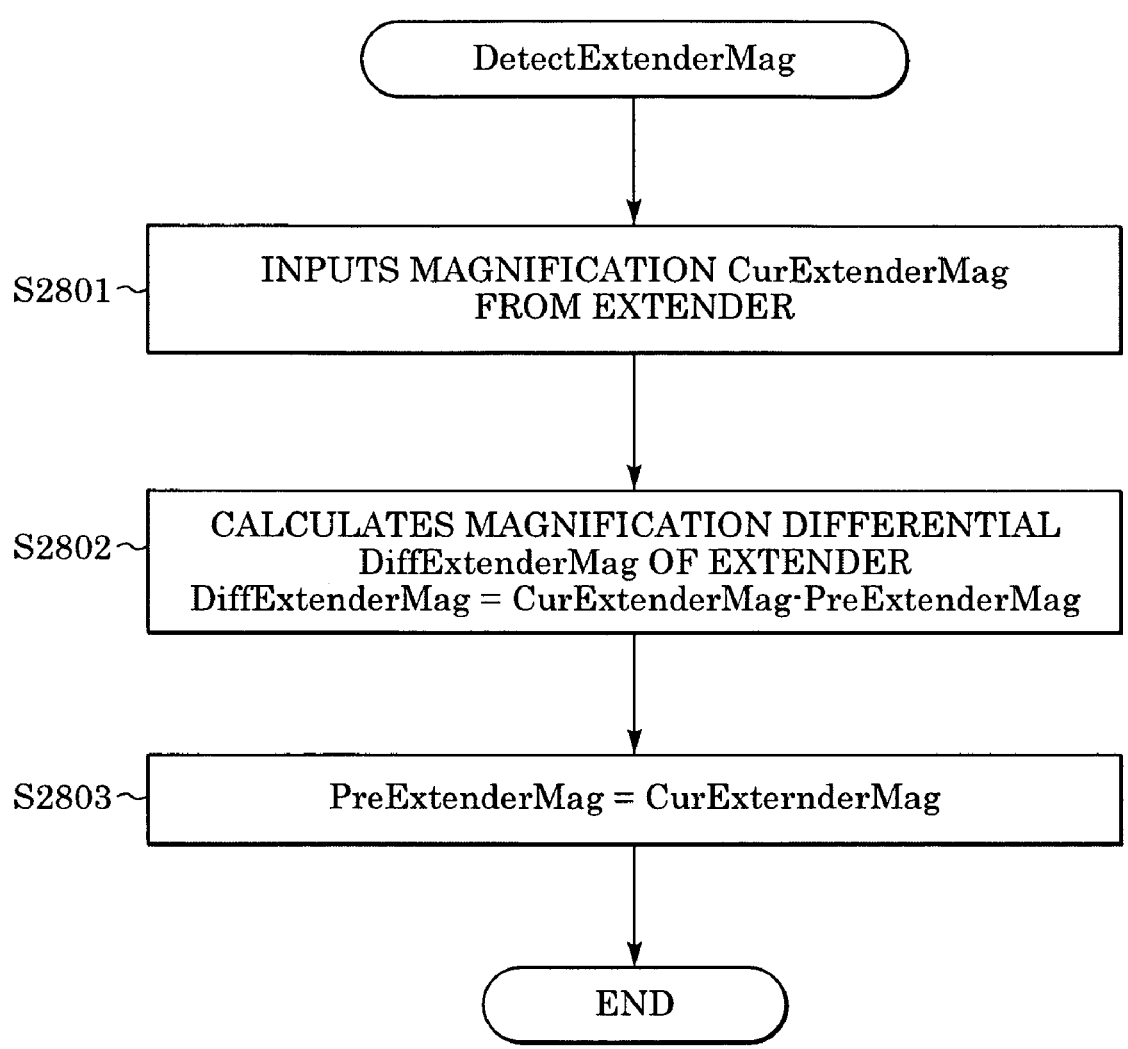
FIG. 28 is a flowchart showing an extender magnification detecting process by the CPU.

Next, the subroutine DetectExtenderMag for detecting magnification of the extender is described with reference to FIG. 28. In step S2801, a current magnification CurExtenderMag is input from the extender 105. Then, the process proceeds to step S2802. In step S2802, a difference in the magnification of the extender 105 DiffExtenderMag is calculated by using expression (13).

$$DiffExtenderMag = CurExtenderMag - PreExtenderMag \quad (13)$$

Then, the process proceeds to step S2803.

In step S2803, PreExtenderMag=CurExtenderMag is set for a next operation. Then, the subroutine DetectExtenderMag is completed.

Figure 29:
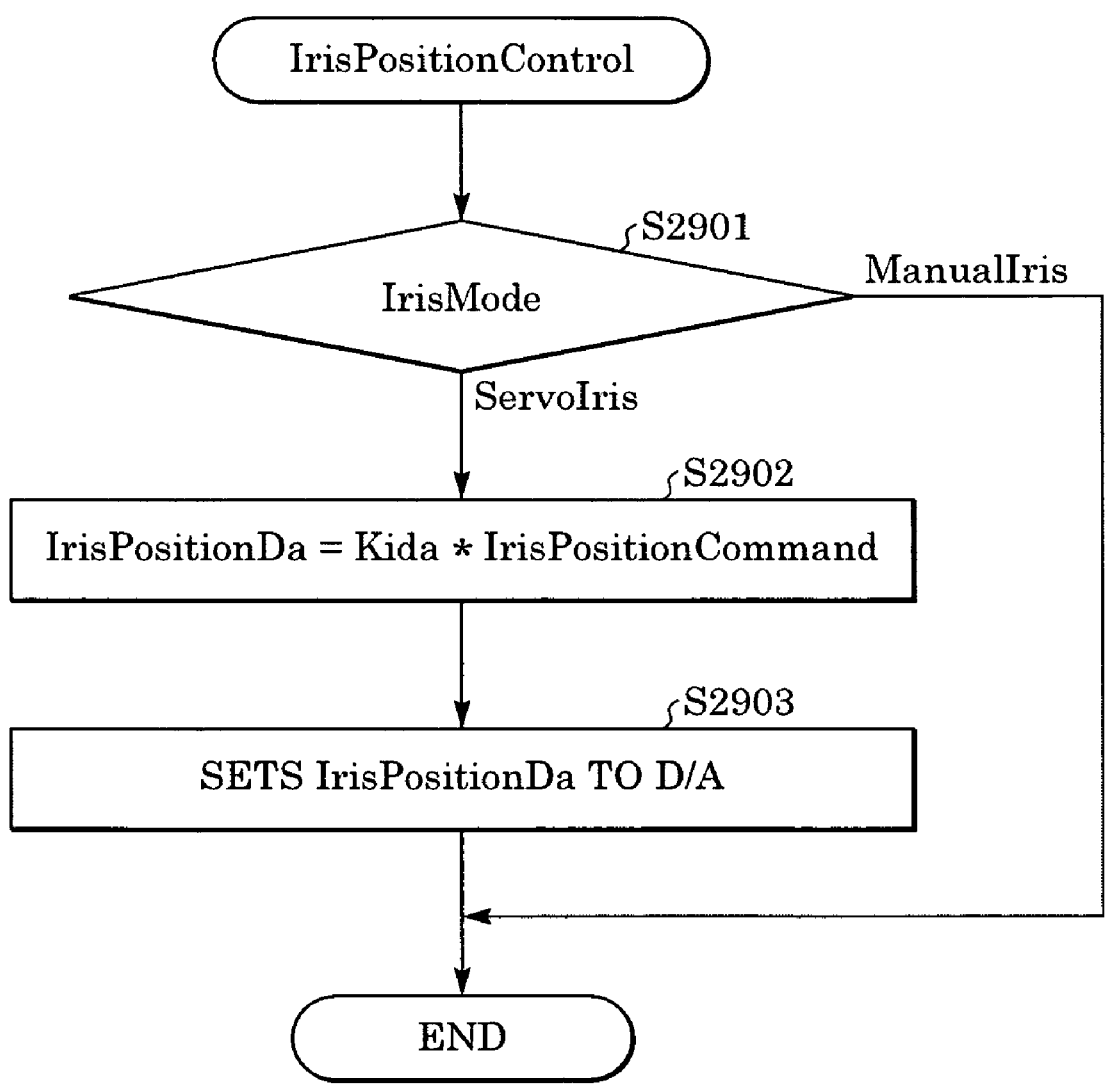
FIG. 29 is a flowchart showing an iris-position controlling process by the CPU.

Next, a subroutine IrisPositionControl for controlling an iris position is described with reference to FIG. 29. In step S2901, an iris mode is checked. When the iris mode is in the manual iris mode (ManualIris), no control is performed, and thus the subroutine IrisPositionControl is completed. If it is determined that the iris mode is in the servo iris mode (ServoIris) in step S2901, the process proceeds to step S2902. In step S2902, an iris position command value is converted to D/A conversion data by using expression (14).

$$IrisPositionDa = Kida \times IrisPositionCommand \quad (14)$$

Herein, Kida is a coefficient for converting the iris position command value to data for the D/A converter 305. Then, the process proceeds to step S2903.

In step S2903, IrisPositionDa calculated in expression (14) is set to the D/A converter 305. Then, the subroutine IrisPositionControl is completed.

Figure 30:
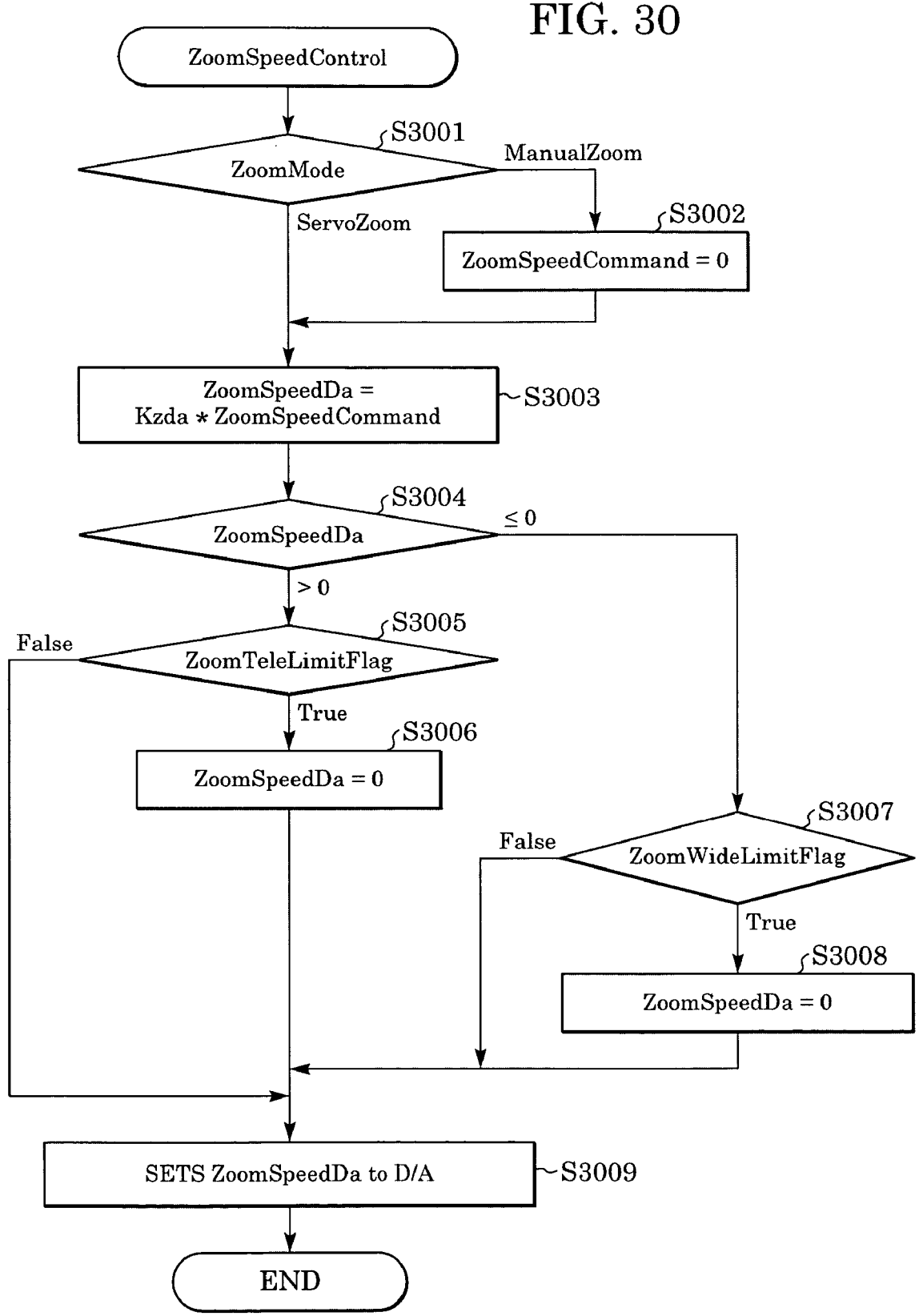
FIG. 30 is a flowchart showing a zoom-speed controlling process by the CPU.

Next, a subroutine ZoomSpeedControl for controlling a zoom speed is described with reference to FIG. 30. In step S3001, a zoom mode ZoomMode is checked. If the zoom mode ZoomMode is in the manual zoom mode (ManualZoom), the process proceeds to step S3002. In step S3002, ZoomSpeedCommand is set to 0 to change to a zoom stop command value. Then, the process proceeds to step S3003.

If it is determined that the zoom mode ZoomMode is in the servo zoom mode (ServoZoom) in step S3001, the process proceeds to step S3003. In step S3003, a zoom speed command value is converted to data for D/A conversion by using expression (15).

$$ZoomSpeedDa = Kzda \times ZoomSpeedCommand \quad (15)$$

Herein, Kzda is a coefficient for converting a zoom speed command value to data for the D/A converter 205. Then, the process proceeds to step S3004.

In step S3004, the sign of the data ZoomSpeedDa for the D/A converter 205 is checked. If ZoomSpeedDa>0, it is a drive command value toward a tele direction, so that the process proceeds to step S3005. In step S3005, a tele end flag ZoomTeleLimitFlag is checked. If the tele end flag ZoomTeleLimitFlag=True, the zoom position is at the tele end, so that the process proceeds to step S3006. In step S3006, ZoomSpeedDa is set to 0 to change to a zoom stop command. Then, the process proceeds to step S3009.

In step S3009, the zoom speed command value ZoomSpeedDa for the D/A converter is set to the D/A converter 205. Then, the subroutine ZoomSpeedControl is completed.

If ZoomTeleLimitFlag=False in step S3005, the zoom position is not at the tele end, and thus the process proceeds to step S3009. If it is determined that ZoomSpeedDa≦0 in step S3004, it is regarded as a drive command value toward a wide direction including a stop command, so that the process proceeds to step S3007.

In step S3007, a wide end flag ZoomWideLimitFlag is checked. If the wide end flag ZoomWideLimitFlag=True, the zoom position is at the wide end, and thus the process proceeds to step S3008. In step S3008, ZoomSpeedDa is set to 0 to change to a zoom stop command. Then, the process proceeds to step S3009.

If it is determined that ZoomWideLimitFlag=False in step S3007, the zoom position is not at the wide end, and thus the process proceeds to step S3009.

Figure 31:
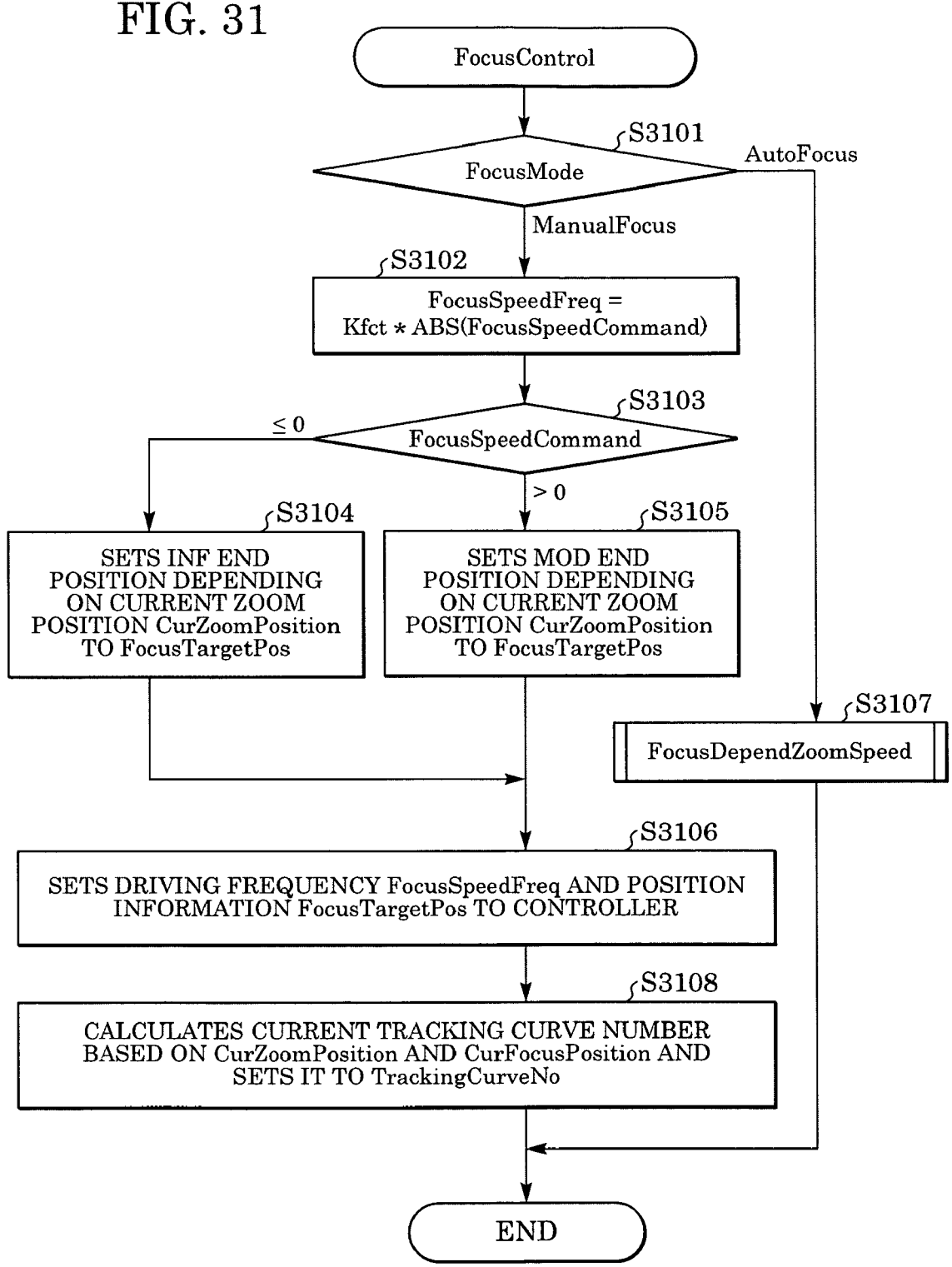
FIG. 31 is a flowchart showing a focus control process by the CPU.

Next, a subroutine FocusControl for controlling a focus is described with reference to FIG. 31. In step S3101, a focus mode FocusMode is checked. If the focus mode FocusMode is in the auto focus mode (AutoFocus), the process proceeds to step S3107. In step S3107, a subroutine FocusDependZoomSpeed for zoom-speed-dependent zoom interlocking process is called. Then, the subroutine FocusControl is completed.

If it is determined that the focus mode (FocusMode) is in the manual focus mode (FocusManual), the process proceeds to step S3102. In step S3102, a driving frequency of the pulse motor 401 for driving the focus lens unit 104 is calculated by using expression (16) based on a focus speed command FocusspeedCommand.

$$\text{FocusSpeedFreq} = Kfct \times ABS(\text{FocusSpeedCommand}) \quad (16)$$

Herein, ABS(x) is for calculating an absolute value of x and Kfct is a coefficient for converting a speed command value to frequency data for the focus controller 403.

Then, the process proceeds to step S3103.

In step S3103, the sign of the focus speed command FocusSpeedCommand is checked. If FocusSpeedCommadn>0, the focus lens unit 104 is to be driven in an MOD direction, and thus the process proceeds to step S3105. In step S3105, an MOD end position depending on a current zoom position CurZoomPosition is set to a stop target position FocusTargetPos in order to drive the focus lens unit 104 in the MOD direction. Then, the process proceeds to step S3106.

In step S3106, a driving frequency FocusSpeedFreq and a stop target position FocusTargetPos are set to the controller 403. Then, the process proceeds to step S3108.

In step S3108, a current tracking curve number is calculated by using a tracking curve table based on a current zoom position CurZoomPosition and a current position of the focus lens unit 104 (current focus position) CurFocusPosition, and the obtained tracking curve number is set to TrackingCurveNo. Then, the subroutine FocusControl is completed.

If it is determined that FocusSpeedCommand≦0 in step S3103, the process proceeds to step S3104 in order to drive the focus lens unit 104 in an INF direction including a stop command.

In step S3104, an INF end position depending on the current zoom position CurZoomPosition is set to FocusTargetPos in order to drive the focus lens unit 104 in the INF direction. Then, the process proceeds to step S3106.

Figure 32:
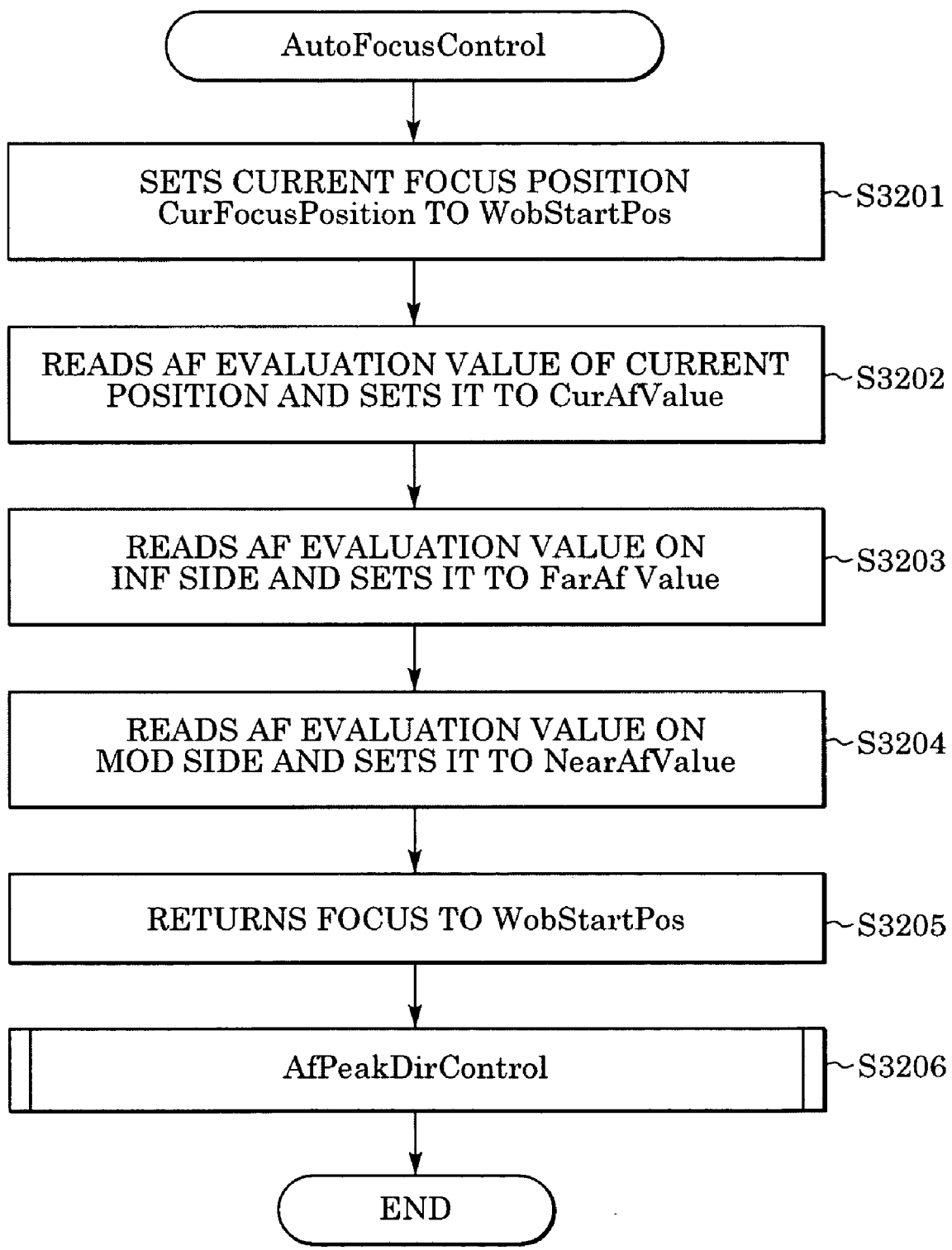
FIG. 32 is a flowchart showing an AF control process by the CPU.

Next, an AF controlling subroutine AutoFocusControl is described with reference to FIG. 32. In this embodiment, as described above, AF control is performed by searching for a position where a higher AF evaluation value by a so-called contrast detection (television AF) method can be obtained by wobbling the focus lens unit 104.

In step S3201, a current focus position CurFocusPosition is set to a wobbling start position WobStartPos in order to store the wobbling start position of the focus lens unit 104. Then, the process proceeds to step S3202.

In step S3202, a current AF evaluation value is read from the AF evaluation value generating unit 114 and sets the read value to CurAfValue. Then, the process proceeds to step S3203.

In step S3203, an AF evaluation value at the time when the focus lens unit 104 is moved to the INF side by wobbling is read from the AF evaluation value generating unit 114, and the read value is set to FarAfValue. Then, the process proceeds to step S3204.

In step S3204, an AF evaluation value at the time when the focus lens unit 104 is moved to the MOD side by wobbling is read from the AF evaluation value generating unit 114, and the read value is set to NearAfValue. Then, the process proceeds to step S3205.

In step S3205, the rear focus lens unit 104 is returned to the wobbling start position WobStartPos to end wobbling. Then, the process proceeds to step S3206.

In Step S3206, the AF evaluation value obtained by wobbling is compared with the AF evaluation value read in step S3202, and calls a subroutine AfPeakDirControl in order to move the focus lens unit 104 in a direction where the AF evaluation value is higher. Then, the subroutine AutoFocusControl is completed.

Figure 33:
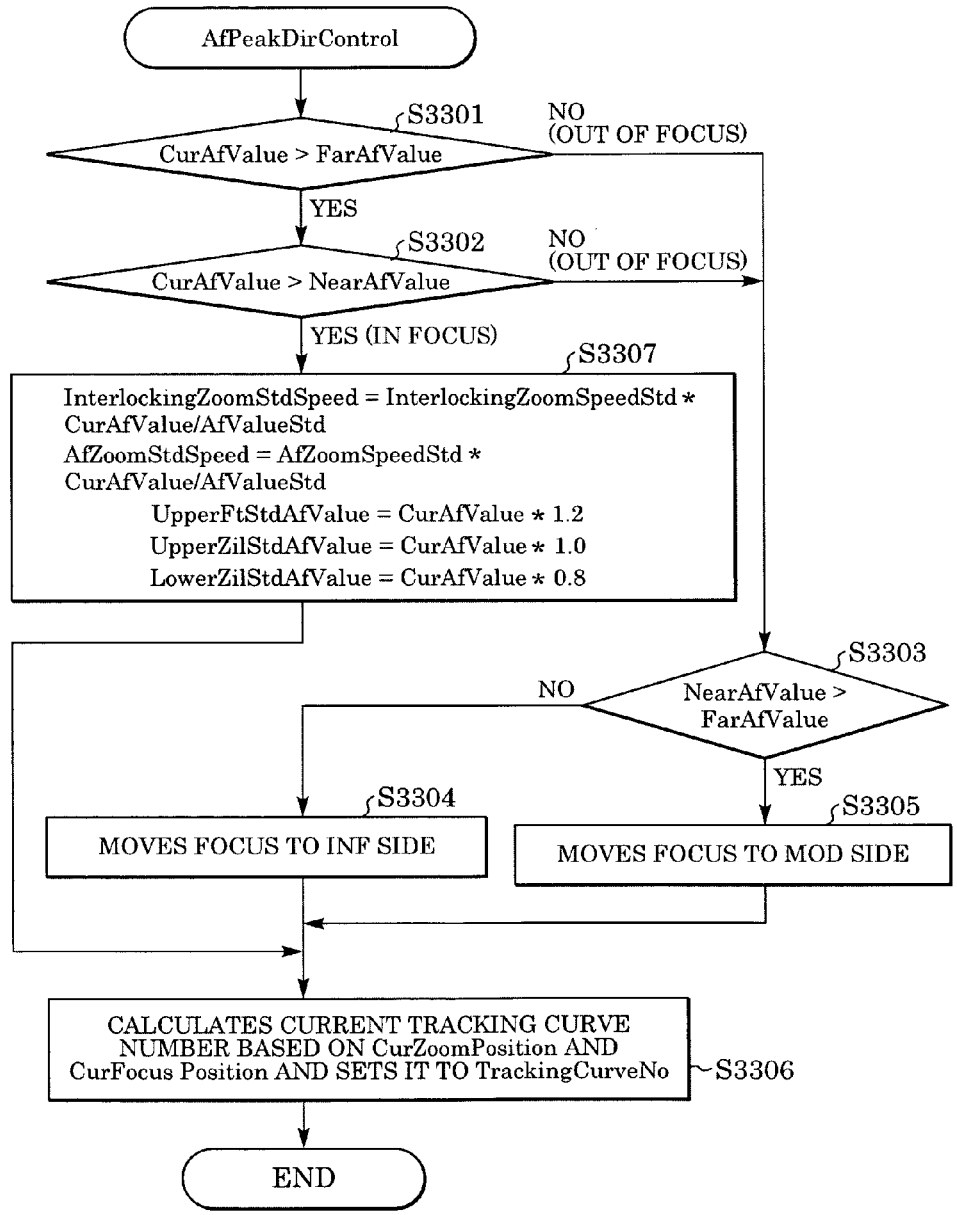
FIG. 33 is a flowchart showing a lens driving process based on an AF evaluation value by the CPU.

Next, the subroutine AfPeakDirControl for processing an AF evaluation value is described with reference to FIG. 33. In step S3301, the AF evaluation value CurAfvalue before starting wobbling (AF evaluation value read in step S3202) is compared with the AF evaluation value FarAfValue at wobbling in the INF side. When CurAfValue>FarAfvalue is not satisfied, it is determined to be an out-of-focus state, and the process proceeds to step S3303.

In step S3303, the AF evaluation value NearAfValue at wobbling on the MOD side is compared with the AF evaluation value FarAfvalue at wobbling on the INF side. If NearAfValue>FarAfValue is satisfied, the focus lens unit 104 is moved to the MOD side by a predetermined amount.

Then, the process proceeds to step S3306.

In step S3306, a current tracking curve number is calculated by using the tracking curve table based on the current zoom position CurZoomPosition and the current focus position CurFocusPosition and the current tracking curve number is set to TrackingCurveNo. Then, the subroutine AfPeakDirControl is completed.

If NearAfValue>FarAfValue is not satisfied in step S3303, the process proceeds to step S3304.

In step S3304, the focus lens unit 104 is moved to the INF side by a predetermined amount. Then, the process proceeds to step S3306.

If CurAfValue>FarAfValue is satisfied in step S3301, the process proceeds to step S3302.

In step S3302, the AF evaluation value CurAfValue before starting wobbling is compared with the AF evaluation value NearAfValue at wobbling on the MOD side. If CurAfValue>NearAfValue is not satisfied, it is determined to be an out-of-focus state, so that the process to step S3303.

If CurAfValue>NearAfValue is satisfied in step S3302, it is determined to be an in-focus state, so that the process proceeds to step S3307.

In step S3307, standard values for zoom interlocking control are updated. This step is performed both in this embodiment and a second embodiment described below. The standard values are updated as follows.

InterlockingZoomStdSpeed=InterlockingZoomSpeedStd× CurAfValue/AfValueStd

AfZoomStdSpeed=AfZoomSpeedStd×CurAfValue/ AfValueStd

UpperFtStdAfvalue=CurAfValue×1.2

UpperZilStdAfValue=CurAfValue×1.0

LowZilStdAfValue=CurAfValue×0.8

Then, the process proceeds to step S3306.

By updating the standard speeds InterlockingzoomStdSpeed and AfzoomStdSpeed in the above manner, these standard speeds are changed according to the current AF evaluation value. Accordingly, standard speeds suitable for the currently-obtained AF evaluation value or suitable for change in a zoom speed and object can be set. This is the same for update of standard values UpperFtStdAfValue, UpperZilStdAfvalue, and LowZilStdAfValue.

Incidentally, the respective multiplication coefficients 1.2, 1.0, and 0.8 of CurAfvalue may be other values. Also, these values can be changed according to the position of the zoom lens unit 102, that is, a focal length.

Figure 34:
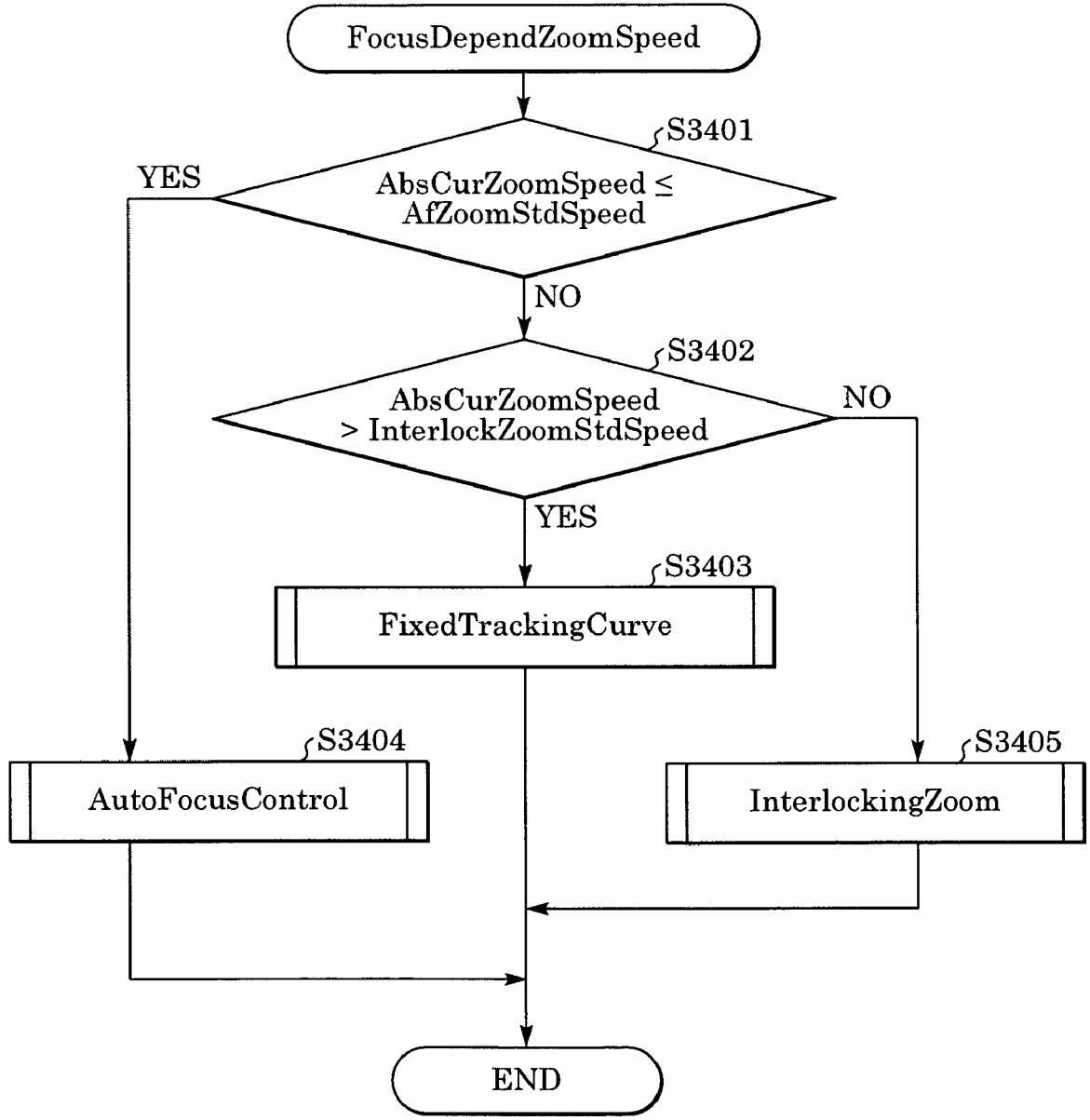
FIG. 34 is a flowchart showing a focus control process depending on a zoom speed by the CPU.

Next, a subroutine FocusDependZoomSpeed for zoom-speed-dependent focus control is described with reference to FIG. 34. In step S3401, it is determined whether a current speed of the zoom lens unit 102 (current zoom speed) AbsCurZoomSpeed is equal to or lower than a standard speed (first speed) AfZoomStdSpeed. If AbsCurZoomSpeed≦AfZoomStdSpeed is satisfied, the process proceeds to step S3404.

In step S3404, the subroutine AutoFocusControl is called to perform AF control. Then, the subroutine FocusDependZoomSpeed is completed.

If AbsCurZoomSpeed≦AfZoomStdSpeed is not satisfied in step S3401, it is determined that the current zoom speed is higher than the standard speed AfZoomStdSpeed, and the process proceeds to step S3402.

In step S3402, it is determined whether the current zoom speed AbsCurZoomSpeed is higher than a standard speed (second speed) InterlockZoomStdSpeed. If AbsCurZoomSpeed>InterlockZoomStdSpeed is satisfied, the process proceeds to step S3403.

In step S3403, a subroutine FixedTrackingCurve is called to perform tracking curve fixed control. Then, the subroutine FocusDependZoomSpeed is completed.

If AbsCurZoomSpeed>InterlockZoomStdSpeed is not satisfied in step S3402, it is determined that the current zoom speed is higher than the standard speed (first speed) AfZoomStdSpeed and is equal to or lower than the standard speed (second speed) InterlockZoomStdSpeed. Thus, the process proceeds to step S3405.

In step S3405, a subroutine InterlockingZoom is called to perform zoom interlocking control. Then, the subroutine FocusDependZoomSpeed is completed.

Figure 39:
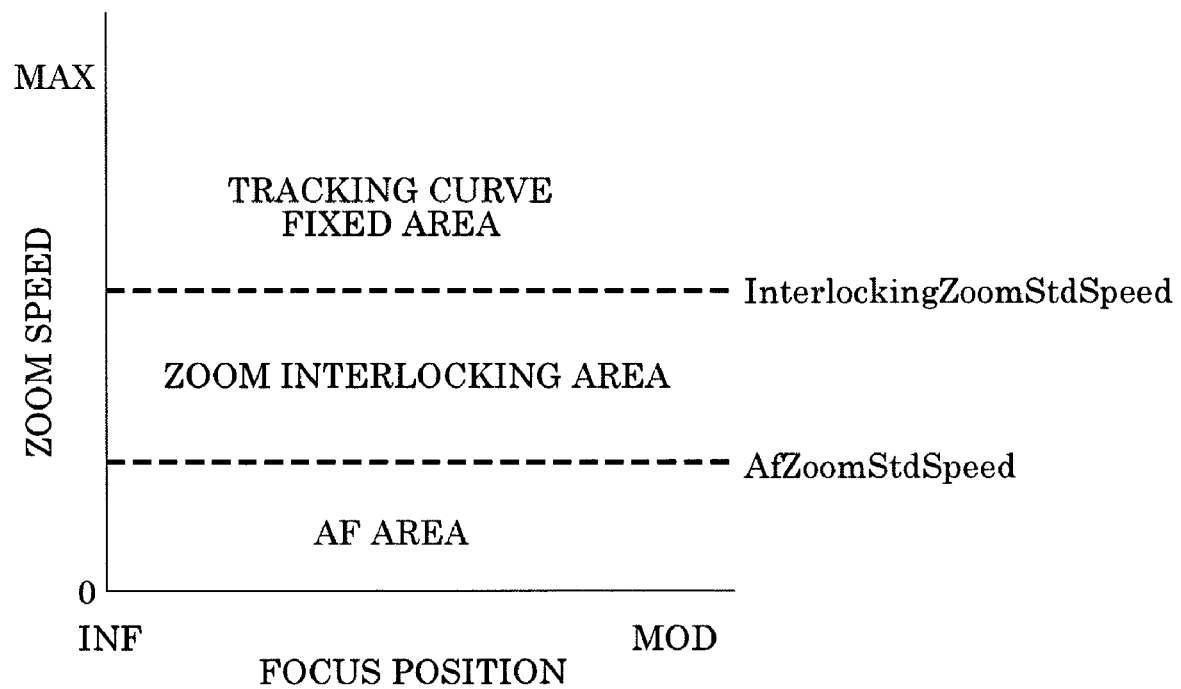
FIG. 39 is a schematic view showing a focus control depending on a zoom speed.

FIG. 39 conceptually shows a switching of a focus control method depending on the zoom speeds. In a control of preventing an image plane variation caused by a change in magnification, an area where a zoom speed is equal to or lower than the standard speed AfZoomStdSpeed is an area for performing AF control, an area where a zoom speed is higher than the standard speed AfZoomStdSpeed but is equal to or lower than the standard speed InterlockZoomStdSpeed is an area for performing zoom interlocking control, and an area where a zoom speed is higher than the standard speed InterlockZoomStdSpeed is an area for fixing a tracking curve.

Figure 44:
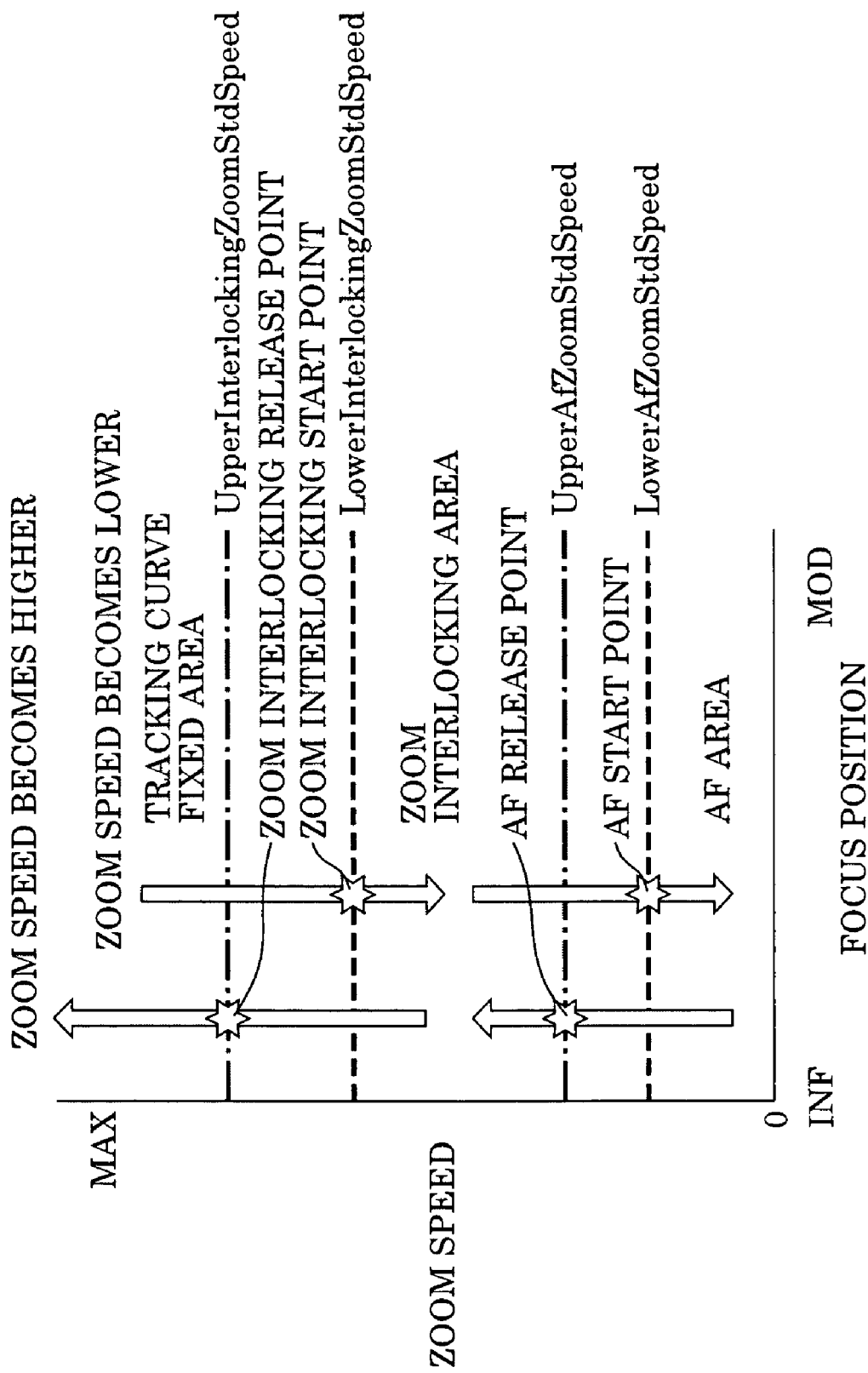
FIG. 44 shows an example in which standard zoom speeds include a hysteresis.

If the standard speed InterlockZoomStdSpeed is fixed, tracking curve fixed control and zoom interlocking control are frequently switched between each other when the zoom speed is approximate to the standard speed InterlockZoomStdSpeed. In order to prevent such a state, a hysteresis is given to the standard speed of switching between the tracking curve fixed control and the zoom interlocking control as shown in FIG. 44. That is, a standard speed when the zoom speed becomes higher is defined as UpperInterlockingZoomStdSpeed, and a standard speed when the zoom speed becomes lower is defined as LowerInterlockingZoomStdSpeed. In this case, each of UpperInterlockingZoomStdSpeed and LowerInterlockingZoomStdSpeed corresponds to the "second speed."

Likewise, a hysteresis may be given to the standard speed AfZoomStdSpeed of switching between zoom interlocking control and AF control. That is, a standard speed when the zoom speed becomes higher is defined as UpperAfZoomStdSpeed, and a standard speed when the zoom speed becomes lower is defined as LowerAfZoomStdSpeed. In this case, each of UpperAfZoomStdSpeed and LowerAfZoomStdSpeed corresponds to the "first speed" or the "speed."

Figure 35:
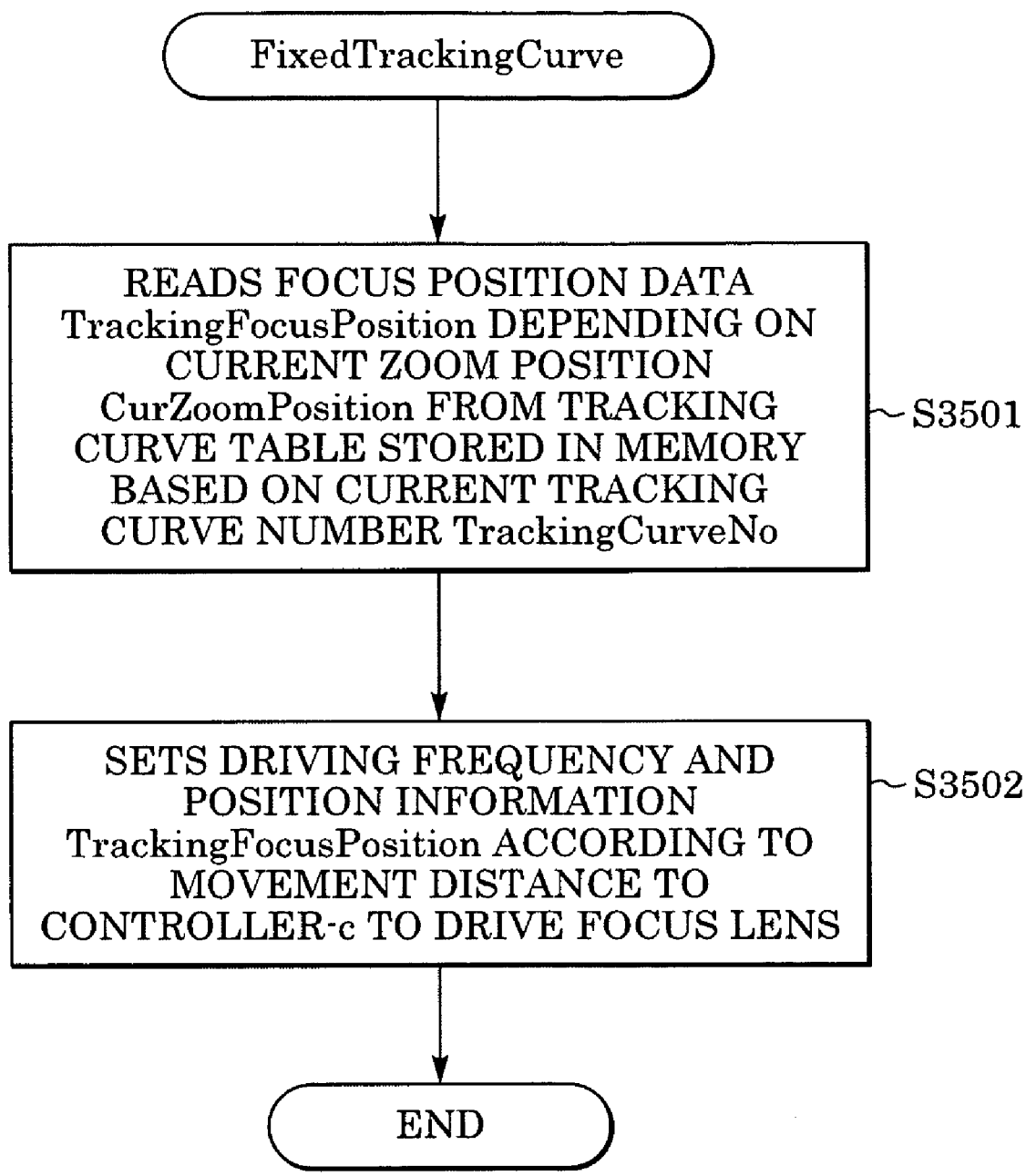
FIG. 35 is a flowchart showing a focus driving process using a tracking curve by the CPU.

Next, the subroutine FixedTrackingCurve for moving focus by fixing a tracking curve number is described with reference to FIG. 35. In step S3501, focus position data TrackingFocusPosition depending on the current zoom position CurZoomPosition is read from the tracking curve table stored in the memory 122 based on the current tracking curve number TrackingCurveNo. Then the process proceeds to step S3502.

In step S3502, a differential distance between the current focus position CurFocusPosition and a target drive position TrackingFocusPosition, that is, a driving frequency and position information TrackingFocusPosition according to a movement distance are set to the focus controller 403. Then, the subroutine FixedTrackingCurve is completed.

Figure 36:
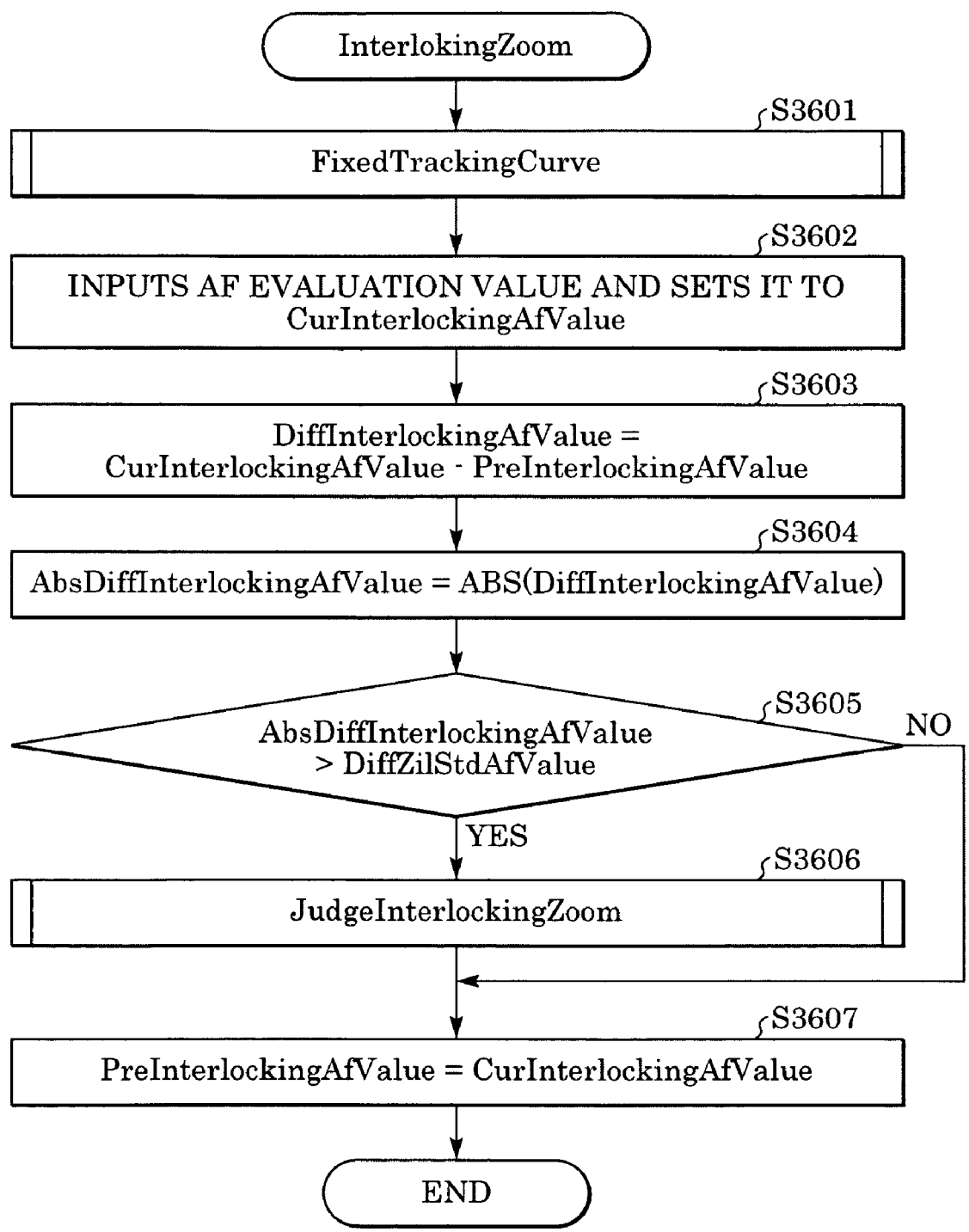
FIG. 36 is a flowchart showing a zoom interlocking control of a focus lens unit by the CPU.

Next, the subroutine InterlockingZoom for zoom interlocking control is described with reference to FIG. 36. In step S3601, the subroutine FixedTrackingCurve is called to drive the focus lens unit 104 according to a movement of the zoom lens unit 102. Then, the process proceeds to step S3602.

In step S3602, the AF evaluation value after a movement of the focus lens unit 104 is input from the AF evaluation value generating unit 114, and the AF evaluation value is set to CurInterlockingAfValue. Then, the process proceeds to step S3603. In step S3603, the amount of difference in the AF evaluation value is calculated by using expression (17).

$$\text{DiffInterlockingAfValue=CurInterlockingAfValue-PreInterlockingAfvalue} \quad (17)$$

Then, the process proceeds to step S3604.

In step S3604, an absolute value of the amount of difference in the AF evaluation value is calculated by using expression (18).

$$\text{AbsDiffInterlockingAfvalue=ABS(DiffInterlockingAfValue)} \quad (18)$$

Herein, ABS(x) is a process of calculating an absolute value of x. Then, the process proceeds to step S3605.

In step S3605, a differential absolute value between current and previous AF evaluation values AbsDiffInterlockingAfValue is compared with a standard value DiffZilStdAfValue for differential data of the AF evaluation value. If AbsDiffInterlockingAfValue>DiffZilStdAfValue is satisfied, the process proceeds to step S3606.

In step S3603, a subroutine JudgeInterlockingZoom is called to change a tracking curve to be used. Then, the process proceeds to step S3607.

In step S3607, PreInterlockingAfvalue=CurInterlockingAfValue is set for a next operation. Then, the subroutine InterlockingZoom is completed.

If AbsDiffInterlockingAfValue>DiffZilStdAfValue is not satisfied in step S3605, the process skips to step S3607.

Figure 37:
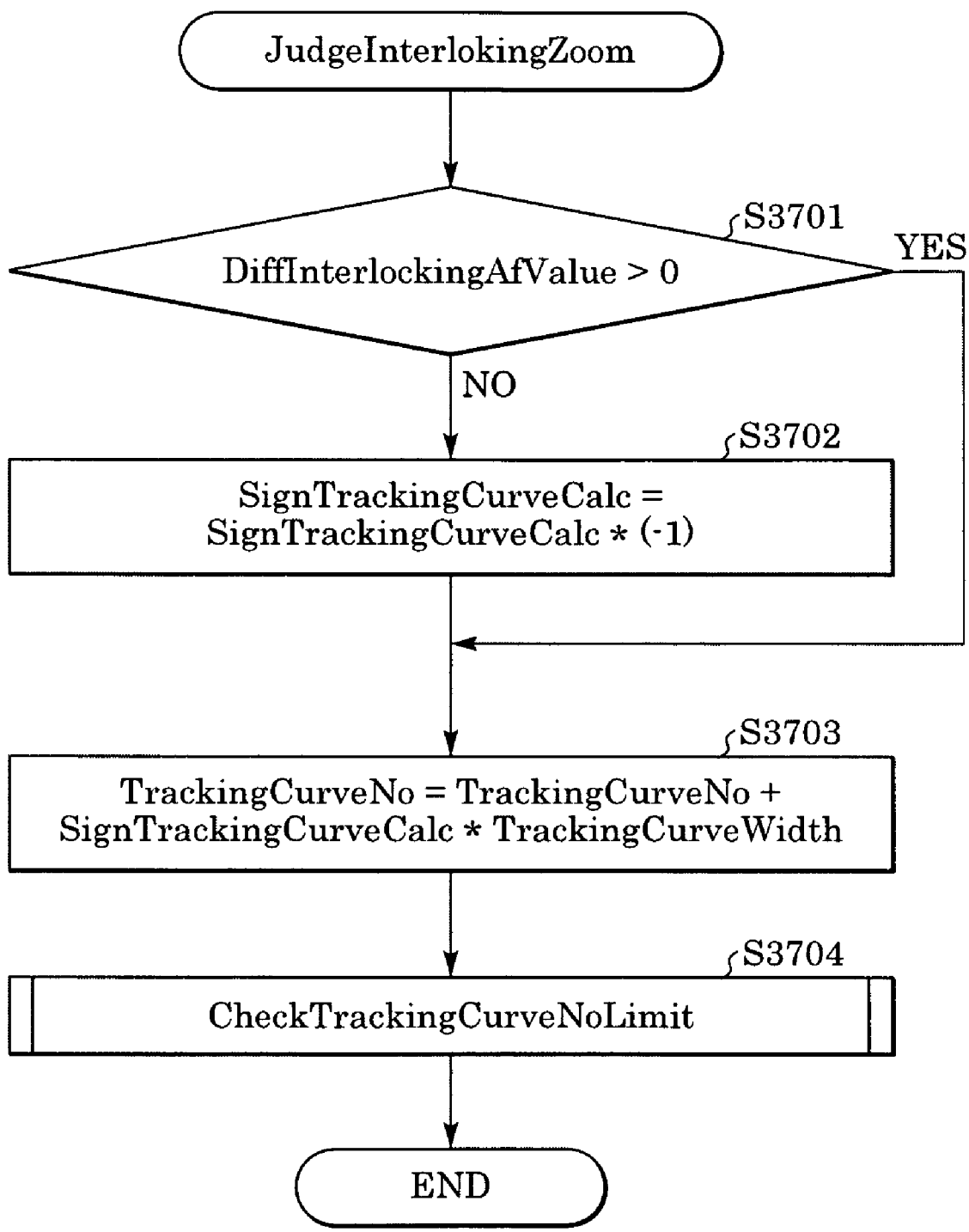
FIG. 37 is a flowchart showing a tracking curve number process for zoom interlocking by the CPU.

Next, the subroutine JudgeInterlockingZoom for processing a curve number for zoom interlocking control is described with reference to FIG. 37.

In step S3701, the sign of the differential value DiffInterlockingAfValue between the current and previous AF evaluation values is checked. If DiffInterlockingAfValue>0 is satisfied, the process proceeds to step S3703 in order to change a tracking curve number in the same direction as the direction of the previous change of the tracking curve number. That is, if the tracking curve number was changed in an increase direction at the previous time, the tracking curve number is changed in the increase direction. If the tracking curve number was changed in a decrease direction at the previous time, the tracking curve number is changed in the decrease direction.

In step S3703, a tracking curve number is calculated by using expression (19).

$$TrackingCurveNo = TrackingCurveNo + SignTrackingCurveCalc \times TrackingCurveWidth \quad (19)$$

Herein, a width of change in the tracking curve number TrackingCurveWidth may be changed depending on the differential value DiffInterlockingAfValue between the previous and current Af evaluation values. By allowing such a dependent relationship, the tracking curve number can be smoothly and quickly changed in a higher-contrast direction.

Then, the process proceeds to step S3704.

In step S3704, a subroutine CheckTrackingCurveNoLimit is called to limit the tracking curve number. Then, the subroutine JudgeInterlockingZoom is completed.

If DiffInterlockingAfvalue>0 is not satisfied in step S3701, the process proceeds to step S3702.

In step S3702, the sign of calculating sign data SignTrackingCurveCalc is inverted by using expression (20) in order to change the tracking curve in a direction opposite to the direction of the previous change in the tracking curve number. That is, if the tracking curve number was changed in an increase direction at the previous time, the tracking curve number is changed in a decrease direction. If the tracking curve number was changed in a decrease direction at the previous time, the tracking curve number is changed in an increase direction. The inverted calculating sign data SignTrackingCurveCalc is stored (updated) in a memory in the CPU 120 or in the memory 122.

$$SignTrackingCurveCalc = SignTrackingCurveCalc \times (-1) \cdot (20)$$

Then, the process proceeds to step S3703.

Figure 38:
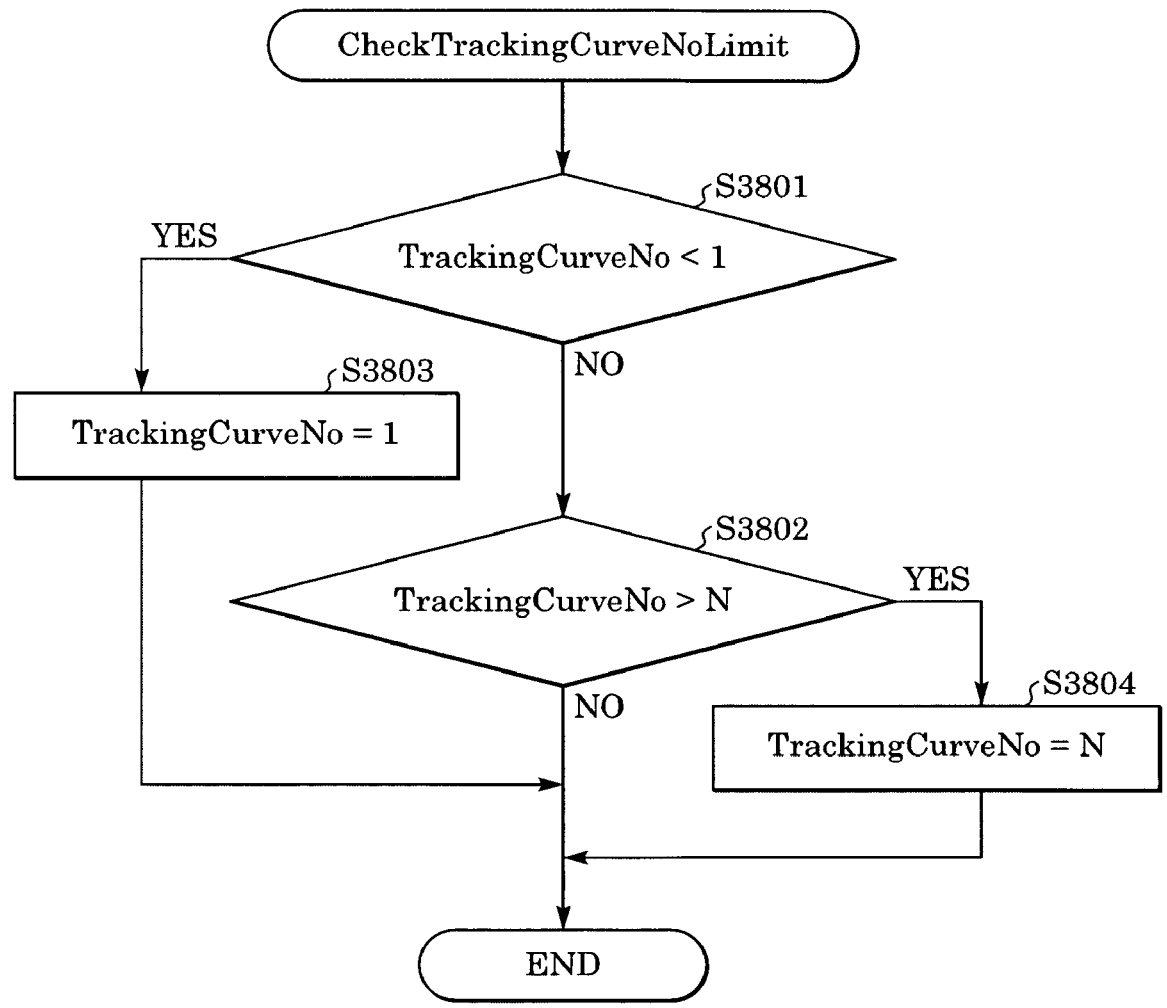
FIG. 38 is a flowchart showing a process of limiting a tracking curve number by the CPU.

Next, the subroutine CheckTrackingCurveNoLimit for limiting a tracking curve number is described with reference to FIG. 38. In step S3801, a lower limit of the number is checked. If TrackingCurveNo<1 is satisfied, the process proceeds to step S3803 to set a lower limit of the number. In step S3803, the lower limit of the number is set. TrackingCurveNo=1 . . . sets lower limit Then, the subroutine CheckTrackingCurveNoLimit is completed.

If TrackingCurveNo<1 is not satisfied in step S3801, the process proceeds to step S3802 to check an upper limit of the number. In step S3802, the upper limit is checked. If TrackingCurveNo>N is satisfied, the process proceeds to step S3804 to set the upper limit. In step S3804, the upper limit of the number is set. TrackingCurveNo=N . . . sets upper limit Then, the subroutine CheckTrackingCurveNoLimit is completed.

If TrackingCurveNo>N is not satisfied in step S3802, it is determined that the tracking curve number is effective data, and the subroutine CheckTrackingCurveNoLimit is completed.

Figure 40:
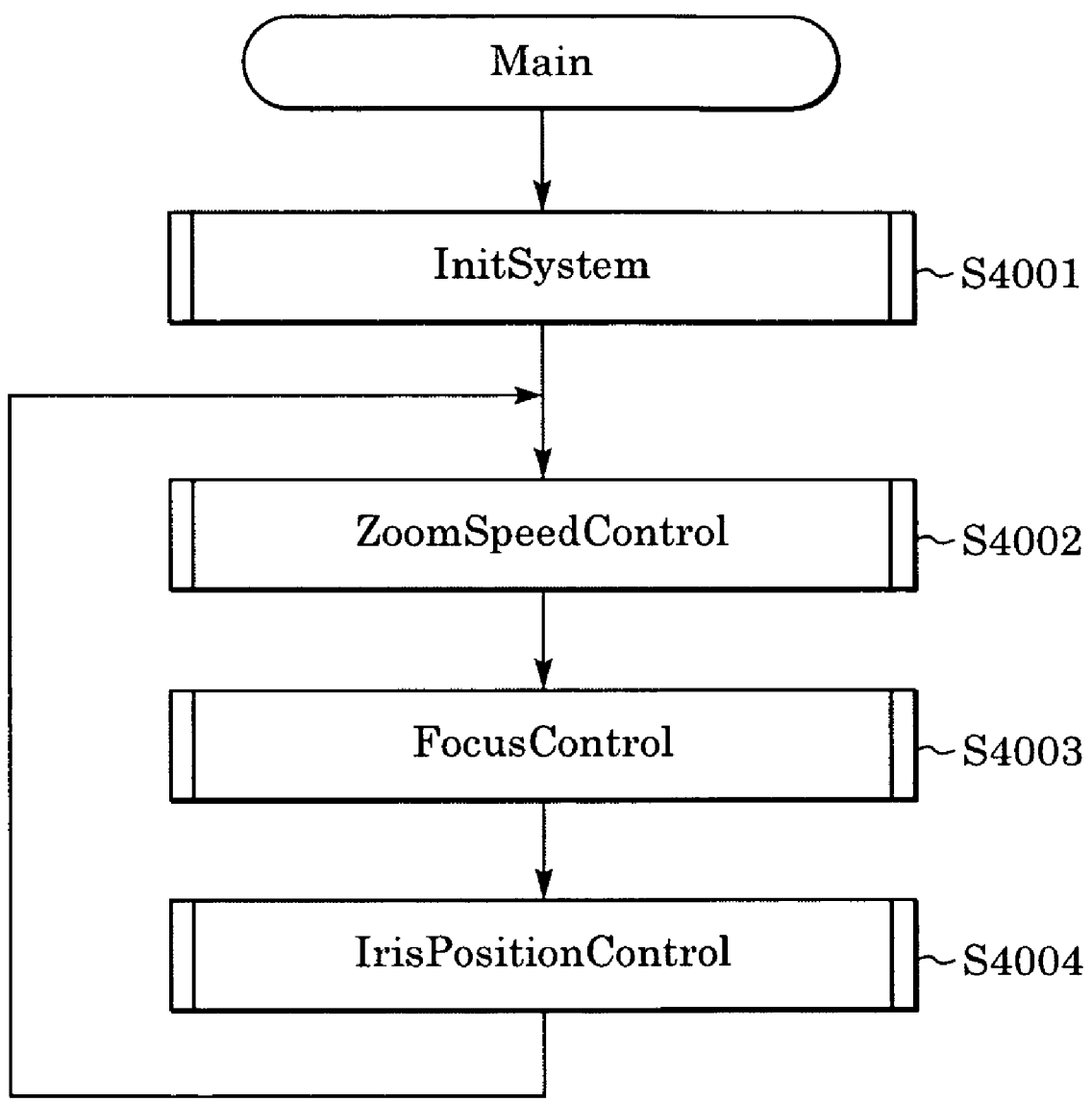
FIG. 40 is a flowchart showing a main process by the CPU.

Next, a main processing routine Main is described with reference to FIG. 40. In step S4001, the subroutine InitSystem is called to initialize the system. Then, the process proceeds to step S4002. In step S4002, the subroutine ZoomSpeedControl for controlling the zoom lens unit 102 is called. Then, the process proceeds to step S4003. In step S4003, the subroutine FocusContorl for controlling the focus lens unit 104 is called. Then, the process proceeds to step S4004.

In step S4004, the subroutine IrisPositionControl for controlling the iris 103 is called. Then, the process returns to step S4002. At this time, the timer 121 periodically interrupts while steps S4002 to S4004 are repeated, and a timer interrupt routine TimerInterrupt is performed.

As described above, according to this embodiment, when a zoom speed is equal to or lower than the first speed, AF control is performed. In the AF control, zoom trackability is lower than in a case of using a tracking curve but an image-plane maintaining performance is high. On the other hand, when a zoom speed is higher than the first speed (but is equal to or lower than the second speed), zoom interlocking control of changing a tracking curve according to an AF evaluation value is performed. In the zoom interlocking control, an image plane variation is prevented by using a tracking curve that has a higher zoom trackability than in the AF control. With this method, a favorable image-plane maintaining performance can be ensured in a zoom speed area which is regularly used in a manual zoom mode from a low speed to a high speed.

In an ultra-high-speed zooming that is higher than the regularly-used zoom speed (higher than the second speed), an AF evaluation value is difficult to obtain. In that case, the focus lens unit is controlled by fixing a tracking curve to a specific curve, so that an image plane variation can be prevented so as to prevent a significant out-of-focus state.

Second Embodiment

In the first embodiment, prevention of an image plane variation is controlled based on whether a zoom speed is higher or lower than a standard speed, that is, depending on a zoom speed. Alternatively, the prevention of an image plane variation is effectively controlled based on an AF evaluation value.

Figure 41:
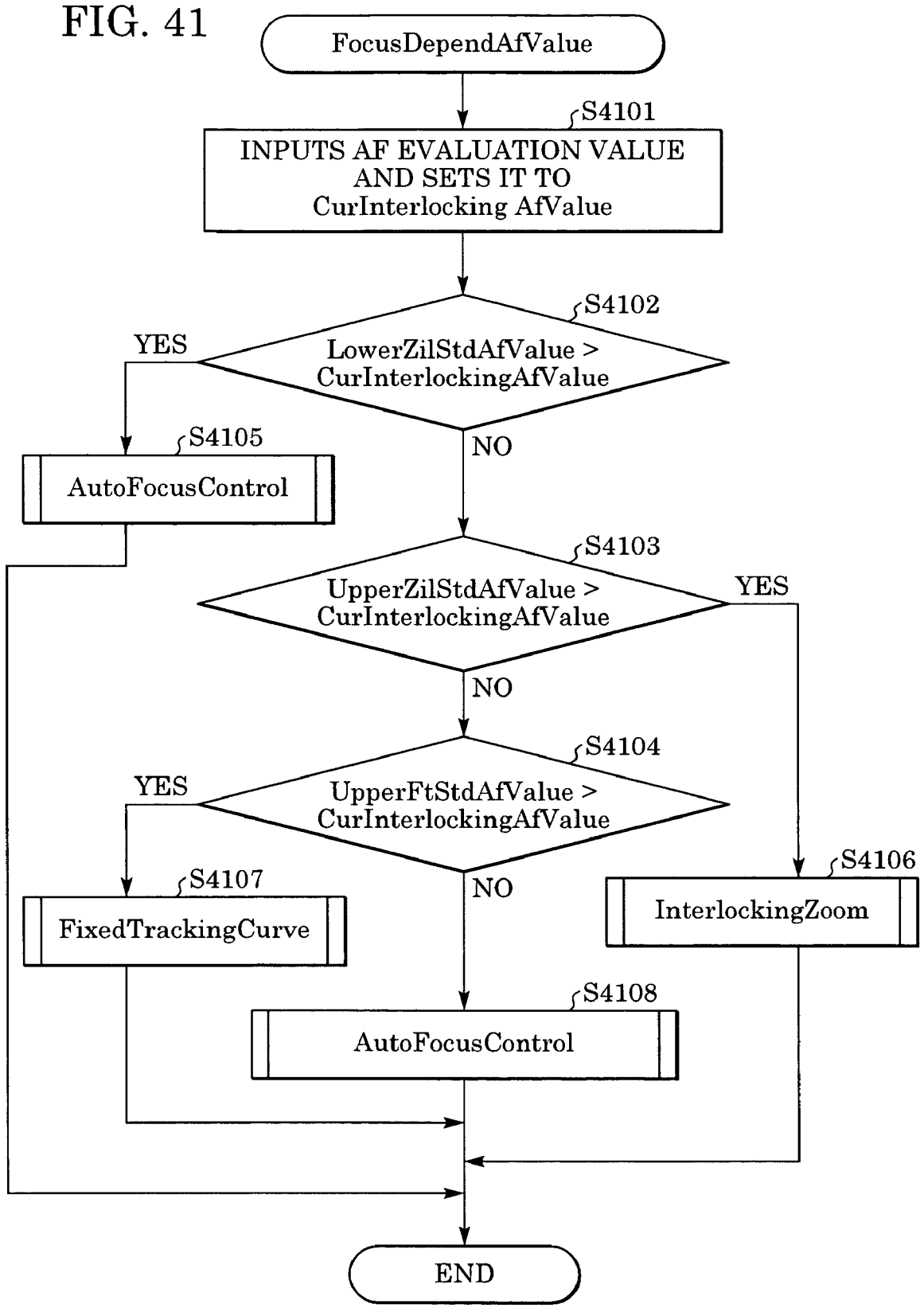
FIG. 41 is a flowchart showing a focus control process depending on an AF evaluation value performed by the drive unit (CPU) according to a second embodiment of the present invention.

Hereinafter, a subroutine FocusDependAfValue for AF evaluation value dependent focus control is described with reference to FIG. 41. This subroutine is called instead of the subroutine FocusDependZoomSpeed, which is called in step S3107 in FIG. 31 of the first embodiment.

In step S4101, a current AF evaluation value is input from the AF evaluation value generating unit 114, and the current AF evaluation value is set to CurInterlockingAfValue. Then, the process proceeds to step S4102.

In step S4102, a standard value (first value) LowerZilStdAfValue for switching between AF control and Zoom interlocking control is compared with a current AF evaluation value CurInterlockingAfValue. If LowerZilStdAfValue>CurInterlockingAfvalue is satisfied, the process proceeds to step S4105.

In step S4105, the subroutine AutoFocusControl (FIG. 32) is called to perform AF control. Then, the subroutine FocusDependAfValue is completed.

If LowerZilStdAfValue>CurInterlockingAfValue is not satisfied in step S4102, the process proceeds to step S4103.

In step S4103, a standard value (second value) UpperZilStdAfValue for switching between zoom interlocking control and tracking curve fixed control is compared with a current AF evaluation value CurInterlockingAfValue. If UpperZilStdAfValue>CurInterlockingAfValue is satisfied, the process proceeds to step S4106 to perform zoom interlocking control.

In step S4106, the subroutine InterlockingZoom (FIG. 36) for a zoom interlocking process is called. Then, the subroutine FocusDependAfValue is completed.

If UpperZilStdAfvalue>CurInterlockingAfValue is not satisfied in step S4103, the process proceeds to step S4104.

In step S4104, a standard value (third value) UpperFtStdAfValue for switching between tracking curve fixed control and AF control is compared with a current AF evaluation value CurInterlockingAfValue. If UpperFtStdAfValue>CurInterlockingAfValue is satisfied, the process proceeds to step S4107 to perform tracking curve fixed control.

In step S4107, the subroutine FixedTrackingCurve (FIG. 35) for a tracking curve fixed process is called. Then the subroutine FocusDependAfValue is completed.

If UpperFtStdAfValue>CurInterlockingAfValue is not satisfied in step S4104, the process proceeds to step S4108 to perform AF control.

In step S4108, the subroutine AutoFocusControl (FIG. 36) for AF control is called. Then, the subroutine FocusDependAfValue is completed.

Figure 42:
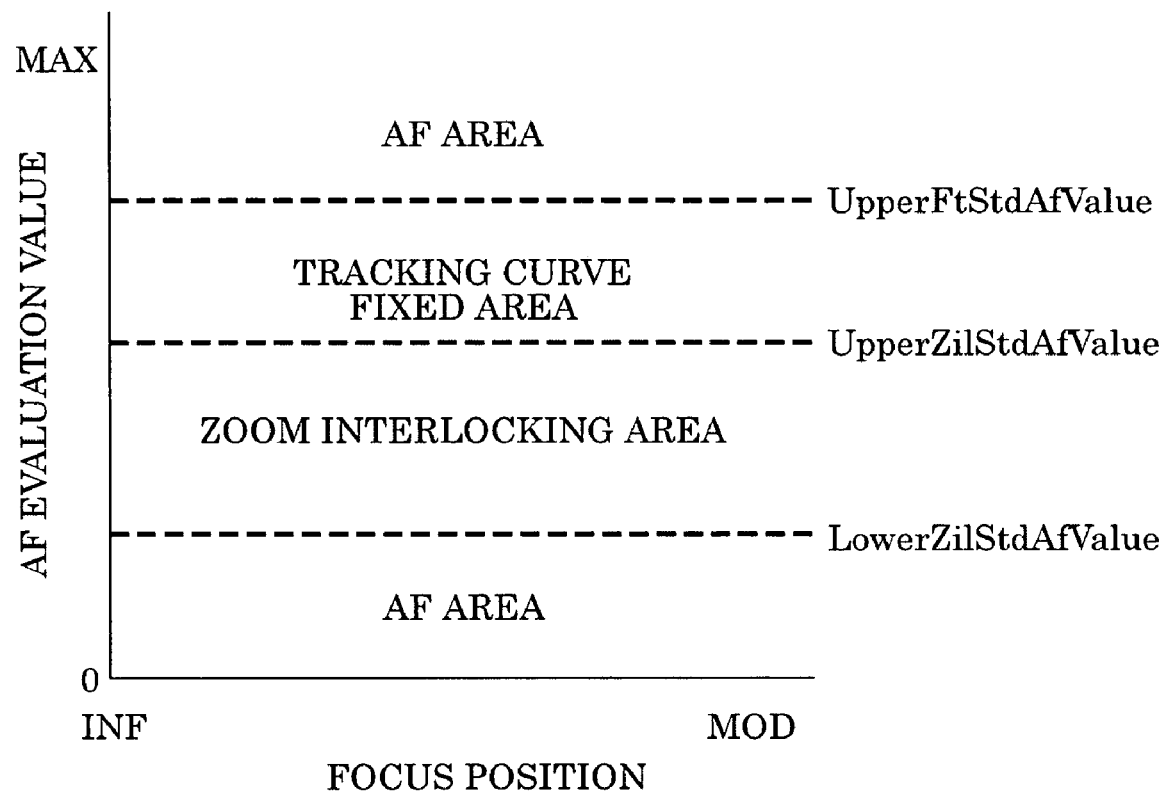
FIG. 42 is a schematic view showing a focus control depending on an AF evaluation value.

FIG. 42 conceptually shows a switching of methods for preventing of an image plane variation, depending on an AF evaluation value. An area where the AF evaluation value is lower than the standard value LowerZilStdAfValue and an area where the AF evaluation value is equal to or higher than the standard value UpperFtStdAfValue are areas for AF control. An area where the AF evaluation value is equal to or higher than the standard value LowerZilStdAfValue and is lower than the standard value UpperZilStdAfValue is an area for zoom interlocking control. An area where the AF evaluation value is equal to or higher than the standard value UpperZilStdAfValue and is lower than the standard value UpperFtStdAfValue is an area for tracking curve fixed control.

Figure 45:
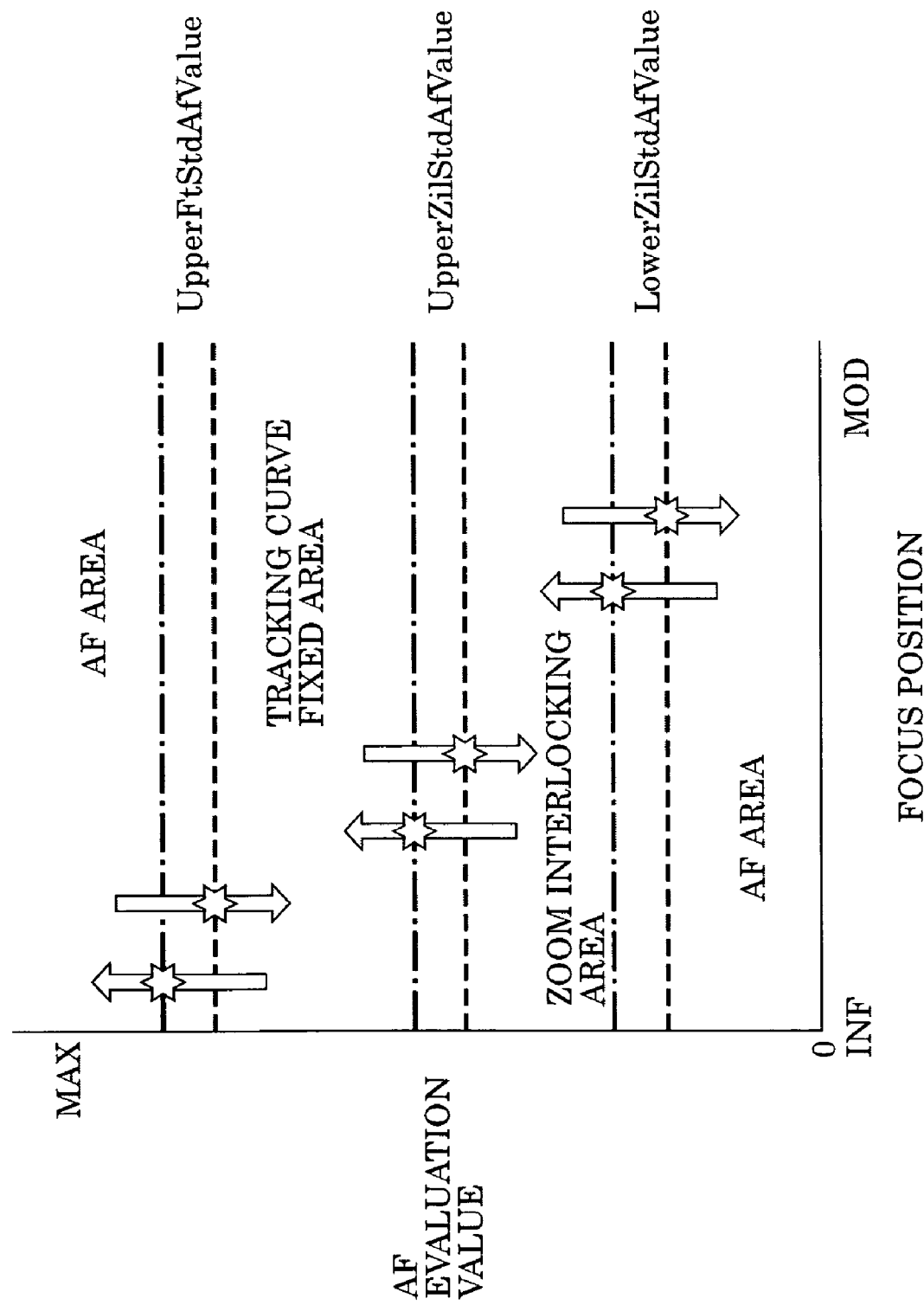
FIG. 45 shows an example in which standard AF evaluation values include a hysteresis.

If the standard values for an AF evaluation value LowerZilStdAfvalue, UpperZilStdAfvalue, and UpperFtStdAfValue ate fixed, AF control, tracking curve fixed control, and zoom interlocking control are frequently switched between each other when the AF evaluation value from the AF evaluation value generating unit 114 is approximate to each standard value. In order to prevent such a situation, each standard value is allowed to include a hysteresis as shown in FIG. 45. The standard values including a hysteresis also correspond to the first to third values.

Figure 43:
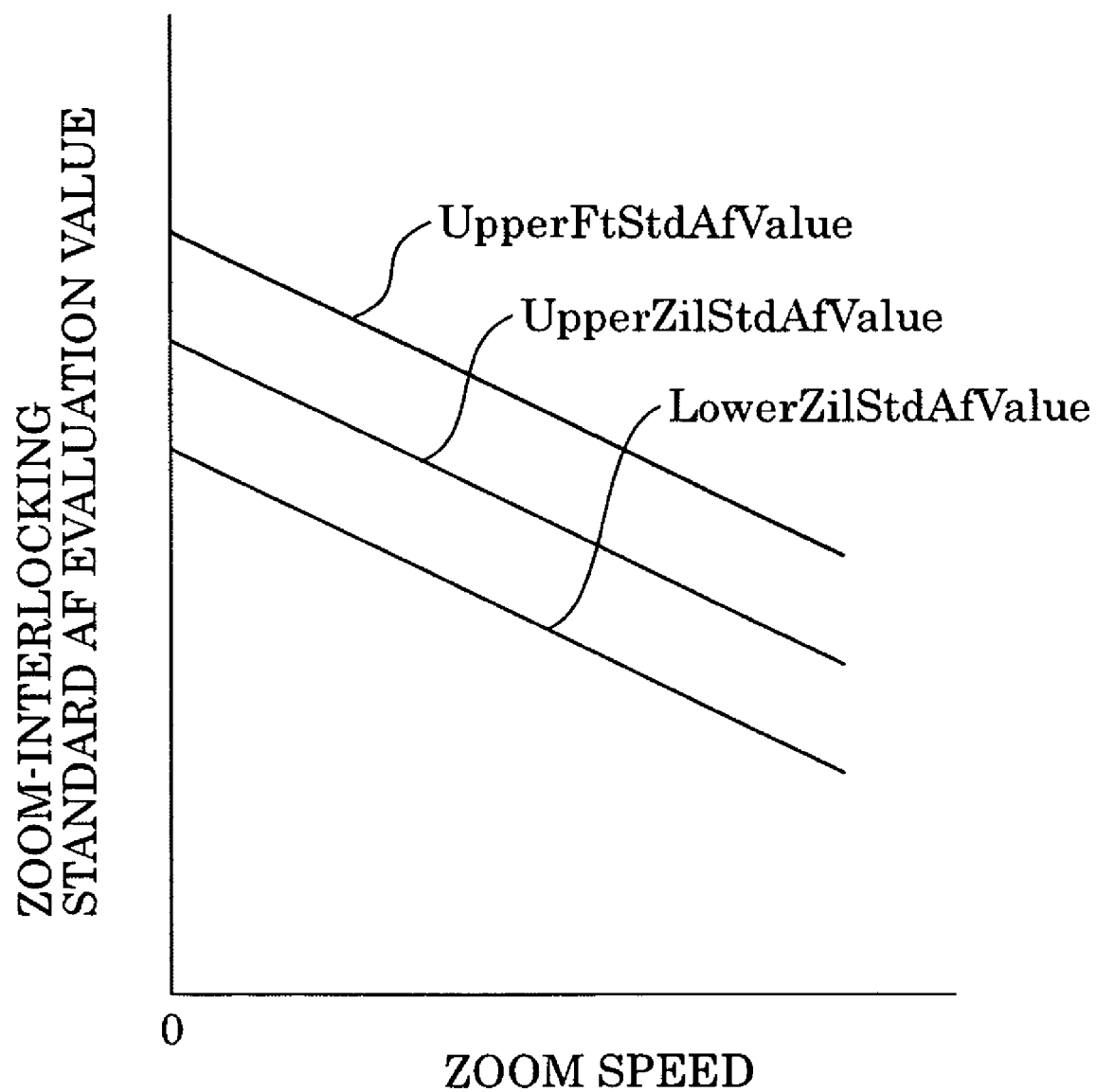
FIG. 43 shows an example of standard AF evaluation values depending on a zoom speed in the second embodiment.

Further, these standard values may be changed depending on a zoom speed. Typically, the AF evaluation value obtained from the AF evaluation value generating unit 114 becomes lower as zoom speed increases as shown in FIG. 43. Therefore, it is effective to linearly change each standard value depending on zoom speed. In addition to changing linearly, a data table depending on another curve (secondary or tertiary function) or zoom speed may be used.

As described above, according to this embodiment, prevention of an image plane variation can be optimally controlled according to an obtained AF evaluation value. Therefore, a favorable image-plane maintaining performance can be obtained with no zoom speed penalty and regardless of a change in an object.

In the above-described embodiments, the number of bits of the output from the A/D converter and the D/A converter is 16 or 8. However, another number of bits may be accepted.

The standard speeds and standard values used in the embodiments are only examples, and other values may be used.

Further, the focus lens unit may include a function of a so-called compensator.

In each of the above-described embodiments, when the focus lens unit is controlled by using a tracking curve, zoom interlocking control and tracking curve fixed control are switched between each other according to a movement speed of the zoom lens unit or an AF evaluation value. However, only one of the zoom interlocking control and the tracking curve fixed control may be performed.

In each of the above-described embodiments, a case of detecting a focus state of the lens apparatus (photographic optical system) by using an AF evaluation value is described. However, a method for detecting a focus state of the present invention is not limited the above-described method. For example, a focus state may be detected by using a difference between a plurality of images formed by dividing part of a light flux passing through the photographic optical system.

Further, in the above-described embodiments, the lens apparatus and the drive unit form a lens system. However, the present invention can be applied to a lens apparatus (a so-called large-diameter lens or the like) including a function of the drive unit.

While the present invention has been described with reference to exemplary embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

This application claims priority from Japanese Patent Application No. 2004-146628 filed May 17, 2004, which is hereby incorporated by reference herein.

What is claimed is:

1. A drive controller for a lens apparatus including a first lens unit movable to change magnification and a second lens unit moving to prevent an image plane variation in response to the first lens unit moving to change the magnification, the drive controller comprising:

a memory storing a plurality of tracking data corresponding to position data of the second lens unit; and a control unit detecting a change in a focus state of the lens apparatus during the movement of the first lens unit and changing at least one of the plurality of tracking data based on the detection, wherein the control unit performs a first control of storing a direction of the changing of the at least one of the plurality of tracking data and thereafter changing the at least one of the plurality of tracking data based on the stored direction, wherein, in the first control, the control unit changes the at least one of the plurality of tracking data in the stored direction responsive to the focus state changing towards an in-focus state, and wherein, in the first control, the control unit changes the at least one of the plurality of tracking data in a direction opposite to the stored direction responsive to the focus state changing towards an out-of-focus state.

2. The drive controller according to claim 1, further comprising:

a detecting unit detecting a movement speed of the first lens unit, wherein the control unit performs the first control when the movement speed is higher than a first speed, and performs a second control of controlling driving the second lens unit to search for a position nearer to an in-focus state when the movement speed is equal to or lower than the first speed.

3. The drive controller according to claim 2, wherein the first speed includes two different speeds used by the control unit in a case of shifting from the first control to the second control and in a case of shifting from the second control to the first control, respectively.

4. The drive controller according to claim 1, further comprising:
a detecting unit detecting a movement speed of the first lens unit,
wherein the control unit performs the first control when the movement speed is equal to or lower than a second speed, and performs a third control of controlling driving the second lens unit based on a specific one of the plurality of tracking data when the movement speed is higher than the second speed.

5. The drive controller according to claim 4, wherein the second speed includes two different speeds used by the control unit in a case of shifting from the first control to the third control and in a case of shifting from the third control to the first control, respectively.

6. The drive controller according to claim 1, further comprising:
a detecting unit detecting a movement speed of the first lens unit,
wherein the control unit performs the first control when the movement speed is higher than a first speed and is equal to or lower than a second speed higher than the first speed, performs a second control of controlling driving the second lens unit so as to search for a position nearer to an in-focus state when the movement speed is equal to or lower than the first speed, and performs a third control of controlling driving the second lens unit based on a specific one of the plurality of tracking data when the movement speed is higher than the second speed.

7. The drive controller according to claim 1, wherein the control unit detects the focus state based on an evaluation value indicating a contrast state of a captured image.

8. The drive controller according to claim 7, wherein the control unit performs the first control when the evaluation value is equal to or higher than a first value, and performs a second control of controlling driving the second lens unit so as to search for a position where the evaluation value is higher when the evaluation value is lower than the first value.

9. The drive controller according to claim 8, wherein the first value includes two different values used by the control unit in a case of shifting from the first control to the second control and in a case of shifting from the second control to the first control, respectively.

10. The drive controller according to claim 7, wherein the control unit performs the first control when the evaluation value is lower than a second value, and performs a third control of controlling driving the second lens unit based on a specific one of the plurality of tracking data when the evaluation value is equal to or higher than the second value.

11. The drive controller according to claim 10, wherein the second value includes two different values used by the control unit in a case of shifting from the first control to the third control and in a case of shifting from the third control to the first control, respectively.

12. The drive controller according to claim 7, wherein the control unit performs the first control when the evaluation value is equal to or higher than a first value and is lower than a second value higher than the first value, performs a second control of controlling driving the second lens unit so as to search for a position where the evaluation value is higher when the evaluation value is lower than the first value, performs a third control of controlling driving the second lens unit based on a specific one of the plurality of tracking data when the evaluation value is equal to or higher than the second value and is lower than a third value higher than the second value, and performs the second control when the evaluation value is equal to or higher than the third value.

13. The drive controller according to claim 12, wherein the third value includes two different values used by the control unit in a case of shifting from the third control to the second control and in a case of shifting from the second control to the third control, respectively.

14. A drive controller for a lens apparatus including a first lens unit movable to change magnification and a second lens unit moving to prevent an image plane variation in response to the first lens unit moving to change the magnification, the drive controller comprising:
a control unit controlling driving the second lens unit;
a memory storing tracking data corresponding to position data of the second lens unit; and
a detecting unit detecting a movement speed of the first lens unit,
wherein the control unit controls the driving of the second lens unit so as to search for a position nearer to an in-focus state of the lens apparatus when the movement speed is equal to or lower than a predetermined speed and controls the driving of the second lens unit by using the tracking data when the movement speed is higher than the predetermined speed.

15. A drive controller for a lens apparatus including a first lens unit movable to change magnification and a second lens unit moving to prevent an image plane variation in response to the first lens unit moving to change the magnification, the drive controller comprising:
a control unit controlling driving the second lens unit; and
a memory storing tracking data corresponding to position data of the second lens unit,
wherein, when an evaluation value indicating a contrast state of a captured image is lower than a predetermined value, the control unit controls driving the second lens unit so as to search for a position corresponding to another evaluation value higher than the evaluation value, and
wherein, when the evaluation value is equal to or higher than the predetermined value, the control unit controls driving the second lens unit based on the tracking data.

16. A lens apparatus comprising:
the drive controller according to claim 1; and
a photographic optical system including the first and second lens units.

17. A lens apparatus comprising:
the drive controller according to claim 14; and
a photographic optical system including the first and second lens units.

18. A lens apparatus comprising:
the drive controller according to claim 15; and
a photographic optical system including the first and second lens units.

19. A photographing system comprising:
the lens apparatus according to claim 16; and
a photographing apparatus attached to the lens apparatus.

20. A photographing system comprising:
the lens apparatus according to claim 17; and
a photographing apparatus attached to the lens apparatus.

21. A photographing system comprising:
the lens apparatus according to claim 18; and
a photographing apparatus attached to the lens apparatus.

* * * * *